United States Patent
Tanaka et al.

(10) Patent No.: US 6,263,061 B1
(45) Date of Patent: Jul. 17, 2001

(54) DIGITAL BUTTON TELEPHONE SYSTEM AND EXTENSION TERMINAL FOR THE SAME

(75) Inventors: Toshiaki Tanaka, Higashiyamato; Hiroshi Mano, Hino; Setsuo Kimura, Musashimurayama; Yoshihito Nagano, Yokohama; Masayuki Tsurusaki; Takashi Watanabe, both of Hino; Terunori Suwa, Tachikawa; Isaku Komuro, Kokubunji; Yoshihiro Kawauchi, Hino; Nobuhiro Masaki, Tachikawa, all of (JP)

(73) Assignee: Kabushiki Kaish Toshiba, Kawasaki (JP)

( * ) Notice: Subject to any disclaimer, the term of this patent is extended or adjusted under 35 U.S.C. 154(b) by 0 days.

(21) Appl. No.: 09/125,154

(22) PCT Filed: Feb. 11, 1997

(86) PCT No.: PCT/US97/02163

§ 371 Date: Aug. 13, 1998

§ 102(e) Date: Aug. 13, 1998

(87) PCT Pub. No.: WO97/30558

PCT Pub. Date: Aug. 21, 1997

(30) Foreign Application Priority Data

Feb. 13, 1996 (JP) .................................................. 8-025658

(51) Int. Cl.[7] .......................... H04M 1/00; H04M 11/00; H04M 3/42

(52) U.S. Cl. ................. 379/156; 379/93.07; 379/100.15; 379/156; 379/157; 379/165; 379/212; 379/215

(58) Field of Search ................................... 379/142, 143, 379/156, 57, 159, 160, 164, 165, 209, 210, 211, 212, 215, 265, 266, 93.07, 93.09, 93.14, 93.17, 93.23, 100.15, 198

(56) References Cited

U.S. PATENT DOCUMENTS

| 4,160,131 | * | 7/1979 | Kaul et al. ............................ 379/158 |
| 4,291,200 | * | 9/1981 | Smith ................................ 379/90.01 |

(List continued on next page.)

FOREIGN PATENT DOCUMENTS

| 0 355 488 | 8/1988 | (EP) .............................. H04Q/3/545 |
| 61-264891 | 11/1986 | (JP) . |

(List continued on next page.)

Primary Examiner—Curtis Kuntz
Assistant Examiner—Binh K. Tieu
(74) Attorney, Agent, or Firm—Finnegan, Henderson, Farabow, Garrett & Dunner, L.L.P.

(57) ABSTRACT

According to this invention, a digital key telephone system connected to an analog public network NW having a function of transmitting a ringing signal including identification information of a calling line through a subscriber line (CO line), accommodating a plurality of extension lines each connected to a digital key telephone (DKT) 2 or a standard telephone (STT) 4 as an extension terminal, and having a function of switching and connecting the subscriber line to the plurality of extension lines or the extension lines to each other includes a called party storage means storing, in advance, information representing the correlation between the calling line and the extension terminals 2 and 4 as a called terminal. When a ringing signal arrives from the analog communication network NW, calling line identification information (caller ID) contained in the ringing signal is detected by a calling line identification information interface unit (RCIU) 12. A control unit (RCTU) 16 determines the called extension terminal on the basis of the detected caller ID and the information stored in the storage means, so the extension terminal receives the call from the digital key telephone interface unit (RDKU) 13 or a standard telephone interface unit (RSTU) 15.

11 Claims, 92 Drawing Sheets

U.S. PATENT DOCUMENTS

| | | | | |
|---|---|---|---|---|
| 4,682,353 | * | 7/1987 | Inoue et al. | 379/156 |
| 4,803,718 | | 2/1989 | Niel et al. | 379/163 |
| 5,204,861 | * | 4/1993 | Wiebe | 379/156 |
| 5,268,958 | * | 12/1993 | Nakano | 379/142 |
| 5,333,182 | * | 7/1994 | Aoki | 379/156 |
| 5,479,493 | * | 12/1995 | Baker et al. | 379/142 |
| 5,590,183 | * | 12/1996 | Yoneda et al. | 379/142 |
| 5,625,682 | * | 4/1997 | Gray et al. | 379/266 |
| 5,712,909 | * | 1/1998 | Hara | 379/165 |

FOREIGN PATENT DOCUMENTS

| | | |
|---|---|---|
| 64-7898 | 1/1989 | (JP) . |
| 3-173293 | 7/1991 | (JP) . |
| 4-47817 | 2/1992 | (JP) . |
| 4-157951 | 5/1992 | (JP) . |
| 4-181850 | 6/1992 | (JP) . |
| 4-185095 | 7/1992 | (JP) . |
| 4-223647 | 8/1992 | (JP) . |
| 5-63782 | 3/1993 | (JP) . |
| 6-46143 | 2/1994 | (JP) . |
| 6-113354 | 4/1994 | (JP) . |
| 6-133350 | 5/1994 | (JP) . |
| 6-245246 | 9/1994 | (JP) . |
| 7-15518 | 1/1995 | (JP) . |
| 7-336440 | 12/1995 | (JP) . |

* cited by examiner

CALL RECEPTION/SOUND GENERATION CONTROL BASED ON CALLING PARTY IDENTIFICATION INFORMATION

|  | NUMBER OF TELEPHONE TO BE SUBJECTED TO RINGING GENERATION |
|---|---|
| ADDRESS No. | |

| | | |
|---|---|---|
| 0 | CALLING PARTY NUMBER 1 | 200 |
| 1 | CALLING PARTY NUMBER 2 | 205 |
| ⋮ | ⋮ | |
| n | CALLING PARTY NUMBER n | 212 |

TABLE MEMORY STORING CORRELATION BETWEEN
CALLING PARTY NUMBERS AND TELEPHONE NUMBERS

FIG. 15

<CLASS DISPLAY>

| LED DISPLAY | LCD DISPLAY (SOFT Key ON) | LCD DISPLAY (SOFT Key OFF) |
|---|---|---|
| [Steady ON] (silent) | NO. 200<br>SEP 9 THE 18:30 | NO. 200<br>SEP 9 THE 18:30 |
| | ↓ | ↓ |
| [Brink] (Ringing) | MR. JOHN<br>LINE 3 RINGING | MR. JOHN<br>LINE 3 RINGING |
| | ↓ | ↓ |
| [I-USE] (Talk) | MR. JOHN<br>TRNS CONF PGE | MR. JOHN<br>ANSWERED LINE 3 |
| | ↓ | ↓ |
| [I-USE] (Talk) | 00:00:15<br>TRNS CONF PGE | MR. JOHN<br>00:00:15 |

FIG. 16

<CLASS DISPLAY>

DISPLAY ON DISPLAY DEVICE

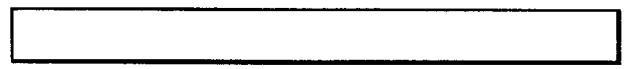
LINE 3 RINGING MR. JOHN

TALK ON LINE 3 MR. JOHN

FIG. 17

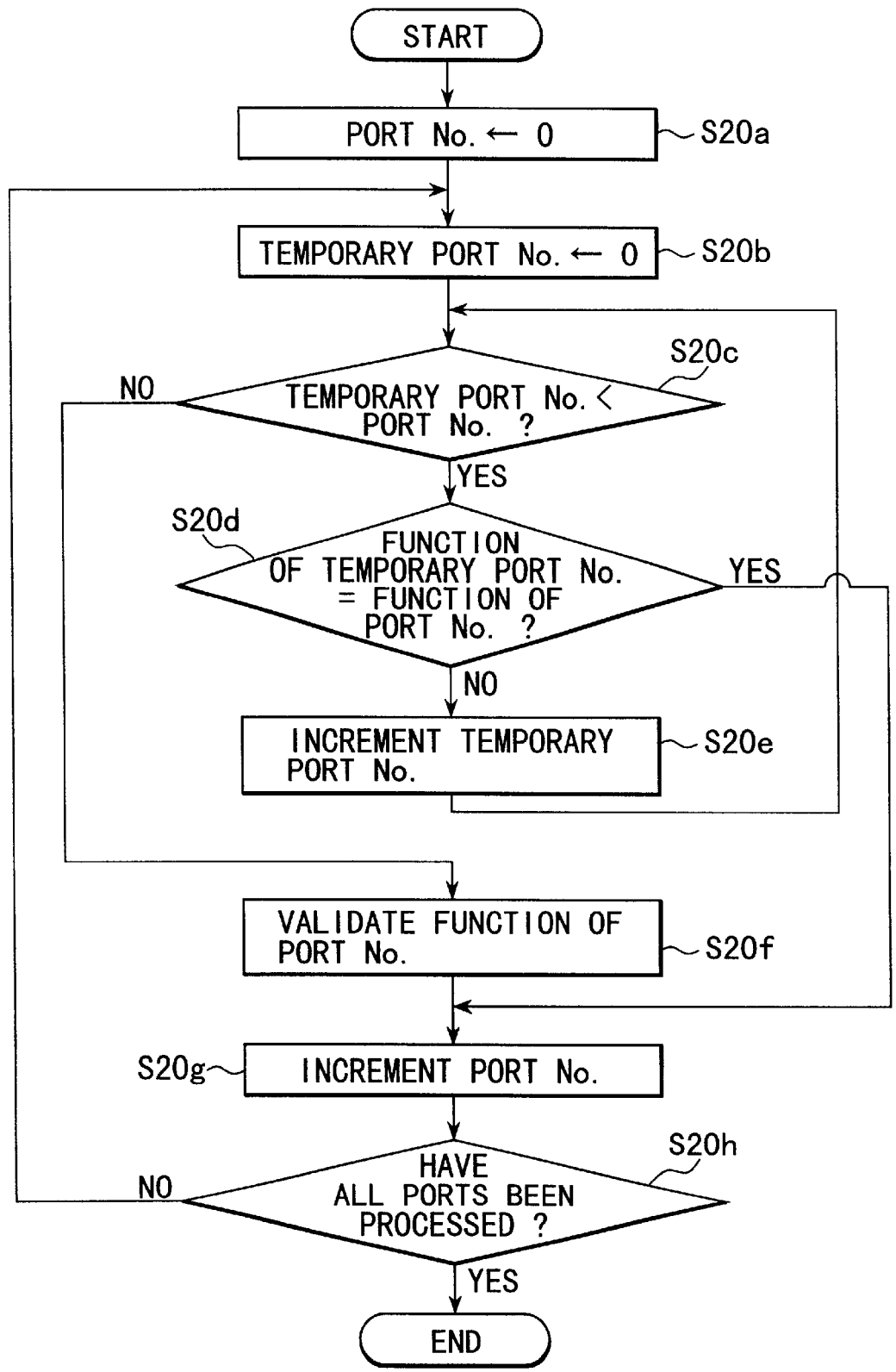
FIG. 20 FUNCTION SETTING UPON POWERING ON

FUNCTION CHANGE DURING SYSTEM OPERATION

CONNECTION EXAMPLE USING MODEM INTERFACE

ANOTHER CONNECTION EXAMPLE USING MODEM INTERFACE

| NUMBER OF PORTS \ bps | 9600bps | 4800bps | 2400bps | 1200bps |
|---|---|---|---|---|
| 1 | ×1PORT | ×1PORT | ×1PORT | ×1PORT |
| 2 | | ×2PORT<br>×1PORT<br>×1PORT | ×1PORT<br>×2PORT<br>×1PORT<br>×2PORT<br>×1PORT | ×1PORT<br>×1PORT<br>×2PORT |
| 3 | | ×1PORT<br>×1PORT<br>×1PORT | ×3PORT<br>×2PORT<br>×1PORT | ×1PORT<br>×2PORT<br>×3PORT |
| 4 | | ×1PORT<br>×1PORT | ×4PORT<br>×3PORT<br>×2PORT<br>×1PORT | ×1PORT<br>×2PORT<br>×3PORT<br>×4PORT<br>×3PORT<br>×2PORT |

TABLE OF THE NUMBER OF PORTS
AND DATA TRANSMISSION RATE

FIG. 25

| COMMUNICATION MODE / USE PURPOSE | DATA BIT LENGTH | PARITY BIT | STOP BIT LENGTH | BAUD RATE | ACK/NACK X-MODEM |
|---|---|---|---|---|---|
| TTY | 7 | EVEN | 1 | 1200-9600 | NO PROTOCOL X-MODEM |
| SMDR | 8 | × | 1 | 1200-9600 | NO PROTOCOL |
| MIS | 7 | EVEN | 1 | 1200-9600 | ACK/NACK |
| SMDI | 7 | EVEN | 1 | 1200-9600 | ACK/NACK |
| CLASS/O.A | 7 | EVEN | 1 | 1200-9600 | ACK/NACK |

TABLE OF USE PURPOSES AND COMMUNICATION MODES

FIG. 26

| EXTENSION CABINET No. | CABINET POSITION RECOGNITION SIGNAL AS-1 | CABINET POSITION RECOGNITION SIGNAL AS-2 | DATA CHANNEL SWITCHING SIGNAL CS |
|---|---|---|---|
| 1b1 | L | L | H |
| 1b2 | H | L | L |

| EXTENSION CABINET No. | PHOUT | | | | EXTENSION-CABINET-SIDE DATA |
|---|---|---|---|---|---|
| | EA | EB | EC | ED | |
| 1b1 | BA | BB | BC | BC | BASIC-CABINET-SIDE DATA |
| 1b2 | BA | BB | BB | BC | |

| EXTENSION CABINET No. | PHIN | | | BASIC-CABINET-SIDE DATA |
|---|---|---|---|---|
| | BA | BB | BC | |
| 1b1 | EA | EB | EC ED | EXTENSION-CABINET-SIDE DATA |
| 1b2 | EA | EB EC | ED | |

ARRANGEMENT OF EXTENSION CABINET

| RELAY BOARD | SLOT A | SLOT B | SLOT C | SLOT D | POWER SUPPLY UNIT |
|---|---|---|---|---|---|

DATA NAME IN EXTENSION CABINET

| EA | EB | EC | ED |
|---|---|---|---|

DATA NAME BETWEEN BASIC CABINET AND EXTENSION CABINET

| | DATA No. | NUMBER OF CHANNELS | DATA No. | NUMBER OF CHANNELS |
|---|---|---|---|---|
| | BA | 16ch | BA | 16ch |
| | BB | 16ch | BB | 8ch |
| | BC | 8ch | BB | 8ch |
| | BC | 8ch | BC | 16ch |

EXTENSION CABINET 1b1 / EXTENSION CABINET 1b2

FIG. 35

DN NUMBER DISPLAY

EXTENSION NUMBER DISPLAY

INQUIRY

FIG. 39A DN NUMBER CONFIRMATION

DN + #️⃣4️⃣0️⃣7️⃣

| | | | | 4 | 0 | 0 | 2 | 1 | 0 |
|---|---|---|---|---|---|---|---|---|---|

DN NUMBER

FIG. 39B EXTENSION NUMBER CONFIRMATION

DN + #️⃣4️⃣0️⃣1️⃣

| | | | | 4 | 0 | 1 | 2 | 1 | 0 |
|---|---|---|---|---|---|---|---|---|---|

SELF EXTENSION NUMBER

FIG. 39C ACCOMMODATION POSITION NUMBER CONFIRMATION

DN + #️⃣4️⃣0️⃣2️⃣

| | | | | 4 | 0 | 2 | 0 | 1 | 0 |
|---|---|---|---|---|---|---|---|---|---|

ACCOMMODATION POSITION NUMBER

FIG. 39D SLOT NUMBER CONFIRMATION

DN + #️⃣4️⃣0️⃣3️⃣

| | | | | 4 | 0 | 3 | 1 | 3 | 8 |
|---|---|---|---|---|---|---|---|---|---|

SLOT NO.   PORT NO.

| ORBIT NUMBER | #1 | #2 | #3 | | #n-1 | #n |
|---|---|---|---|---|---|---|
| TERMINAL NUMBER | 005 | OFF$_H$ | 000 | | OFF$_H$ | OFF$_H$ |
| TRUNK NUMBER | 001 | OFF$_H$ | 009 | | OFF$_H$ | OFF$_H$ |
PORT RESERVATION TABLE
F I G. 4 1
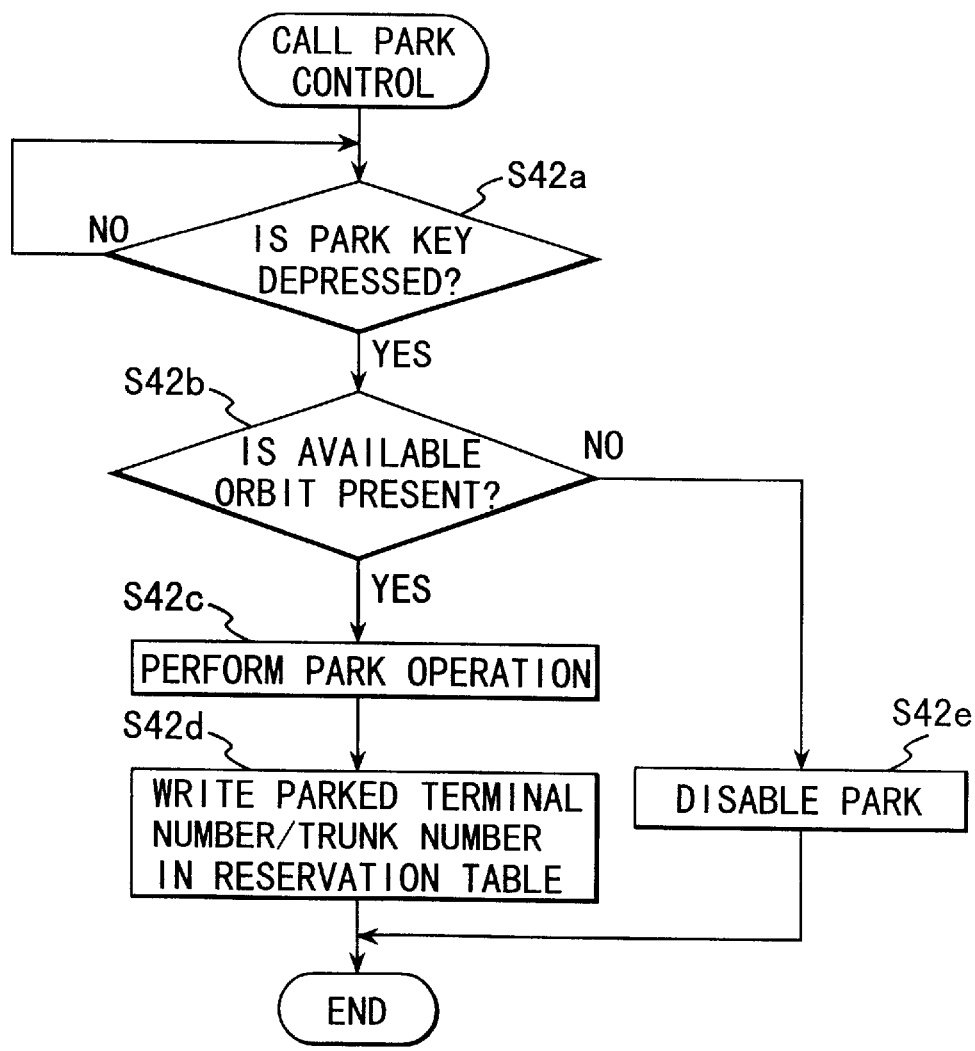
F I G. 4 2

LINE SELECTION KEY NUMBER

| | |
|---|---|
| 10 | OFF$_H$ |
| 9 | OFF$_H$ |
| 8 | C/02 |
| 7 | OFF$_H$ |
| 6 | C/011 |
| 5 | C/010 |
| 4 | OFF$_H$ |
| 3 | OFF$_H$ |
| 2 | C/01 |
| 1 | OFF$_H$ |

HOLDING INFORMATION AREA
(EXTENSION TERMINAL #200)

SUMMARY OF OPERATION
EXTENSION
OPERATION BY DN
    CALLING (HFU)
    DN200 → DN201
    (#200)
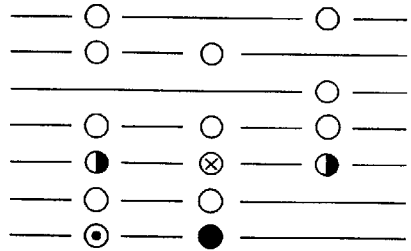
    CALLING (TONE)
    DN200 → DN201
    (#200)
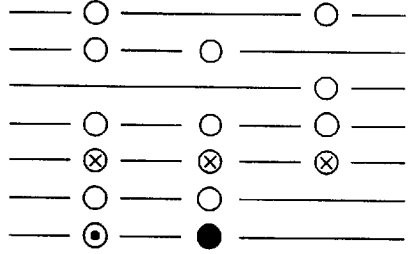
NOTE) I-Called IS DISPLAYED ON RINGING TERMINAL
201
ANSWER EXTENSION
CALL
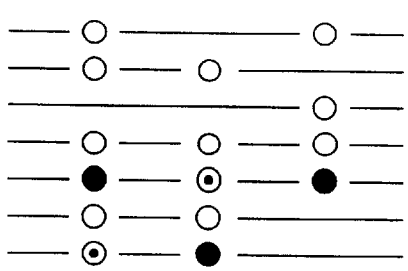
200:CONF #202
      CALLING
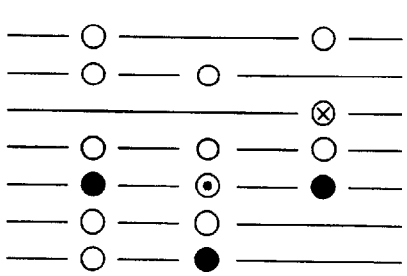
202 ANSWER
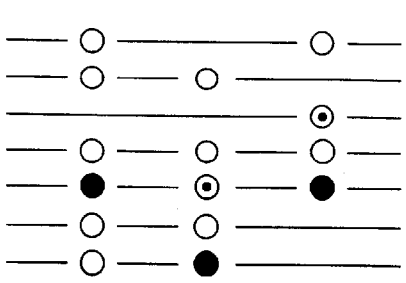
FIG. 50

FIG. 53

OFFICE LINE CALLING AND R.T BY DN

```
                                              #200  #201  #202
#200 DN200-1+[9]    DN501            ─── ○ ─────────── ○ ───
TRANSFER            DN500            ─────── ○ ─── ○ ───────
                    DN202            ─────────────────── ○ ───
                    DN201-2          ─── ○ ─── ○ ─── ○ ───
                    DN201-1          ─── ○ ─── ○ ─── ○ ───
                    DN200-2,3        ─── ○ ─── ○ ───────
                    DN200-1          ─── ⊙ ─── ● ───────
```
    IF CO KEY IS PRESENT, I-USE IS DISPLAYED ON
    LED AND DN KEY IS MADE AVAILABLE

```
CONF #201 CALLING   DN501            ─── ○ ─────────── ○ ───
(#200)              DN500            ─── ○ ─── ○ ───────
HFU CALLING         DN202            ─────────────────── ○ ───
                    DN201-2          ─── ○ ─── ○ ─── ○ ───
                    DN201-1          ─── ◐ ─── ⊗ ─── ◐ ───
                    DN200-2,3        ─── ○ ─── ○ ───────
                    DN200-1          ─── ○ ─── ● ───────
```

```
(#200) ON-HOOK      DN501            ─── ○ ─────────── ○ ───
       R.T          DN500            ─── ○ ─── ○ ───────
                    DN202            ─────────────────── ○ ───
                    DN201-2          ─── ○ ─── ○ ─── ○ ───
                    DN201-1          ─── ◐ ─── ⊗ ─── ⊗ ───
                    DN200-2,3        ─── ○ ─── ○ ───────
                    DN200-1          ─── ○ ─── ○ ───────
```
NOTE) R.T CAN BE XUBJECTED TO DELAY CALL RECEPTION

```
(#200) ON-HOOK      CO001            ─────── ⊗ ───────────
       R.T          DN501            ─── ○ ─────────── ○ ───
CO KEY PRESENT      DN500            ─── ○ ─── ○ ───────
                    DN202            ─────────────────── ○ ───
                    DN201-2          ─── ○ ─── ○ ─── ○ ───
                    DN201-1          ─── ◐ ─── ◐ ─── ⊗ ───
                    DN200-2,3        ─── ○ ─── ○ ───────
                    DN200-1          ─── ○ ─── ○ ───────
```

```
R.T TIMEOUT         DN501            ─── ○ ─────────── ○ ───
(TERMINAL AVAILABLE, DN500           ─── ○ ─── ○ ───────
DN AVAILABLE)       DN202            ─────────────────── ○ ───
                    DN201-2          ─── ○ ─── ○ ─── ○ ───
                    DN201-1          ─── ○ ─── ○ ─── ○ ───
                    DN200-2,3        ─── ○ ─── ○ ───────
                    DN200-1          ─── ⊕ ─── ◐ ───────
```

```
R.T TIMEOUT         DN200-1          ─── ○ ─── ◐ ───────
(TERMINAL BUSY,
DN AVAILABLE)
```

R.T TIMEOUT          IF DN TO BE RECALLED IS NOT
(TERMINAL DO NOT     AVAILABLE AVAILABLE DN IS WAITED
AVAILABLE)           FOR BEHIND

FIG. 54

CALL RECEPTION AND CONFERENCE BY DN

|  |  | #200 | #201 | #202 |
|---|---|---|---|---|
| CO CALL RECEPTION | DN501 | ○ | | ○ |
|  | DN500 | ○ | ○ | |
|  | DN202 | | | ○ |
|  | DN201-2 | ○ | ○ | ○ |
|  | DN201-1 | ○ | ○ | ○ |
|  | DN200-2, 3 | ○ | ○ | |
|  | DN200-1 | ⊗ | ⊗ | |

DISPLAY FOR DN KEY UPPON CO CALL RECEPTION

| #200 ANSWERS CALL | DN501 | ○ | | ○ |
|---|---|---|---|---|
|  | DN500 | ○ | ○ | |
|  | DN202 | | | ○ |
|  | DN201-2 | ○ | ○ | ○ |
|  | DN201-1 | ○ | ○ | ○ |
|  | DN200-2, 3 | ○ | ○ | |
|  | DN200-1 | ⊙ | ● | |
| #200 CONF | DN501 | ○ | | ○ |
|  | DN500 | ○ | ○ | |
|  | DN202 | | | ○ |
|  | DN201-2 | ○ | ○ | ○ |
|  | DN201-1 | ○ | ○ | ○ |
|  | DN200-2, 3 | ○ | ○ | |
|  | DN200-1 | ○ | ● | |
| CALL #201 (HFU CALLING) | DN501 | ○ | | ○ |
|  | DN500 | ○ | ○ | |
|  | DN202 | | | ○ |
|  | DN201-2 | ○ | ○ | ○ |
|  | DN201-1 | ◐ | ⊗ | ◐ |
|  | DN200-2, 3 | ○ | ○ | |
|  | DN200-1 | ○ | ● | |

FIG. 55

LED DISPLAY FOR DN KEY

| TERMINAL STATE / TYPE OF CALLING | TERMINAL = AVAILABLE | | TERMINAL = BUSY | |
|---|---|---|---|---|
| | WITH CALL RECEPTION SETTING | WITHOUT CALL RECEPTION SETTING | WITH CALL RECEPTION SETTING | WITHOUT CALL RECEPTION SETTING |
| HFU CALLING | 1-CALLED | 1-CALLED | --- | --- |
| TONE CALLING | 1-CALLED | 1Hz | --- | --- |
| BOV | --- | --- | 1-CALLED | 1Hz |
| R.T | 1-CALLED | 2Hz | 1-CALLED | 2Hz |
| CALL BACK | OPERATOR | EXCEPT OPERATOR | OPERATOR | EXCEPT OPERATOR |
| EXTENSION R.T CALL BACK | 10Hz-4Hz | 2Hz | 10Hz | 2Hz |
| HOLDING CALL BACK | 10Hz-4Hz | 2Hz | 10Hz | 2Hz |
| HOLDING | 4Hz | 2Hz | 4Hz | 2Hz |
| EXCLUSIVE HOLDING | 10Hz | ON | 10Hz | ON |
| ACB CALL BACK | 1-CALLED | ON | --- | --- |

FIG. 57

| CALLED DN KEY | CALLING | |
|---|---|---|
| PRESENT | HFU | CALL ONLY PRIMARY TERMINAL (VOICE CALLING)<br><br>CALLED DN ——⊗——●— |
| | TONE | CALL A PLURALITY OF TERMINALS WITH CALL RECEPTION SETTING (TONE CALLING)<br><br>CALLED DN ——⊗——⊗——●— |
| ABSENT | HFU<br>TONE | CALLING IS DISABLED, AND BT IS RETURNED TO CALLING PARTY |

FIG. 58

| CALL RECEPTION STATE / CALL RECEPTION EVENT | DN STATE | TONE CALLING | HFU CALLING |
|---|---|---|---|
| TONE CALLING | DN AVAILABLE | CALL RECEPTION BY AVAILABLE DN, WITHOUT RINGING TONE | |
| | DN NOT AVAILABLE | CALLING PARTY BT, IN [2] ,CAMP-ON TONE IS SENT TO DN USER WHO HAS SET CALL RECEPTION AND AVAILABLE DN IS WAITED FOR | |
| HFU CALLING | DN AVAILABLE | CALLING PARTY BT →[2]→DISPLAY CALL RECEPTION ON LED AND PROCESS CALL AS TONE CALLING | |
| | DN NOT AVAILABLE | CALLING PARTY BT, IN [2] ,CAMP-ON TONE IS SENT TO DN USER WHO HAS SET CALL RECEPTION AND AVAILABLE DN IS WAITED FOR | |

FIG. 59

| DND PROCESSING DURING CALL RECEPTION | | |
|---|---|---|
| TYPE OF CALL RECEPTION | CALLING DURING DND | DND DURING CALLING |
| OFFICE LINE CALL RECEPTION | NOT RECEIVED | STOP CALL RECEPTION |
| TONE CALLING NOTE 1) | NOT RECEIVED | STOP CALL RECEPTION |
| VOICE CALLING | NOT RECEIVED (CALLING PARTY:SBT) | CALLING PARTY SBT → [2]→OCA |
| ACB CALL BACK | ACB CALL BACK | ACB CALL BACK |
| OCA CALLING | (CALLING PARTY:SBT) | CALLING PARTY SBT → [2]→OCA |
| T.A CALL BACK | T.Q CALL BACK | T.Q CALL BACK |
| R.T (EXTENSION) | HRC | CAMP-ON |
| DID, TIE NOTE 2) | NOT RECEIVED | STOP CALL RECEPTION |
| AC, GP CALLING | NO CALL RECEPTION | AC →AVAILABLE |
| PRIVACY OVERRIDE | PRIVACY OVERRIDE | --- |

FIG. 60

CF OPERATION

| TYPE OF CF \ CALLING | TERMINAL \ DN | AVAILABLE | | BUSY | |
|---|---|---|---|---|---|
| | | AVAILABLE | BUSY | AVAILABLE | BUSY |
| A | HFU CALLING | ○ | ○ | ○ | ○ |
| B | | × | ○ | ○ | ○ |
| NA | | ○ | × | × | × |
| BNA | | ○ | ○ | ○ | ○ |
| A | TONE CALLING | ○ | ○ | ○ | ○ |
| B | | × | ○ | ○ | ○ |
| NA | | ○ | × | ○ | × |
| BNA | | ○ | ○ | ○ | ○ |

○ : CF IS PERFORMED
× : CF IS NOT PERFORMED

```
CF-A  : XXXX-YYYY+     CF-A DISPLAY, XXXX IS DN NUMBER,
                       AND YYYY IS CF DESTINATION
      ↓ SCRL

CF-B  : MMMM-NNNN+     CF-B DISPLAY, MMMM IS DN NUMBER,
                       AND NNNN IS CF DESTINATION
      ↓ SCRL

CF-NA : IIII-JJJJ+

↓ SCRL

CF-BN : VVVV-WWWW+
```

MW RECEPTION DISPLAY

XXXX: DN NO. WHICH HAS RECEIVED MW
YYYY: TERMINAL NO. WHICH HAS TRANSMITTED MW

MW TRANSMISSION DISPLAY

XXXX, YYYY, ZZZZ :
DN NO. WHICH HAS TRANSMITTED MW

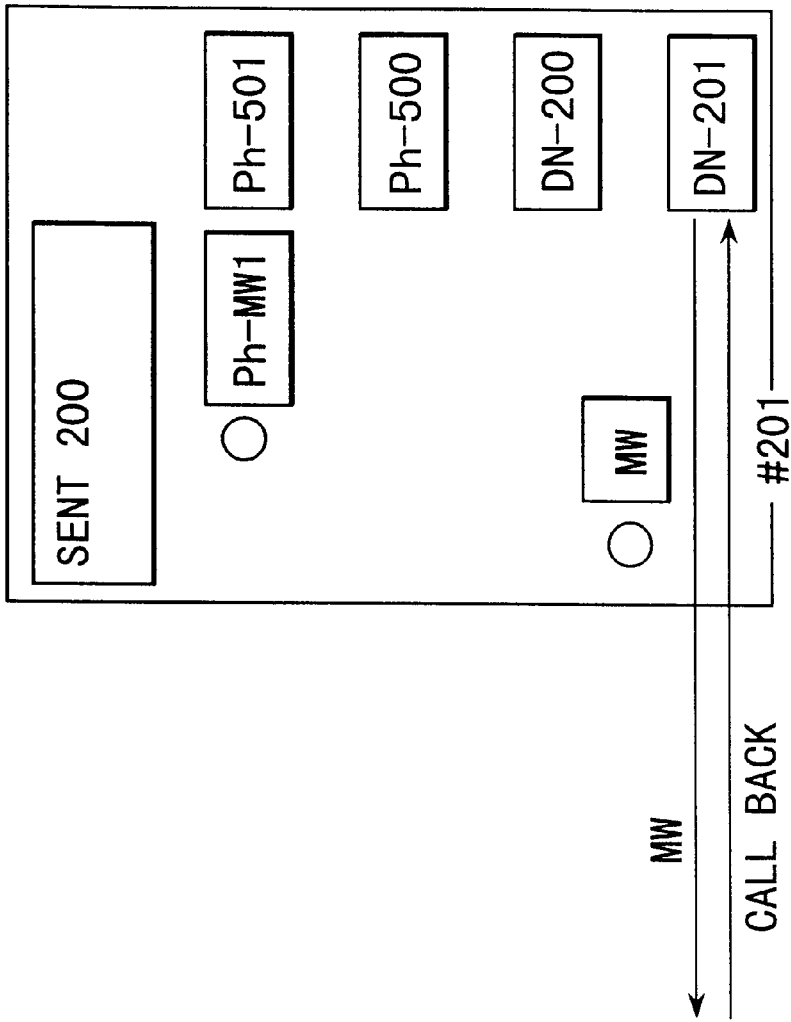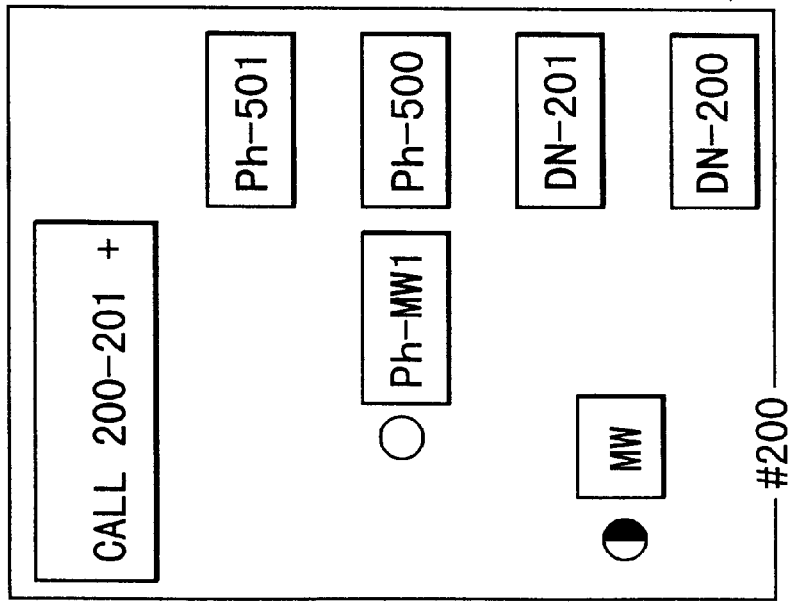
FIG. 67

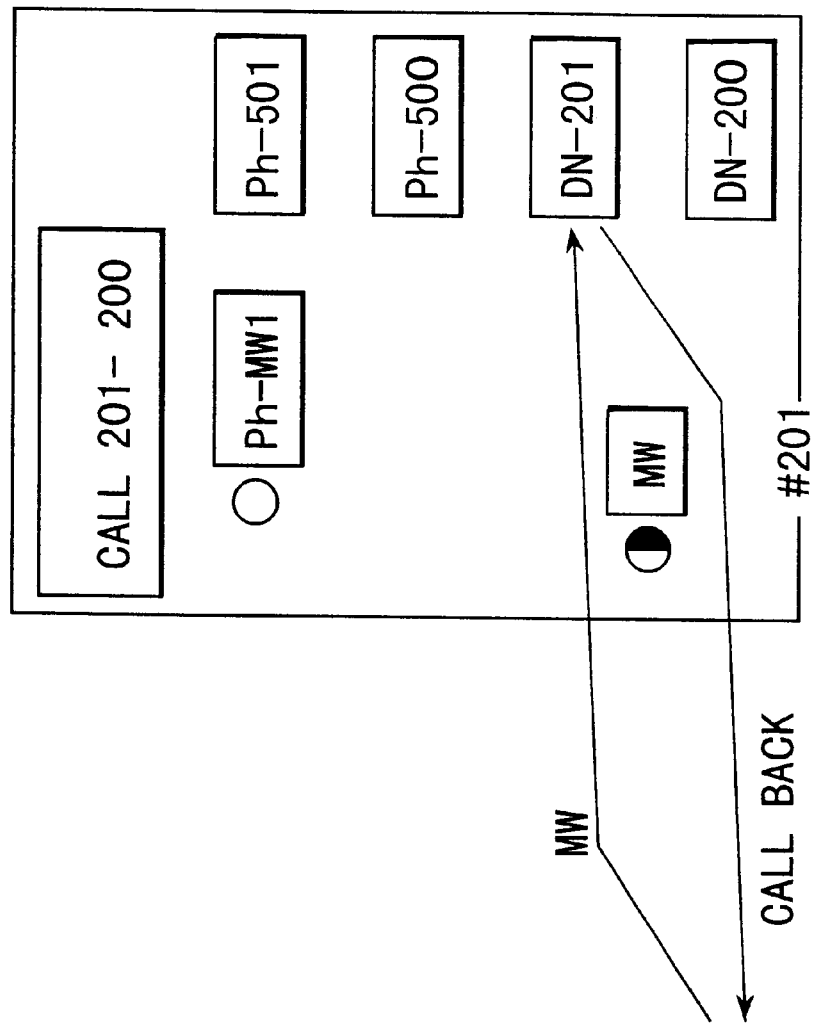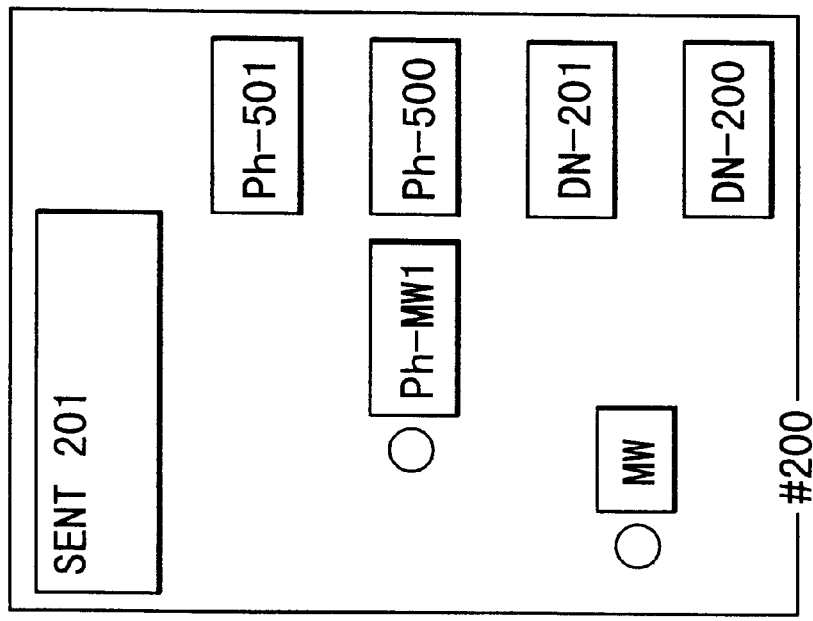
F I G. 70

MW
200
DN500
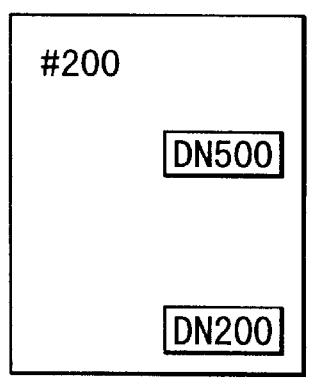
(#500)
DN200
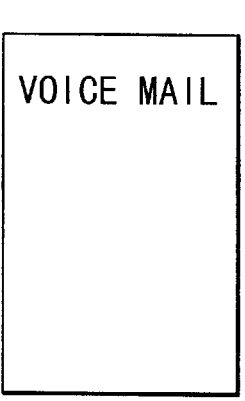
(#200)
VOICE MAIL
ID SETTING
ID OF PRIMARY DN
P-DN    +    #657    +    ID    #
ID OF PHANTOM DN
PH-DN   +    #657    +    ID    #
FIG. 73

SUMMARY OF OFFICE LINE LED DISPLAY

| CALLING/ CALL RECEPTION | | CO KEY / DN KEY | PRESENT | | | ABSENT | |
|---|---|---|---|---|---|---|---|
| | | | AVAILABLE | NOT AVAILABLE | | AVAILABLE | NOT AVAILABLE |
| CALLING | 7,9 CALLING | | CO | CALLING DISABLE | 7,9 CALLING DN | CALLING DISABLE |
| | CO KEY | | CO | CO | | – – | NO DISPLAY |
| | CO HOLDING | | CO | CO | | DN | |
| CALL RECEPTION | OFFICE LINE CALL RECEPTION (WITH DN CALL RECEPTION SETTING) | | CO, DN | | | DN | NO DISPLAY |
| | OFFICE LINE CALL RECEPTION (WITHOUT DN CALL RECEPTION SETTING) | | CO | CO | | NO DISPLAY | NO DISPLAY |
| | OFF-HOOK (APLS) | | CO | CO | | DN | NO DISPLAY |
| | T.Q CALL BACK | | CO | CO | | DN | T.Q QUEUING |
| | DID | | CO | CO | | NO DISPLAY | NO DISPLAY |

*: OPERATOR IS DISPLAYED ONLY FOR DN KEY BECAUSE OF ABSENCE OF CO KEY, THOUGH REMAINING TERMINALS HAVE THE SAME DISPLAY NOT ONLY FOR DN KEYS BUT ALSO FOR CO KEYS

F I G. 77

|  | TERMINAL = AVAILABLE | | TERMINAL = BUSY | |
| --- | --- | --- | --- | --- |
|  | WITH CALL RECEPTION SETTING | WITHOUT CALL RECEPTION SETTING | WITH CALL RECEPTION SETTING | WITHOUT CALL RECEPTION SETTING |
| CO CALL RECEPTION *1 | 1-CALLED | 1Hz | 1Hz | 1Hz |
| DID CALL RECEPTION *2 | 1-CALLED | 1Hz | 1Hz | 1Hz |
| OFFICE LINE R.T CALL RECEPTION *2 | 1-CALLED | 2Hz | 4Hz | 2Hz |
| OFFICE LINE R.T (PRIVACY) | 1-CALLED | ON | 4Hz | ON |
| CALL BACK | OPERATOR | EXCEPT OPERATOR | OPERATOR | EXCEPT OPERATOR |
| EXTENSION R.T CALL BACK | 10Hz-4Hz | 2Hz | 10Hz | 2Hz |
| HOLDING CALL BACK | 10Hz-4Hz | 2Hz | 10Hz | 2Hz |
| HOLDING | 4Hz | 2Hz | 4Hz | 2Hz |
| EXCLUSIVE HOLDING | 10Hz | ON | 10Hz | ON |
| T.Q. CALL BACK | 2Hz | ON | — | — |

FIG. 78

*1: OFFICE LINE CALL RECEPTION SETTING  *2: EXTENSION CALL RECEPTION SETTING

| TERMINAL STATE<br>TYPE OF CALLING | TERMINAL = AVAILABLE | | | TERMINAL = BUSY | |
|---|---|---|---|---|---|
| | WITH CALL RECEPTION SETTING | WITHOUT CALL RECEPTION SETTING | | WITH CALL RECEPTION SETTING | WITHOUT CALL RECEPTION SETTING |
| CO CALL RECEPTION *1 | I-CALLED | 1Hz | | 1Hz | 1Hz |
| DID CALL RECEPTION *2 | I-CALLED | 1Hz | | 1Hz | 1Hz |
| OFFICE LINE R.T CALL RECEPTION *2 | I-CALLED | 1Hz | | 1Hz | 1Hz |
| CALL BACK | OPERATOR | EXCEPT OPERATOR | | OPERATOR | EXCEPT OPERATOR |
| EXTENSION R.T CALL BACK | 10Hz-4Hz | 2Hz | | 10Hz | 2Hz |
| HOLDING CALL BACK | 10Hz-4Hz | 2Hz | | 10Hz | 2Hz |
| HOLDING | 4Hz | 2Hz | | 4Hz | 2Hz |
| EXCLUSIVE HOLDING | 10Hz | ON | | 10Hz | ON |
| T.Q. CALL BACK | 2Hz | ON | | --- | --- |

*1: OFFICE LINE CALL RECEPTION SETTING  *2: EXTENSION CALL RECEPTION SETTING

FIG. 79

| TRUNK | CALLED DN | CALLED TERMINAL | CALL RECEPTION RESULT |
|---|---|---|---|
| AVAILABLE | AVAILABLE | AVAILABLE | CALL RECEPTION DISPLAY FOR DN KEY OR CO KEY/OFFICE LINE RINGING TONE FOR DID, TONE CALLING FOR TIE/DISPLAY 1-Called ON LED |
| | | BUSY | 1-Hz DISPLAY FOR DN KEY OR CO KEY/NO RINGING TONE/RESTORE CALL RECEPTION FOR AVAILABLE TERMINAL |
| | NOT AVAILABLE | AVAILABLE | 1-Hz DISPLAY FOR CO KEY/SEND C.O.T TO TERMINAL WHICH IS USING DN AND HAS CALL RECEPTION SETTING/RESTORE CALL RECEPTION FOR AVAILABLE DN |
| | | BUSY | 1-Hz DISPLAY FOR CO KEY/SEND C.O.T TO TERMINAL WHICH IS USING DN AND HAS CALL RECEPTION SETTING/RESTORE CALL RECEPTION FOR AVAILABLE DN |
| BUSY | | | CALLING PARTY BT |

FIG. 80

CALL RECEPTION DURING CALL RECEPTION (AVAILABLE DN IS PRESENT)
ASSUME THAT CALL (DN200-2) IS RECEIVED BY TERMINAL #200 WHICH IS RECEIVING CALL (DN200-3)

|  | DN202 | DN201 | DN200-3 | DN200-2 | DN200-1 |
|---|---|---|---|---|---|
|  | ○ | ○ | ⊗HFU | ⊗TONE |  |
|  | ○ | ○ | ⊗HFU | ○→● TONE | ○→● HFU |
|  | ○ | ○ | OFFICE LINE CALL ⊗→● HFU RECEPTION | ○→⊗ TONE | OFFICE LINE CALL ⊗→● TONE RECEPTION |
| CALL RECEPTION RESULT OF TERMINAL #200 — DN200-3 | CONTINUE HFU | CONTINUE HFU | CONTINUE TONE CALLING | CONTINUE TONE CALLING | STOP RINGING TONE, AND SET LED IN 1-Hz ON STATE |
| DN200-2 | CALLING PARTY BT →②→ CALL RECEPTION DISPLAY ONLY ON LED | SILENT | CALLING PARTY BT →②→ CALL RECEPTION DISPLAY ONLY ON LED | SILENT | HFU CALLING LED I-CALLED |
| DN200-1 | TONE CALLING LED I-CALLED | TONE CALLING LED I-CALLED | TONE CALLING LED I-CALLED | TONE CALLING LED I-CALLED | TONE CALLING LED I-CALLED |
| STOP CALL RECEPTION OF DN200-3 | DN200-2 | — | HFU CALLING | HFU CALLING | TONE CALLING |
| DISCONNECT DN200-1 | — | — | — | — | — |

DN KEY OPERATION DURING CALL RECEPTION

200
| 500 |
| 200-1 |
| 200-2 |
| 200-3 |
| 200-4 |

ACTION OF REMAINING DNS IN DEPRESSING

| TYPE OF CALL RECEPTION OF DN200-1 | | | |
|---|---|---|---|
| TONE CALL RECEPTION | BOV DN200-1 LED: ⊗ | BOV DISCONNECT 200-2 DN200-1 LED: ⊗ | BOV ANSWER 200-4 DN200-1 LED: ⊗ |
| OFFICE LINE CALL RECEPTION | OFFICE LINE BOV DN200-1 LED: ◐ | OFFICE LINE BOV DISCONNECT 200-2 DN200-1 LED: ◐ | OFFICE LINE BOV ANSWER 200-4 DN200-1 LED: ◐ |
| HFU CALL RECEPTION | TERMINAL BT WHICH HAS CALLED 200-1 → ②  → BOV/OCA*1 | DISCONNECT 200-2 (DEPRESS ANOTHER KEY)/CONTINUE OCA CALLING | TERMINAL BT WHICH HAS CALLED 200-1 → ②  → BOV/OCA*1 |

⊗ → NOTE 1)
◉ (H.S SPEECH COMMUNICATION)

FIG. 88

CALL RECEPTION DURING SPEECH COMMUNICATION
ASSUME THAT CALL (DN200-2) IS RECEIVED BY TERMINAL #200 WHICH IS COMMUNICATING (DN200-1)

| | | DN201 | DN200-3 | DN200-2 | DN200-1 |
|---|---|---|---|---|---|
| | | ○ | ● | ● | ◉ |
| | | ○ | ● | ● | ◉ |
| | | ○→⊗ (BOV) | ○→⊗ BOV | ○→● OFFICE LINE BOV | ○ |
| TYPE OF CALL RECEPTION OF #200 | | HFU CALLING | TONE CALLING | OFFICE LINE CALL RECEPTION | |
| CALL RECEPTION RESULT OF #200 | DN200-2 | CALLING PARTY BT →②→ (BOV/DCA*1) | BOV | OFFICE LINE CALL RECEPTION BOV | |
| | DN200-1 | LED: I-CALLED | LED: I-CALLED | | CALLING PARTY BT →②→ SEND C.O.T TO TERMINAL WITH CALL RECEPTION SETTING *2) | CALLING PARTY BT →②→ SEND C.O.T TO TERMINAL WITH CALL RECEPTION SETTING *2) | CALLING PARTY BT →②→ SEND C.O.T TO TERMINAL WITH CALL RECEPTION SETTING *2) |
| DISCONNECT DN200-1 | | DN200-2 BOV→ TONE CALLING OR CONTINUE OCA WITHOUT LED | DN200-2 BOV→ TONE CALLING | DN200-2 RESTORE OFFICE LINE CALL RECEPTION LED I-CALLED | RESTORE TONE CALLING FOR DN200-1 LED I-CALLED | RESTORE TONE CALLING FOR DN200-1 LED I-CALLED | DN200-2 RESTORE OFFICE LINE CALL RECEPTION LED I-CALLED |

FIG. 90

| "AVAILABLE" INDICATION | ○ |
|---|---|
| ON | ● |
| I-Use | ⊙ |
| I-Called | ⊗ |
| 1Hz | ◐ |
| 2Hz | ◐ |
| 10Hz | ◐ |
| R.T CALL BACK | ⊕ |

FIG. 94

| KEYS TO BE DEPRESSED | EXAMPLE OF LCD DISPLAY |
|---|---|
| SPKR | PROGRAM= |
| 3 | |
| 9 | |
| HOLD | PROGRAM=39 |
| SPKR | 39 SELECT= |
| 0<br>0<br>0<br>#  } DESIGNATE PORT "000" | |
| x   SELECT KEY x | 39 SELECT=000<br>001 |
| # # 0 0 0<br>SET KEY CODE OF DN200 | 39 SELECT=000<br>## 000 |
| y   SELECT KEY y | |
| # # 5 0 0<br>SET KEY CODE OF DN500 | 39 SELECT=000<br>## 500 |
| HOLD | 39 SELECT=000<br>DATA PROGRAMED |
| SPKR | |
| # | |
| # | |
| HOLD | |

FIG. 102

| TERMINAL NUMBER | KEY TYPE | KEY CODE | | KEY TYPE | | |
|---|---|---|---|---|---|---|
| 200 | 0000 | 0000 | KEY 01 | 0000 | CO KEY |
| | 0001 | 0000 | 02 | 0001 | DN KEY |
| | | | 03 | | |
| | | | 04 | | |
| | | | 05 | | |
| | ⋮ | ⋮ | | | |
| | 0001 | 01F4 | 19 | | |
| | 0000 | 0013 | 20 | | |
| 201 | | | KEY 01 | | |
| | | | 02 | | |
| | | | 03 | | |
| | | | 04 | | |
| | | | 05 | | |
| | ⋮ | ⋮ | | | |
| | | | 19 | | |
| | | | 20 | | |
| 202 | | | KEY 01 | | |
| | ⋮ | ⋮ | | | |

FIG. 103

DIGITAL BUTTON TELEPHONE SYSTEM AND EXTENSION TERMINAL FOR THE SAME

TECHNICAL FIELD

The present invention relates to a digital key telephone system provided in a company or an office.

BACKGROUND ART

A digital key telephone system comprises a main unit connected to a public network or a private branch exchange and a plurality of digital key telephones connected to the extension lines of the main unit. The digital key telephone has a plurality of push button type keys. When these keys are depressed, calling the public network or the private branch exchange, answering a call, and speech communication between digital key telephones are allowed. The main unit processes not only a control signal but also a speech communication signal as a digital signal and executes calling processing/call reception processing of each digital key telephone by a stored program control scheme and switching processing by a time switch of the digital speech communication signal.

As one of analog communication networks provided in U.S.A. recently, there is a communication network for providing a service called, e.g., "CLASS (Custom Local Area Signaling Service)". The communication network for providing the CLASS service can superpose calling line identification information on a call signal and transmit it to the called subscriber.

When the digital key telephone system is connected to such a communication network, the main unit of the called digital key telephone system detects the first bell signal and then a modem signal. When calling line identification information is detected from the modem signal, the calling line identification information is transferred from the main unit to the called key telephone and displayed on the liquid crystal display device (LCD) of the key telephone. The user of the key telephone can recognize the calling line before off-hook by checking the calling line identification information displayed on the liquid crystal display device.

Conventionally, however, as the main function of the digital key telephone system using the calling line information notification service in the analog communication network such as the CLASS service, only the above-described calling line identification information display function is realized. Therefore, a demand has arisen for realization of a new and effective functional service using the CLASS service.

Another demand has arisen for expansion or realization of various support functions associated with wiring installation, a function of allowing a variety of call reception processing by adding a plurality of extension numbers to the digital key telephones, and a function of allowing a variety of communication processing operations using a personal computer combined with the digital key telephones.

DISCLOSURE OF INVENTION

It is an object of the present invention to provide a digital key telephone system capable of expanding or realizing various functions, e.g., realizing a more effective function using a calling line information notification service in an analog communication network.

In order to achieve the above object, according to the present invention, there is provided a digital key telephone system connected, through an office line, to an analog communication network having a function of transmitting a ringing signal including calling line identification information, accommodating a plurality of extension lines connected to extension terminals, and having a function of switching and connecting the office line to the plurality of extension lines or the extension lines to each other, comprising called party storage means storing information representing a correlation between a calling line and a called extension terminal in advance. By detecting the calling line identification information included in the ringing signal arriving from the analog communication network, the called extension terminal is determined on the basis of the detected calling line identification information and the information stored in the storage means, and call reception processing for the extension terminal is performed.

When called parties are registered in advance in correspondence with calling parties, an optimum extension terminal user can answer a call from a calling line. For example, a terminal for receiving and answering a call can be can be appropriately selected such that a person in charge directly answers a call from an important client, and a secretary answers calls from other clients.

In the present invention, when call reception processing is performed for the called extension terminal in response to arrival of the ringing signal, and the extension terminal does not answer the call, the calling line identification information detected from the ringing signal is stored in correspondence with the called extension terminal. When an operation of requesting call back is performed in the extension terminal which does not answer the call, call back processing is performed for the calling line on the basis of the stored calling line identification information. The calling line identification information is stored upon detecting restoration of the called office line during call reception processing.

If a call is received in the absence of the extension terminal user, the user can perform call back without the dialing operation only by performing the call back request operation. For this reason, the user operation associated with the call back operation can be simplified.

In the present invention, fault determination means using the calling line identification information is arranged. A detection result obtained when the calling line identification information included in the ringing signal is detected by the calling line identification information detection means is compared with that obtained when the calling line identification information is passed through the calling line identification information detection means together with the redundant data and detected by the fault determination means. With this operation, when a reception fault of the ringing signal is generated, determination processing is separately performed for each of the office line and the digital key telephone system.

With this arrangement, the fault occurrence position can be determined using the calling line identification information arriving from the analog communication network. As a result, separate fault determination can be relatively easily and properly performed, so a measure against the fault can be appropriately and quickly taken.

According to the present invention, there is also provided a digital key telephone system comprising an external communication interface with a plurality of serial communication ports for performing serial communication with external computer devices, and having a function of receiving function setting information sent from the external computer device through the external communication interface and setting a function of the digital key telephone system in accordance with the received function setting information, comprising function setting regulation means. While the function setting information is being received from an arbitrary one of the plurality of external computer devices, message information representing that function setting is disabled is transmitted to another external computer device, which is going to perform the function setting operation, and displayed, thereby regulating the function setting operation in another external computer device.

With this arrangement, the plurality of external computer devices are prevented from simultaneously performing function setting, so congestion of function setting processing from the plurality of external computer devices can be prevented.

When functions with different contents are set by the plurality of external computer devices, a function set by one of the external computer devices is preferentially operated in accordance with a predetermined rule. With this arrangement, even when a plurality of functions with inconsistent functions are set, the system can be prevented from erroneously operating.

In the present invention, the external communication interface comprises serial communication interface means for serially transmitting a digital signal to the external computer device, modem communication interface means for performing modem communication of a digital signal to the external computer device, and a switching circuit for switching between the serial communication interface means and the modem communication interface means. A communication request input before signal transmission to the external computer device is detected, and the switching circuit is controlled in accordance with the detection result to allow signal transmission to the external computer device as the other party of communication.

With this arrangement, data can be transmitted/received even to/from an external computer device connected to a serial communication interface such as an RS232C or an external computer device connected through a communication line such as an office line or extension line.

In the present invention, evaluation test control means for performing an evaluation test of the digital key telephone system in cooperation with the external computer device is arranged. In addition, the external communication interface comprises a first signal path for transmitting a signal sent from the external computer device, transferring the signal to the evaluation test control means, and transferring the signal looped back by the evaluation test control means to the external computer device, and a second signal path for looping back the signal sent from the external computer device to the external computer device without transferring the signal to the evaluation test control means. The first and second signal paths are switched by the text control means.

With this arrangement, text data returned through the first signal path and that returned through the second signal path are compared in the external computer device, thereby confirming whether the control circuit in the digital key telephone system properly operates.

According to the present invention, there is also provided a digital key telephone system having an external communication interface with a plurality of serial communication ports connected to external computer devices, wherein the external communication interface comprises a table memory which stores, in advance, information representing a relationship between the number of serial communication ports connected to external computer devices and transmission rates which can be set for each serial communication port. Every time an external computer device is connected to one of the plurality of serial communication ports, a transmission rate is assigned to the serial communication port on the basis of the information stored in the table memory such that a sum of transmission rates of the plurality of serial communication ports is not more than a predetermined total transmission capability.

In accordance with the number of external computer devices connected to the serial communication ports, the maximum transmission rate can always be assigned to each external computer device within the range under the condition at that time. Therefore, data transmission can always be performed by using the transmission capacity of the external communication interface at maximum, so a high transmission capacity utilization efficiency can be maintained.

In the present invention, in mounting units or connecting extension terminals, the power factor of each of the mounted units and connected extension terminals is detected, it is determined whether the sum value of the detected power factors of the units and extension terminals falls within a prescribed value, and the determination result is notified to a user. As the determination result notification means, when the sum value of the power factors of, e.g., extension terminals exceeds the prescribed value, a warning is issued to the extension terminal to be connected.

With this arrangement, even when the installer or the like is to erroneously connect a number of extension terminals beyond the prescribed power factor value, the installer is warned of it, so connection of a number of extension terminals beyond the prescribed power factor value can be prevented.

According to the present invention, there is also provided a digital key telephone system comprising a basic cabinet accommodating a control unit for switching/connection, and a plurality of extension cabinets accommodating a plurality of interface units each having an interface function to an office line and extension lines, the extension cabinets being stacked on the basic cabinet and connected to each other through a connection cable, wherein each extension cabinet comprises stacking position recognition means for recognizing a stacking position of a self frame on the basis of a predetermined signal sent from the basic cabinet. In accordance with the stacking position recognized by the stacking position recognition means, channel conversion between an interframe transmission channel for performing signal transmission to the basic cabinet and an intraframe transmission channel for performing signal transmission to each interface unit in the self frame is performed.

With this arrangement, transmission channel conversion processing is performed in accordance with the stacking position of each extension cabinet. That is, each extension cabinet can autonomously switch the channel at any stacking position. Since the extension cabinets can have a common arrangement, manufacturing of extension cabinets can be simplified, and the cost can be reduced by the mass production effect, as compared to the manufacture of a dedicated extension cabinet at each stacking position.

In the present invention, digital level conversion means for converting an input signal level of each time slot into a different signal level and outputting the signal to a time switch for switching and connecting the office line, the extension lines, and a tone generator, and level control means are arranged. In sending a tone signal from the tone generator to the office line or the plurality of extension lines, the gain of the digital level conversion means is changed in accordance with the state of the office line or extension line to which the signal is to be sent.

As a result, even when the tone signal is to be sent to a plurality of parties, the tone signal generated by one tone signal generator can be changed in level and sent in accordance with the destination. Since a plurality of tone signal generators for generating tone signals of different levels need not be arranged, the cost of the system can be reduced, and the reliability can be improved.

In the present invention, when the system has a camp-on function of, if a new call arrives at an extension line which is communicating, sending a camp-on tone from the main unit to the extension line which is communicating to notify the call reception, the camp-on tone is changed depending on whether the line at which the call arrives is the office line or the extension line.

When another call addressed to the extension terminal during communication is received, the user of the called extension terminal can identify the calling line, i.e., the office line or extension line, from the difference in camp-on tone, so the user can appropriately answer the call in accordance with the calling line.

As means for outputting the camp-on tone from the terminal, first means for a digital key telephone and second means for a standard telephone are selectively used. When the called terminal is a digital key telephone, the main unit sends a command for instructing generation of a camp-on tone and the type of the camp-on tone because the digital key telephone has a sound source for generating the tone. Upon receiving the command, the digital key telephone generates a camp-on tone of the designated type from the sound source and outputs the camp-on tone. To the contrary, when the called terminal is a standard telephone, the main unit generates the camp-on tone by itself because the standard telephone has no tone source. The camp-on tone is mixed or inserted into the reception signal and sent to the standard telephone.

With this arrangement, the camp-on tone can be generated independently of the terminal, i.e., the digital key telephone or the standard telephone.

In the present invention, when a directory number is assigned to each extension terminal, and a directory number retrieval operation is performed in the extension terminal in a predetermined procedure, the directory number assigned to the extension terminal is read out from directory storage means and transmitted to the extension terminal which has performed the directory number retrieval operation to display the directory number.

With this arrangement, even when the user does not know or forgets the directory number of the self extension terminal, the directory number can be easily confirmed, as needed.

According to the present invention, there is also provided a digital key telephone system comprising a main unit connected to a communication network through an office line, accommodating a plurality of extension lines, and having at least a function of switching and connecting the office line to the plurality of extension lines or the extension lines to each other, and a plurality of extension terminals connected to the plurality of extension lines of the main unit, wherein when a request for knowing the contents of an incoming call is sent from one of the plurality of extension terminals, where the incoming call waiting for call reception processing is present, the main unit supplies call reception information representing the contents of the incoming call waiting for call reception processing to the extension terminal of the request source in accordance with the request.

With this arrangement, when a plurality of incoming calls are simultaneously addressed to the self extension terminal, the user can confirm the contents of these incoming calls and answer the calls in the descending order of degrees of importance. When a new incoming call is received during speech communication, the contents of the incoming call are confirmed while continuing speech communication. If the user determines that the new call is more important, the call during speech communication is held or ended. The user can immediately answer the important incoming call.

As a specific arrangement for realizing the call reception information notification function, a request for knowing the contents of the incoming call is sent from the digital key telephone, and the call reception information sent from the main unit is displayed on the digital key telephone. Alternatively, a computer device is connected to the digital key telephone through an interface. A request for knowing the contents of the incoming call is sent from the computer device, and the call reception information sent from the main unit is displayed on the computer device.

As means for sending the request for knowing the contents of the incoming call addressed to the self terminal, the request is transmitted every time a request operation is performed by a user, or the request is automatically transmitted at a predetermined timing.

When a plurality of incoming calls are addressed to one extension terminal, and every time a request for knowing contents of an incoming call is sent from the extension terminal, call reception information of one of the plurality of incoming calls is sequentially selected and supplied. Alternatively, pieces of information of all of the plurality of incoming calls may be supplied in response to one request.

According to the present invention, there is also provided a digital key telephone system comprising call park control means for, when a call park request is input in an extension terminal which is communicating, holding a call to the extension terminal in correspondence with an orbit number, and in this state, when another extension terminal accesses the orbit number, connecting the extension terminal to the held call, wherein the call park control means holds the orbit number until the call is ended in holding the call subjected to call park in correspondence with the orbit number, and when a repark request for the call is generated while the call is continuously received, the call is held in correspondence with the orbit number at which the call is being held.

With this arrangement, when a repark request is generated, the call to be subjected to call park at this time is held in correspondence with the same orbit number as that in the preceding call park. For this reason, a call is prevented from being held in correspondence with different orbit numbers.

According to the present invention, there is also provided a digital key telephone system having a computer connection interface in at least one of extension terminals wherein an operation mode change request sent from a computer is transferred to a main unit through the computer connection interface, the main unit determines whether the transferred mode change request is appropriate and supplies the determination result to the computer connection interface which has transferred to the mode change request, and the computer connection interface comprises performs mode change processing in response to the mode change request from the computer on the basis of the supplied determination result.

With this arrangement, when a mode change request is issued from the computer, the main unit always determines whether the request is appropriate. Only when it is determined that the request is appropriate, the computer connection interface performs mode change setting. Therefore, the computer connection interface can prevented from being set in a mode which is not prepared in the main unit.

For example, assume that the user sends a request for changing the mode to a computer telephoni mode from the computer to the computer connection interface to send a call using the computer. If the main unit does not have the computer telephoni mode, the main unit returns no mode change enable notification. For this reason, the computer telephoni mode is not set for the computer connection interface. Even for an appropriate mode change request, when the operation state in the main unit cannot currently cope with the mode change, the main unit returns no mode change enable notification.

According to the present invention, there is also provided a digital key telephone system having a plurality of line selection keys, in an extension terminal, each of which corresponds to the office line or extension line, wherein when the office line or the extension line corresponding to one of the plurality of line selection key is held, and in this state, a request for displaying information associated with the held office line or extension line is input in an extension terminal, the information associated with the held office line or extension line is selectively displayed on the extension terminal in accordance with the display request, and synchronized with the display operation, information representing the line selection key corresponding to the held office line or extension line is displayed.

As the means for displaying the information representing the line selection key, an indication lamp such as an LED provided in correspondence with the line selection key is turned on, or the number of the line selection key is displayed on a display device such as an LCD in correspondence with the number of the held line.

Display control of the information representing the held line and the information representing the line selection key can be performed by the main unit or the extension terminal device.

With this arrangement, the information associated with the held office line or extension line and the information representing the line selection key corresponding to the office line or extension line are displayed in correspondence with each other. For this reason, the user can always properly recognize the line selection key corresponding to the held line.

This arrangement is especially effective when a plurality of directory numbers are added to one extension terminal. When a plurality of lines with different directory numbers are being held, the user performs the display operation to, e.g., scroll the pieces of information of the held lines. Unless the user memorizes the correspondence between the pieces of displayed line information and the line selection keys, the user cannot know it. However, in the present invention, in synchronization with the scroll operation, the information of a line selection key corresponding to the displayed line is displayed, and the user can properly know the correspondence between the displayed line information and the line selection key.

BRIEF DESCRIPTION OF DRAWINGS

FIG. 15 is a view showing a table memory storing the correlation between calling line numbers and sound generation telephone numbers;

FIG. 16 is a view showing an example of display of CLASS information on the digital key telephone;

FIG. 17 is a view showing an example of display of CLASS information in a repeater;

FIG. 20 is a flow chart showing the procedure and contents of function setting determination processing upon powering on;

FIG. 25 is a table showing the correlation between the number of ports in use and the data transmission rate in the RSIU;

FIG. 26 is a table showing the correlation between the use purpose of a serial communication port and the communication scheme;

FIG. 35 is a view showing the correlation between each extension cabinet and the number of channels of downward link data from the basic cabinet;

FIG. 39A is a view showing the first operation and display example associated with an inquiry for a directory number;

FIG. 39B is a view showing the second operation and display example associated with an inquiry for a directory number;

FIG. 39C is a view showing the third operation and display example associated with an inquiry for a directory number;

FIG. 39D is a view showing the fourth operation and display example associated with an inquiry for a directory number;

FIG. 41 is a view showing an example of a park reservation table to be used for call park;

FIG. 42 is a flow chart showing a call park control procedure by the RCTU;

FIG. 50 is a view schematically showing the first half of an extension operation using DNs;

FIG. 53 is a view schematically showing an ACB operation using the DNs;

FIG. 54 is a view schematically showing an office line calling operation and a ring transfer operation using the DNs;

FIG. 55 is a view schematically showing the first half of an office line calling operation and a conference operation using the DNs;

FIG. 57 is a table showing an example of LED display of the DN keys;

FIG. 58 is a table showing an operation performed when no DN is available or when no DN key is available;

FIG. 59 is a table showing an example of processing extension call reception during extension call reception using the DNs;

FIG. 60 is a table showing an example of DND processing during call reception;

FIG. 67 is a view showing an operation of receiving message waiting to a primary DN;

FIG. 70 is a view showing an operation of transmitting message waiting from a primary DN;

FIG. 73 is a view showing an ID sending operation to a voice mail in message waiting;

FIG. 77 is a table showing the display example of office line LEDs;

FIG. 78 is a table showing patterns of a display operation when "I-Called" is displayed for a primary line;

FIG. 79 is a table showing patterns of a display operation when call reception display is performed on a designated DN independently of the presence/absence of a CO key upon receiving a call;

FIG. 80 is a table showing the summary of operations in the busy state;

FIG. 86 is a view showing the DN call reception operation during call reception when a DN is available;

FIG. 87 is a view showing an operation of the DN key during call reception;

FIG. 88 is a view showing the DN call reception operation during speech communication;

FIG. 90 is a view showing the DN call reception operation during speech communication when no DN is available;

FIG. 94 is a table showing the correlation between operations using the DN keys and displayed symbols;

FIG. 102 is a view for explaining the procedure of function setting for keys of the DKT/EKT;

FIG. 103 is a view showing an example of the key arrangement area map in the DKT/EKT;

BEST MODE OF CARRYING OUT THE INVENTION

Figure 91:
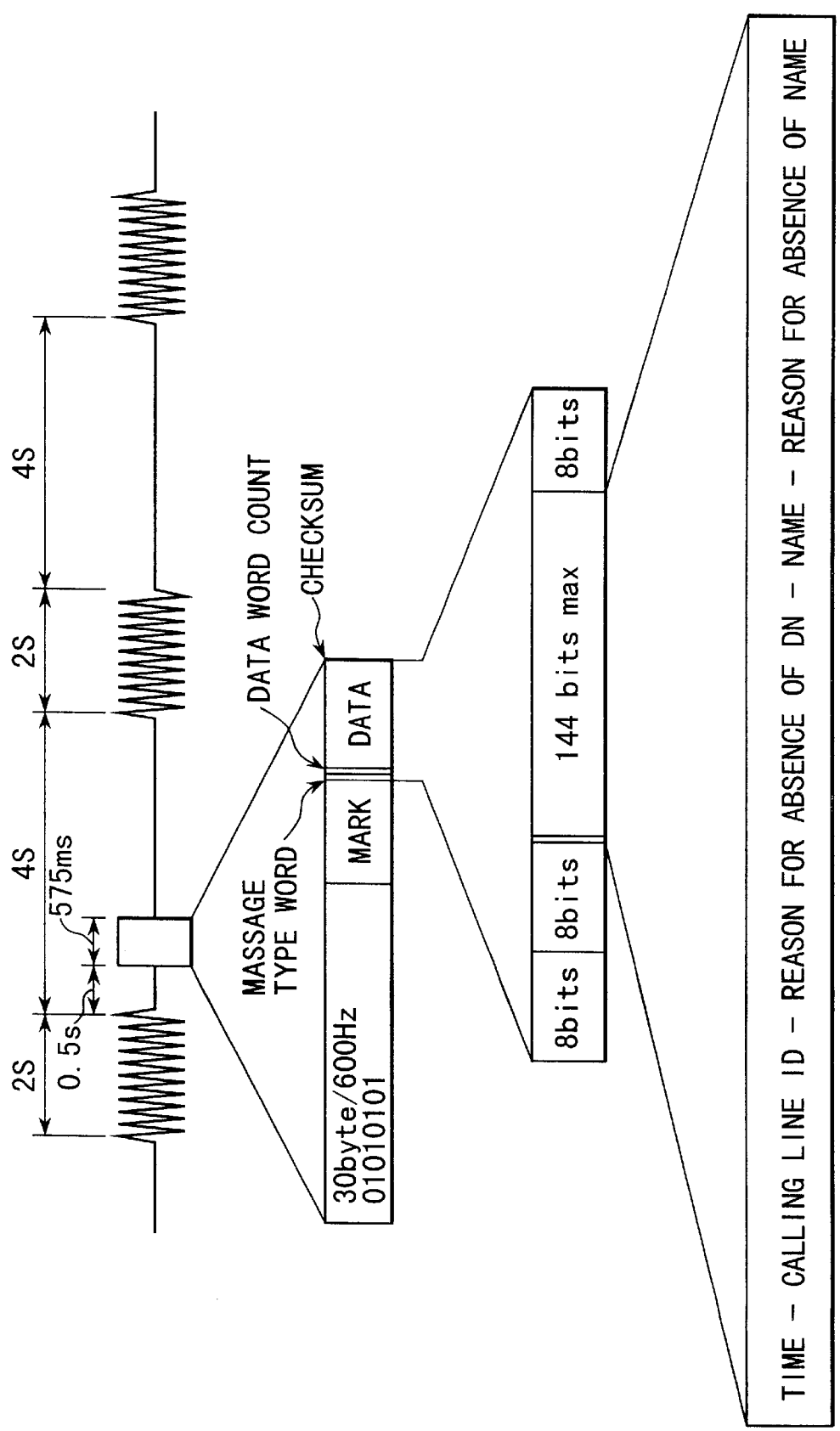
FIG. 91 is a view showing the transmission format of calling line identification information sent from a public network using a CLASS service.

FIG. 91 is a view showing a signal format used in a communication network using a CLASS service. A modem signal is inserted into the interval between the first bell signal and the second bell signal of a ringing signal. This modem signal has a format in which a synchronous signal consisting of a repetitive pattern of "01" is arranged at the start position, a mark signal, a message type word, a data word count, and a data portion sequentially follow the synchronous signal, and a checksum is arranged at the last position. Calling line identification information is inserted into the data portion. The calling line identification information contains "time", i.e., date and time, "calling line ID", "reason for absence of DN", "name", and "reason for absence of name".

Figure 1:
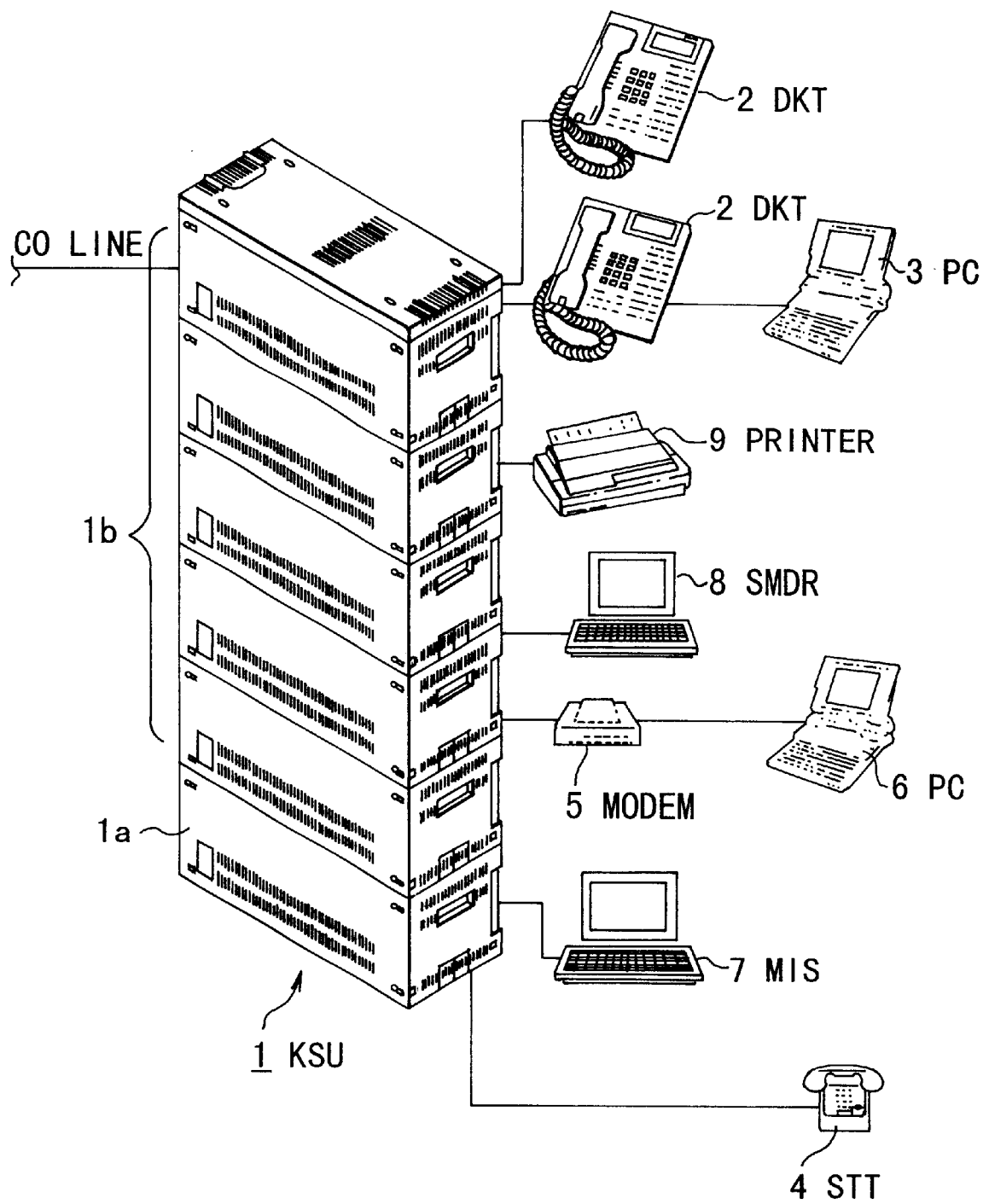
FIG. 1 is a view showing the outer appearance of a digital key telephone system according to an embodiment of the present invention.

FIG. 1 is a view showing the outer appearance of a digital key telephone system according to an embodiment of the present invention.

This system comprises a main unit (KSU) 1 connected to an analog public network (PSTN) (not shown) through a subscriber line (CO line), digital key telephones (DKTS) 2 connected to the extension lines as extension terminals, a personal computer (PC) 3, a standard telephone (STT) 4, a personal computer (PC) 6 connected to the main unit 1 through a modem 5 as an external device, a communication information management unit (MIS) 7 for accumulating/managing communication information, and a communication management recording unit (SMDR) 8 for printing a communication management record or the like.

The main unit 1 is constituted by stacking one basic cabinet 1a and a plurality of (five in FIG. 1) extension cabinets 1b. The basic cabinet 1a and the extension cabinets 1b are connected through data cables (not shown). The basic cabinet 1a mainly incorporates a control unit in addition to a power supply unit. Each extension cabinet 1b mainly incorporates various interface units in addition to a power supply unit. Each unit has a card shape and is inserted into a slot on the mother board of each frame.

Figure 2:
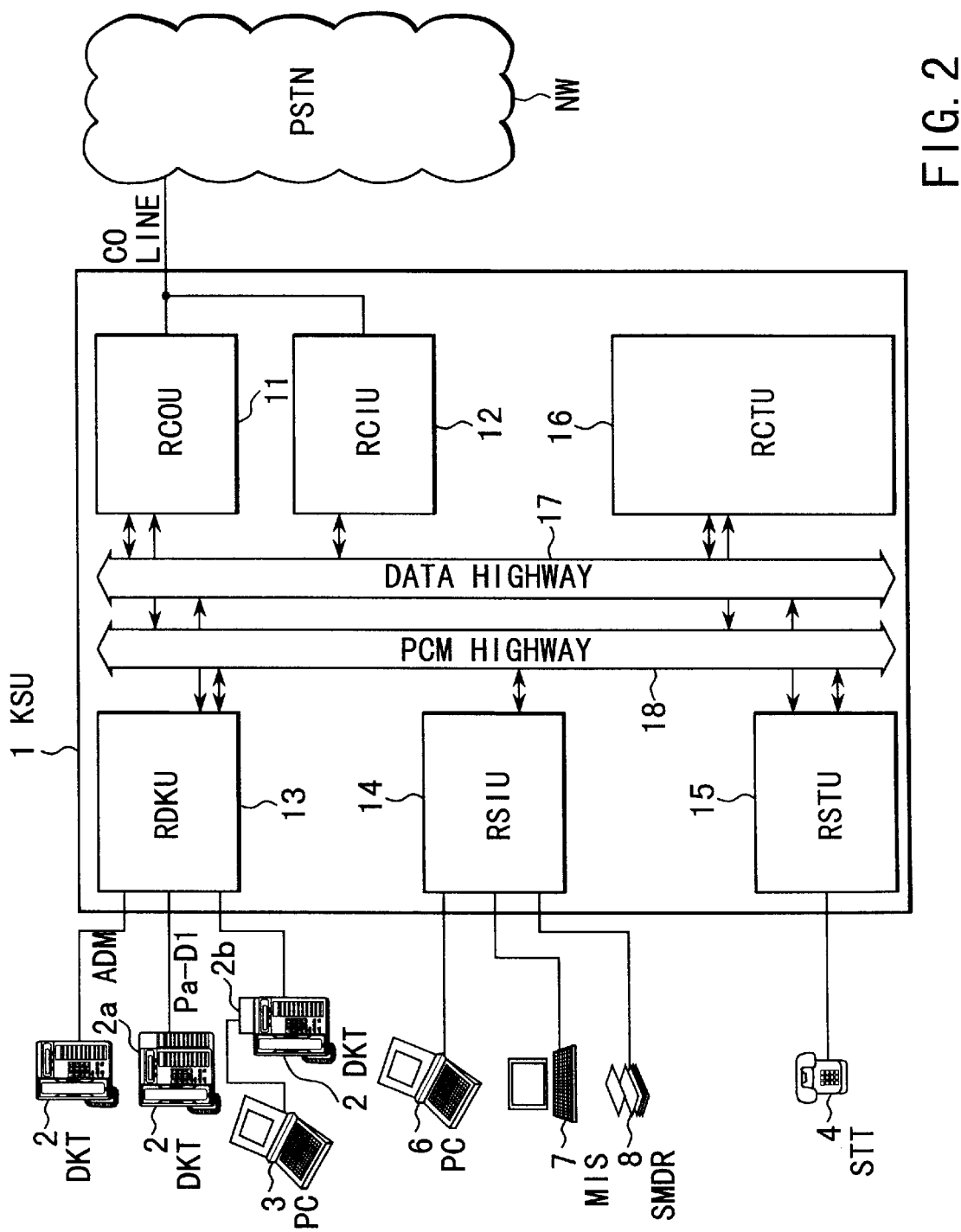
FIG. 2 is a block diagram showing the arrangement of a main unit in the system shown in FIG. 1.

FIG. 2 is a block diagram showing the arrangement of the main unit 1.

The main unit 1 comprises an office line interface 11 (RCOU), a calling line identification information interface unit (RCIU) 12, a digital key telephone interface unit (RDKU) 13, a serial communication control unit (RSIU) 14, a standard telephone interface unit (RSTU) 15, and a control unit (RCTU) 16. The interface units 11 to 15 are connected to the control unit 16 through a data highway 17 and a PCM highway 18. The data highway 17 is used to perform control data transfer between the units. The PCM highway 18 is used to transmit a digital speech communication signal between the units.

The office line interface 11 of the main unit 1 also has a leased line, a private branch exchange (PBX), and an interface (not shown) connected to another key telephone system.

The central office line interface unit (RCOU) 11 performs an office line interface operation for an analog public network NW, e.g., call reception detection, polarity inversion detection, opening/closing of a DC loop, dial sending, or the like under the control of the control unit 16, and also performs processing of converting an analog speech signal arriving via the subscriber line (CO line) into a PCM signal or processing of converting a PCM signal transferred from the control unit 16 into an analog speech signal and sending the speech signal to the subscriber line.

Figure 3:
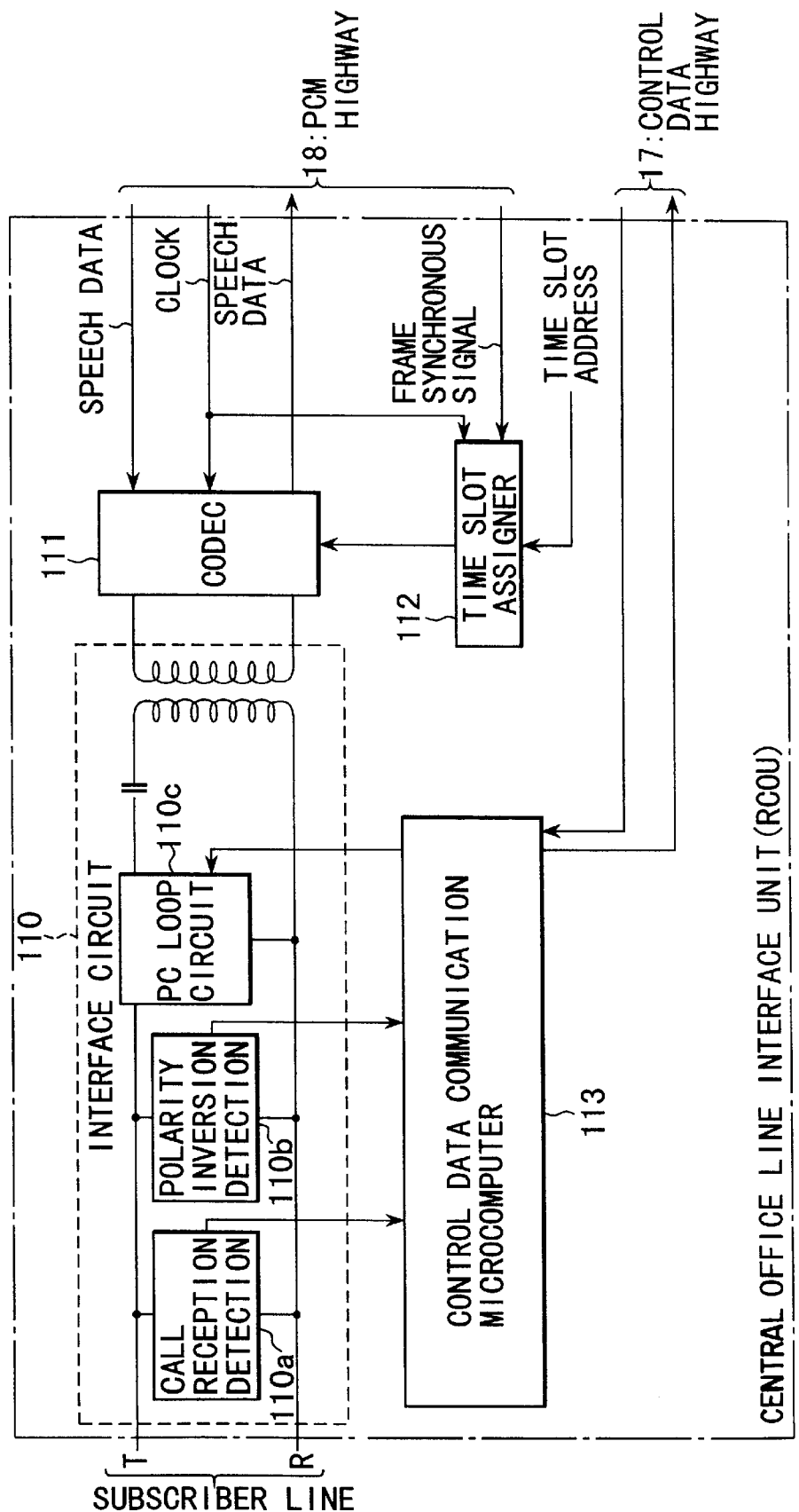
FIG. 3 is a circuit diagram showing the arrangement of an RCOU in the main unit shown in FIG. 2.

FIG. 3 is a circuit diagram showing the arrangement of the RCOU 11. As shown in FIG. 3, the RCOU 11 comprises an interface circuit 110, a codec section 111, a time slot assigner 112, and a control data communication microcomputer 113. The interface circuit 110 has a call reception detection circuit 110a connected to the subscriber line, a polarity inversion circuit 110b, and a DC loop circuit 110c. The call reception detection circuit 110a detects a call signal arriving from the analog public network NW via the subscriber line. The polarity inversion circuit 110b detects polarity inversion which occurs on the subscriber line during the call connection process. The DC loop circuit 110c closes the DC loop in calling, transmits a dial pulse, and opens the DC loop at the end of speech communication.

The codec section 111 has an A/D converter and a D/A converter to perform PCM coding processing of converting a transmission speech signal into PCM speech data and PCM decoding processing of converting received PCM speech data into an analog reception speech signal.

The time slot assigner 112 determines the timing of speech data transmission between the codec section 111 and the PCM highway 18 on the basis of a predetermined time slot address, and a frame synchronous signal and clock signal from the PCM highway 18, and notifies the codec section 111 of this timing. The codec section 111 transmits/ receives PCM speech data to/from the PCM highway 18 at the timing designated by the time slot assigner 112.

The control data communication microcomputer 113 monitors detection signals from the call reception detection circuit 110a and the polarity inversion circuit 10b and controls DC loop opening/closing and dial pulse transmission in the DC loop circuit 110c. The control data communication microcomputer 113 transmits/receives control data associated with call reception detection, polarity inversion detection, DC loop opening/closing, and dial pulse transmission to/from the control unit 16 through the control data highway 17.

Figure 4:
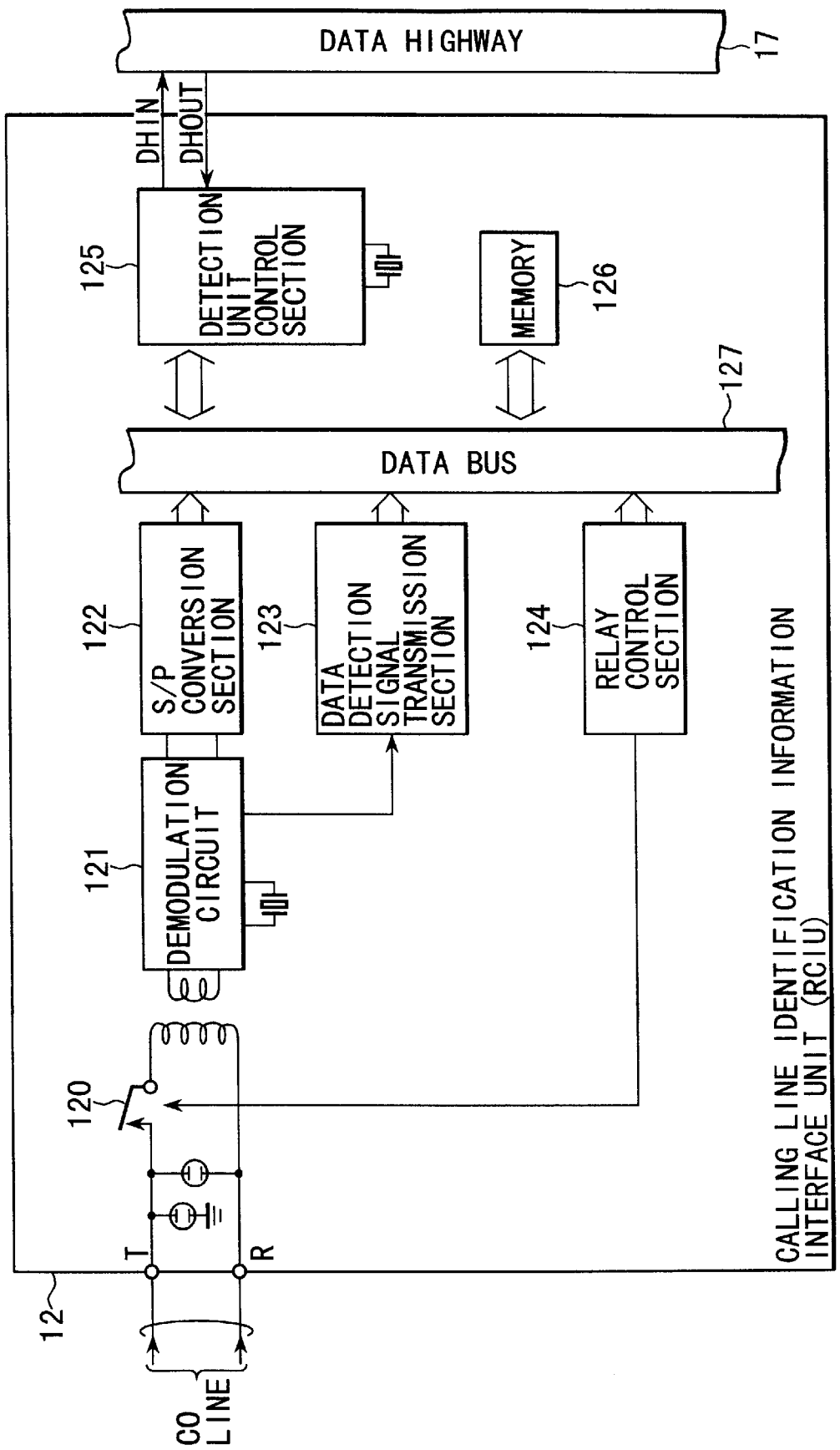
FIG. 4 is a circuit diagram showing the arrangement of an RCIU in the main unit shown in FIG. 2.

The calling line identification information interface unit (RCIU) 12 interfacing to the subscriber line has an arrangement shown in FIG. 4. The RCIU 12 comprises a relay 120, a demodulation circuit 121, a serial/parallel conversion section 122, a data detection signal transmission section 123, a relay control section 124, a detection unit control section 125, and a memory 126. The serial/parallel conversion section 122, the data detection signal transmission section 123, the relay control section 124, and the memory 126 are connected to the detection unit control section 125 through an internal data bus 127.

The demodulation circuit 121 receives a modulated signal (notification data) arriving from the analog public network NW through the subscriber line (CO line) and demodulates the signal to detect calling line number identification information (caller ID). The serial/parallel conversion section 122 converts the calling line identification information output from the demodulation circuit 121 as a serial signal into a parallel signal. The data detection signal transmission section 123 sends the calling line identification information output from the demodulation circuit 121 to the internal data bus 127. This notification data is transferred from the detection unit control section 125 to the control unit 16 through the data highway 17.

The relay 120 is used to disconnect the RCIU 12 from the subscriber line. The relay control section 124 controls the relay 120 to disconnect the RCIU 12 from the subscriber line and match the impedance in dial sending or speech communication.

The detection unit control section 125 controls the calling line number detection unit 12. The memory 126 is used as an external storage section of the detection unit control section 125.

FIG. 4 shows only one set of units. When a plurality of CO lines are led to the main unit 1, the relay 120, the demodulation circuit 121, the serial/parallel conversion section 122, the data detection signal transmission section 123, and the relay control section 124 of the above circuits are arranged in units of CO lines. That is, the RCIU 12 incorporates circuits equal in number to the subscriber lines.

Figure 5:
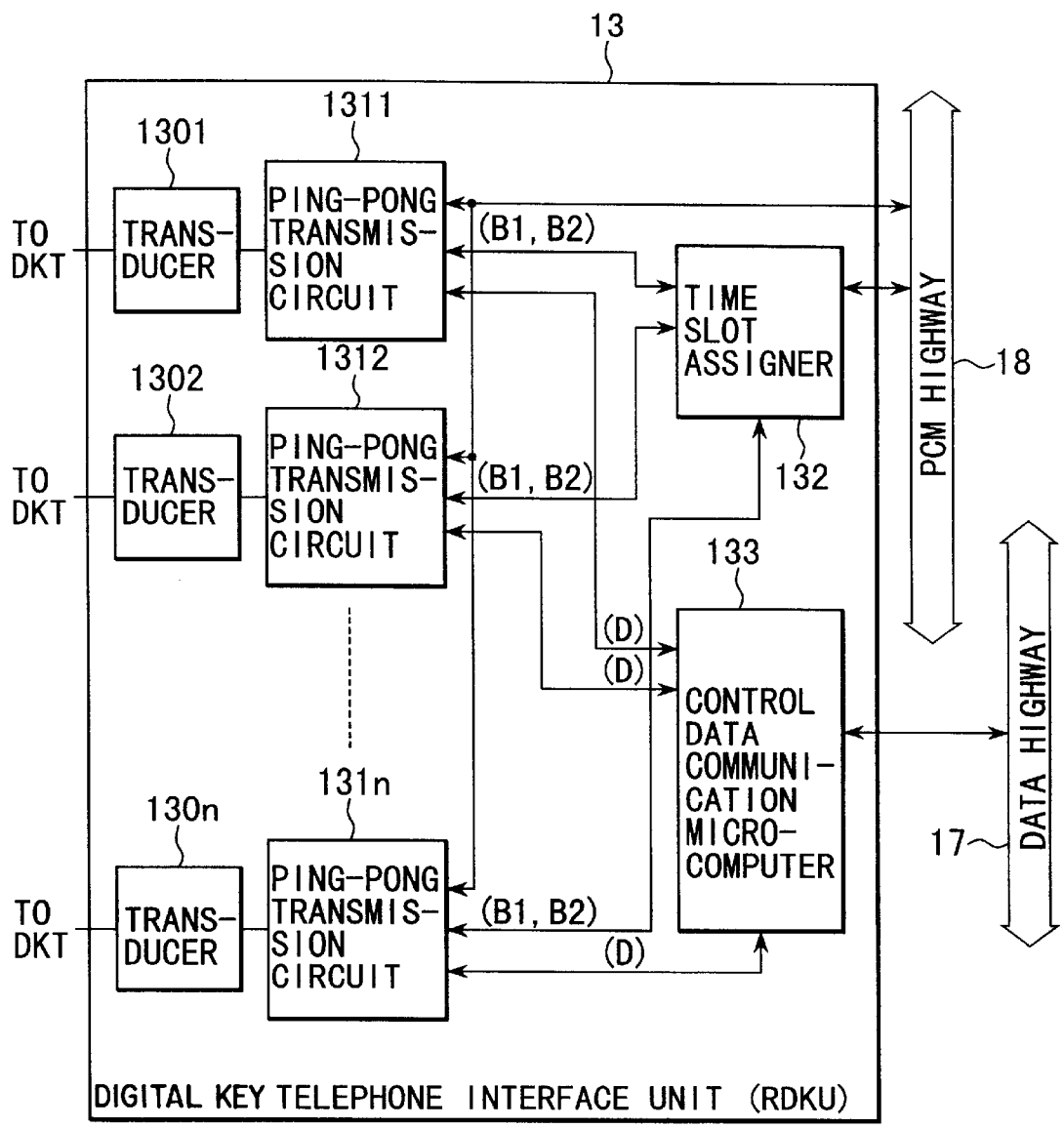
FIG. 5 is a circuit diagram showing the arrangement of an RDKU in the main unit shown in FIG. 2.

The digital key telephone interface unit (RDKU) 13 as an interface between the main unit 1 and each digital key telephone (DKT) 2 has an arrangement shown in FIG. 5.

The RDKU 13 has ping-pong transmission circuits 1311 to 131n corresponding to the number of extension lines. Each of the ping-pong transmission circuits 1311 to 131n performs ping-pong transmission of speech or information terminal data and control data between the RDKU 13 and a corresponding one of the digital key telephones 2 by using a time division channel of a 2B+D scheme, i.e., having two B channels (B1 and B2) with a transmission rate of 64 kbps and one D channel with a transmission rate of 16 kbps. The ping-pong transmission circuit has a 2B+D generation section and a 2B+D separation section.

The 2B+D generation section synthesizes speech data and information terminal data on downward link channels B1 and B2 from the PCM highway 18 and control data on a downward link channel D from a control data communication microcomputer 133 into a data packet with a 2B+D format and transmits the data packet to each digital key telephone 2. The 2B+D separation section separates an upward link data packet arriving from each digital key telephone 2 into speech and information terminal data on the upward link channels B1 and B2 and control data on the upward link channel D and transfers the data to the PCM highway 18 and the control data communication microcomputer 133.

The channel B1 is assigned to speech data transmission to each digital key telephone 2 while the channel B2 is assigned to transmit information terminal data when an information terminal such as a personal computer is connected to each digital key telephone 2.

A time slot assigner 132 receives a frame synchronous signal and clock signal from the PCM highway 18 and notifies the ping-pong transmission circuits 1311 to 131n of the timing for transmitting/receiving upward and downward link data on the B channel to/from the PCM highway 18. Therefore, each of the ping-pong transmission circuits 1311 to 131n directly accesses the PCM highway 18 at the timing designated by the time slot assigner 132 to transmit/receive upward and downward link data at a transmission rate of 2.048 Mbps.

The control data communication microcomputer 133 monitors D channel data transmitted/received by the ping-pong transmission circuits 1311 to 131n and controls to transmit/receive the D channel data to/from the control unit 16 through the data highway 17.

Figure 6:
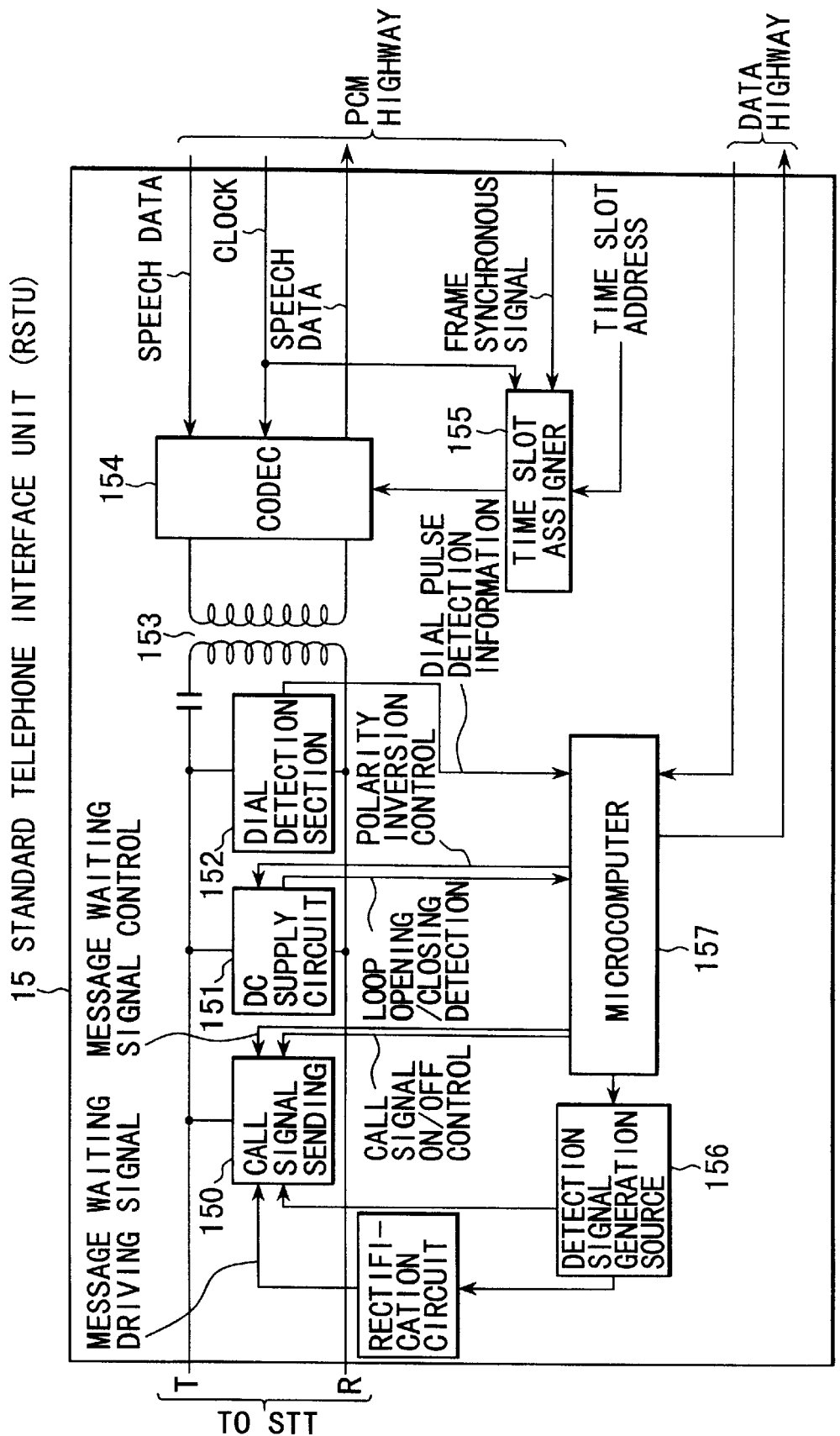
FIG. 6 is a circuit diagram showing the arrangement of an RSTU in the main unit shown in FIG. 2.

The standard telephone interface unit (RSTU) 15 as an interface between the main unit 1 and the standard telephone 4 has an arrangement shown in FIG. 6. The RSTU 15 comprises a call signal sending circuit 150, a DC supply circuit 151, and a dial detection section 152. The call signal sending circuit 150 sends a 16-Hz call signal generated by a call signal generation source 156 to the standard telephone 4. The DC supply circuit 151 has a function of detecting opening/closing the DC loop between the RSTU 15 and the standard telephone 4 and supplies the detection signal to a microcomputer 157. The DC supply circuit 151 also has a function of feeding a prescribed DC voltage to the standard telephone 4 when the DC loop is closed and inverting the polarity of this DC voltage under the control of the microcomputer 157. The dial detection section 152 detects a dial pulse sent from the standard telephone 4 and supplies the detection signal to the microcomputer 157.

The RSTU 15 also has a codec 154, and a time slot assigner 155 for designating the operation timing of the codec 154. The codec 154 receives a transmission speech signal sent from the standard telephone 4 through a transducer 153, converts the speech signal into a PCM signal, and sends the PCM speech data to the PCM highway 18. The codec 154 also converts speech data sent from the PCM highway 18 into an analog speech signal and transmits the speech signal to the standard telephone 4 through the transducer 153. The time slot assigner 155 determines the timing of speech data transmission between the codec 154 and the PCM highway 18 on the basis of a frame synchronous signal and clock signal from the PCM highway 18 and designates the timing for the codec 154.

The microcomputer 157 ON/OFF-controls a call signal to the call signal sending circuit 150, monitors DC loop opening/closing detection and controls polarity inversion in the DC supply circuit 151, and monitors dial pulse detection in the dial detection section 152. The microcomputer 157 also transmits/receives control data to/from the control unit 16 through the data highway 17.

Figure 7:
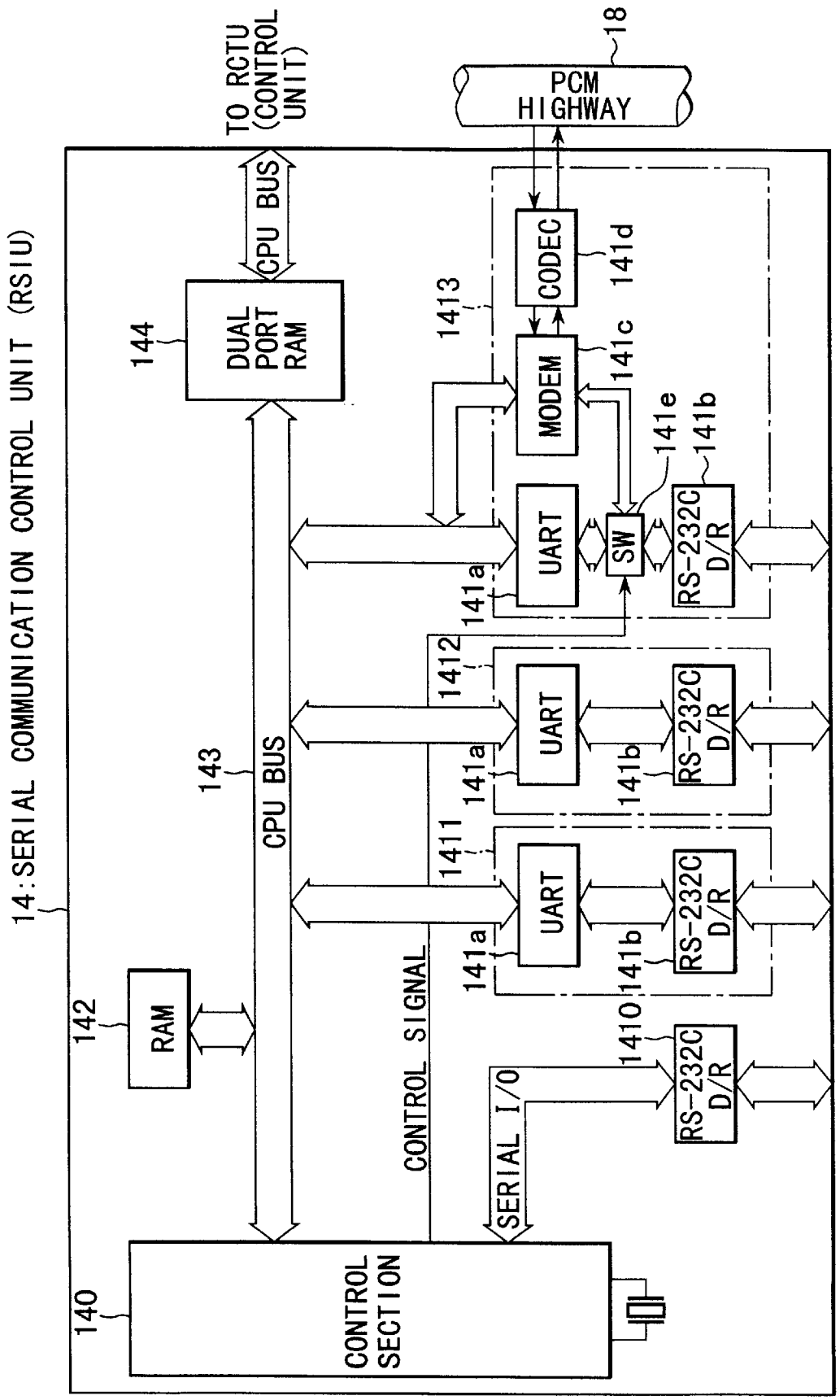
FIG. 7 is a circuit diagram showing the arrangement of an RSIU in the main unit shown in FIG. 2.

The serial communication control unit (RSIU) 14 for connecting an external information device such as a personal computer, the communication management recording unit (SMDR) 8, and a printer 9 to the main unit 1 has an arrangement shown in FIG. 7. The RSIU 14 has a plurality of (four in FIG. 7) serial communication ports 1410 to 1413 and a control section 140. Of the serial communication ports 1410 to 1413, the serial communication port 1410 has only an RS232C driver/receiver (D/R) and is directly connected to the serial I/O of the control section 140. Each of the serial communication ports 1411 and 1412 has an RS232C driver/receiver (D/R) 141b and an asynchronous transfer circuit (UART: Universal Asynchronous Receiver Transmitter) 141a and connects an external information device to a CPU bus 143 of the control section 140 to transfer data.

The serial communication port 1413 has not only an RS232C interface function but also a modem interface function. The serial communication port 1413 has a modem 141c, a codec 141d, and a switching circuit 141e in addition to the RS232C driver/receiver 141b and the UART 141a. The modem 141c and the codec 141d are used for data transmission between the RSIU 14 and the PCM highway 18. The switching circuit 141e switches connection between the UART 141a, the RS232C driver/receiver 141b, and the modem 141c in accordance with a switching control signal from the control section 140.

The control section 140 is constituted by a one-chip CPU and transmits/receives control data to/from the control unit 16 through the CPU bus 143 having a dual port RAM 144. The control section 140 also controls to transfer communication data transmitted/received by the serial communication ports 1410 to 1413 to another unit in the main unit 1.

Figure 8:
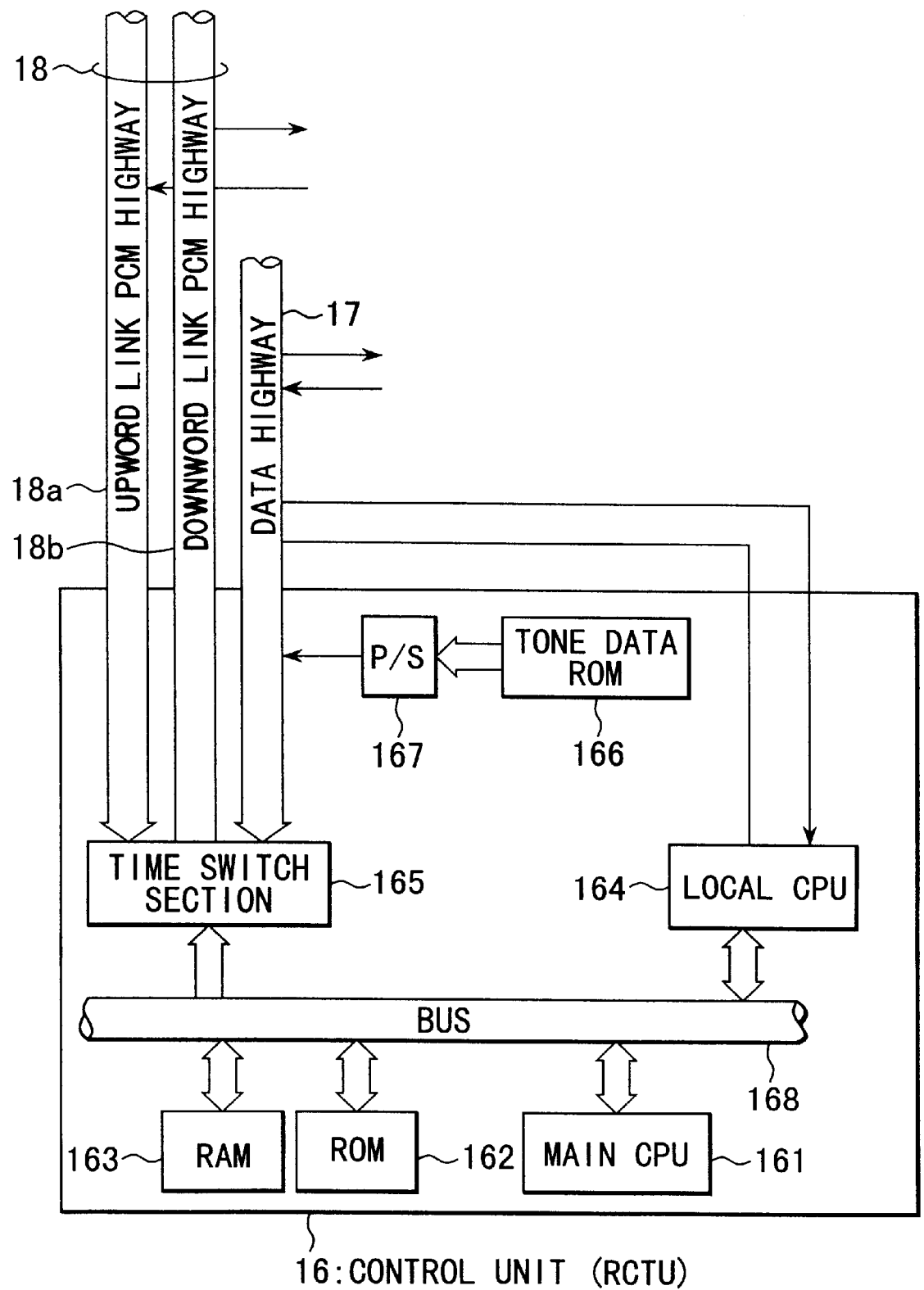
FIG. 8 is a circuit diagram showing the arrangement of an RCTU in the main unit shown in FIG. 2.

The control unit (RCTU) 16 for systematically controlling the operation of the main unit 1 has an arrangement shown in FIG. 8. The control unit 16 has a main CPU 161 constituted by a microprocessor. This main CPU 161 is connected to a ROM 162, a RAM 163, a local CPU 164, and a time switch section 165 through a bus 168.

The ROM 162 stores various programs or control data necessary for switching control in advance. The RAM 163 is used to store maintenance data, user data, or control data generated in various control processes. The local CPU 164 controls control data transfer between the main CPU 161 and the data highway 17.

The control unit 16 also has a tone data ROM 166 and a parallel/serial conversion circuit (P/S) 167. The tone data ROM 166 reads out tone data representing a tone signal to be supplied to the digital key telephones 2 and standard telephone 4 as extension terminals in accordance with an instruction from the main CPU 161 during various services such as holding, transfer, or camp-on. The parallel/serial conversion circuit 167 converts the tone data read out from the tone data ROM 166 as a parallel signal into a serial signal and sends the signal to the data highway 17.

The time switch section 165 performs time slot switching processing between an upward link PCM highway 18a and a downward link PCM highway 18b under the control of the main CPU 161.

Figure 9:
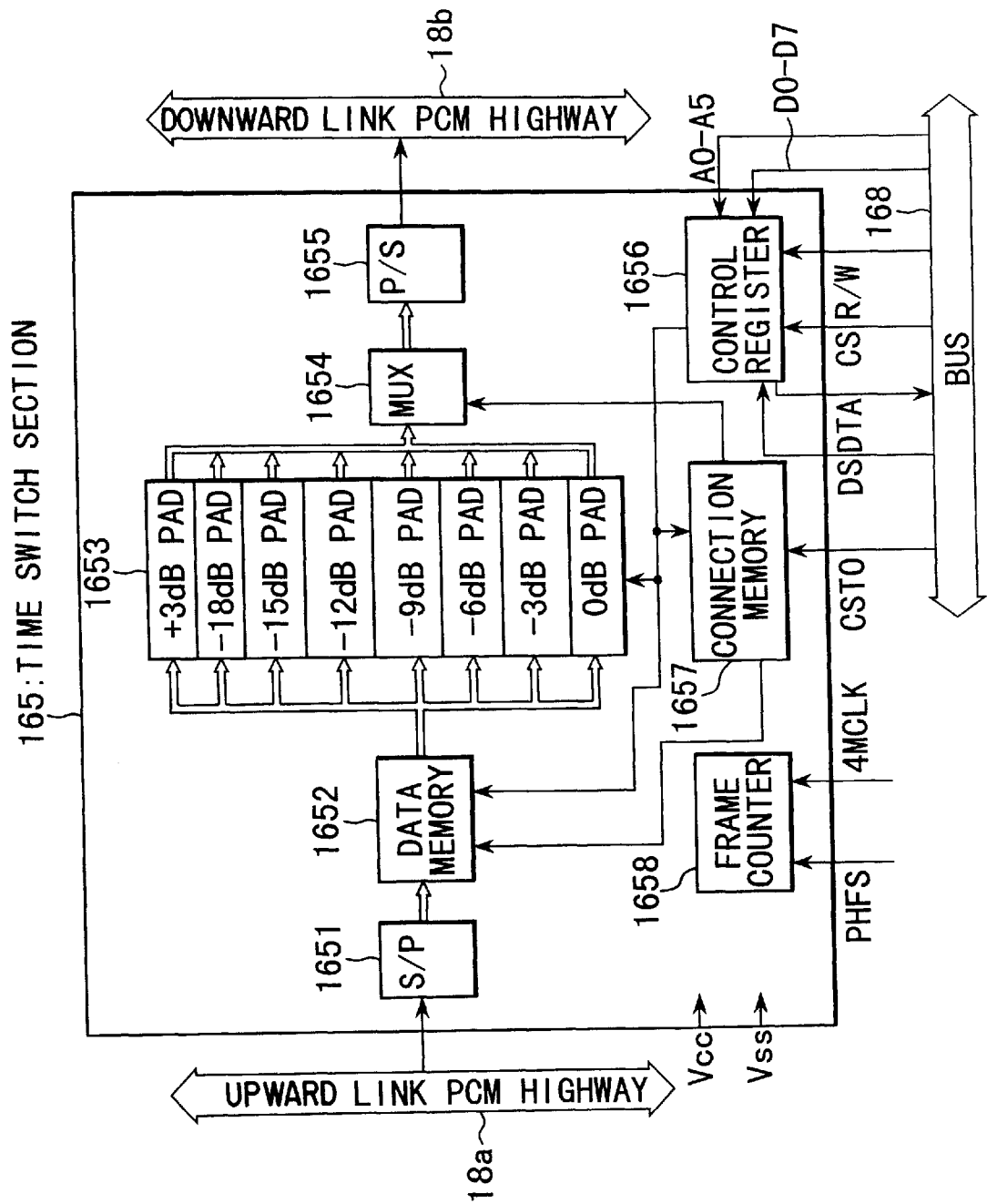
FIG. 9 is a block diagram showing the arrangement of a time switch section in the RCTU shown in FIG. 8.

FIG. 9 is a block diagram showing the arrangement of the time switch section 165. The time switch section 165 comprises a serial/parallel converter (S/P) 1651, a data memory 1652, a digital attenuator section 1653, a multiplexer (MUX) 1654, and a parallel/serial converter (P/S) 1655. The time switch section 165 also comprises a control register 1656, a connection memory 1657, and a frame counter 1658.

Each time slot data transferred by the upward link PCM highway 18a is converted from the serial signal into a parallel signal by the S/P 1651, temporarily stored in the data memory 1652, and then input to the digital attenuator section 1653. The digital attenuator section 1653 has eight attenuators from −18 dB to +3 dB. Every time slot data is input from the data memory 1652, one of the attenuators is activated in accordance with control data output from the connection memory 1657. The input time slot data is gain-controlled by the activated attenuator and output.

The multiplexer 1654 shifts the time slot data output from the digital attenuator section 1653 to the time slot of the downward link PCM highway 18b in accordance with an instruction from the connection memory 1657. The time slot data output from the multiplexer 1654 is converted from the parallel signal into a serial signal by the parallel/serial converter (P/S) 1655 and sent to the downward link PCM highway 18b.

The frame counter 1658 generates a signal necessary for the operation of the time switch section 165 on the basis of a clock signal generated by a timing generation section (not shown) and a frame signal from the PCM highway 18.

Figure 10:
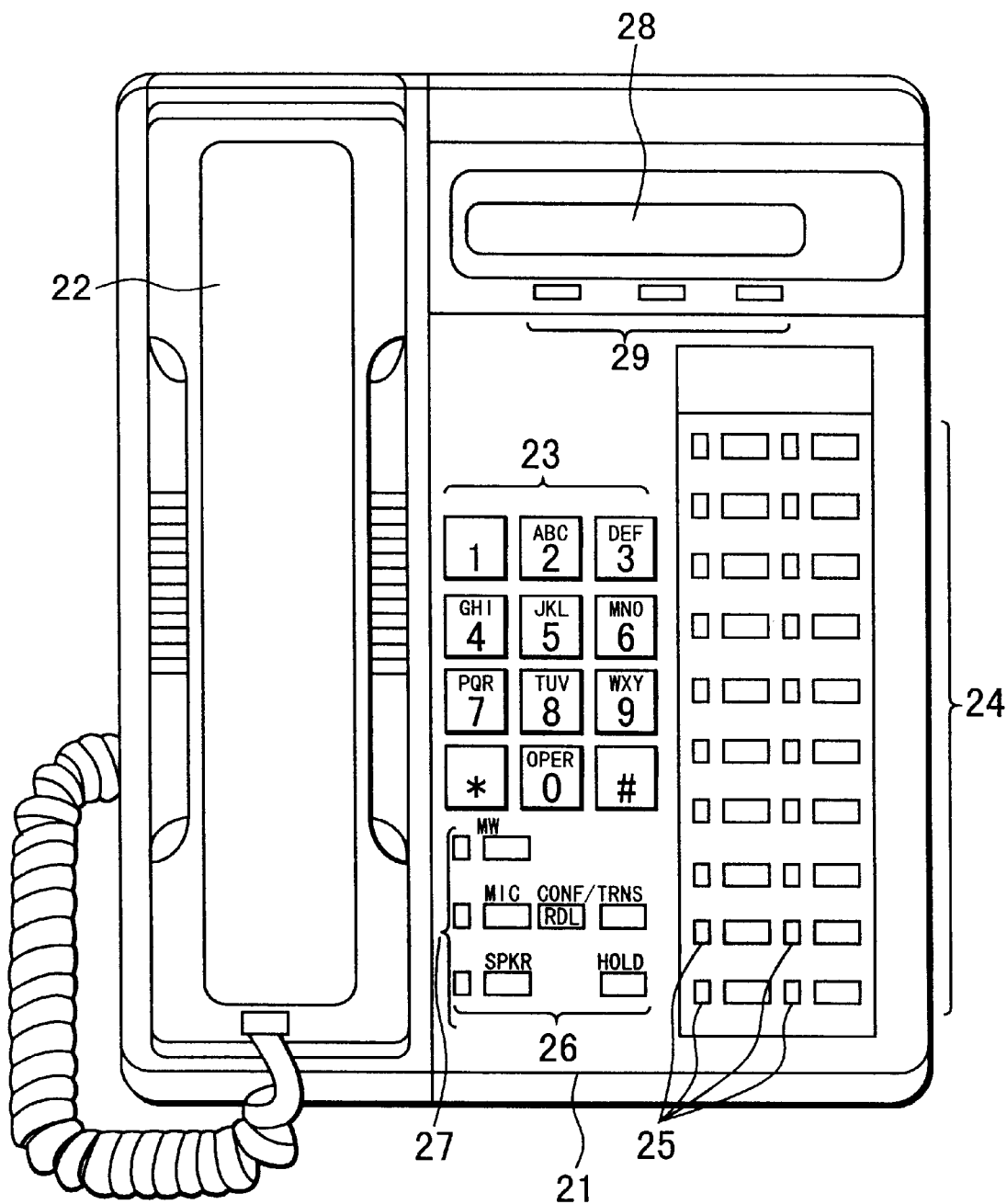
FIG. 10 is a plan view showing the outer appearance of a digital key telephone.
Figure 11:
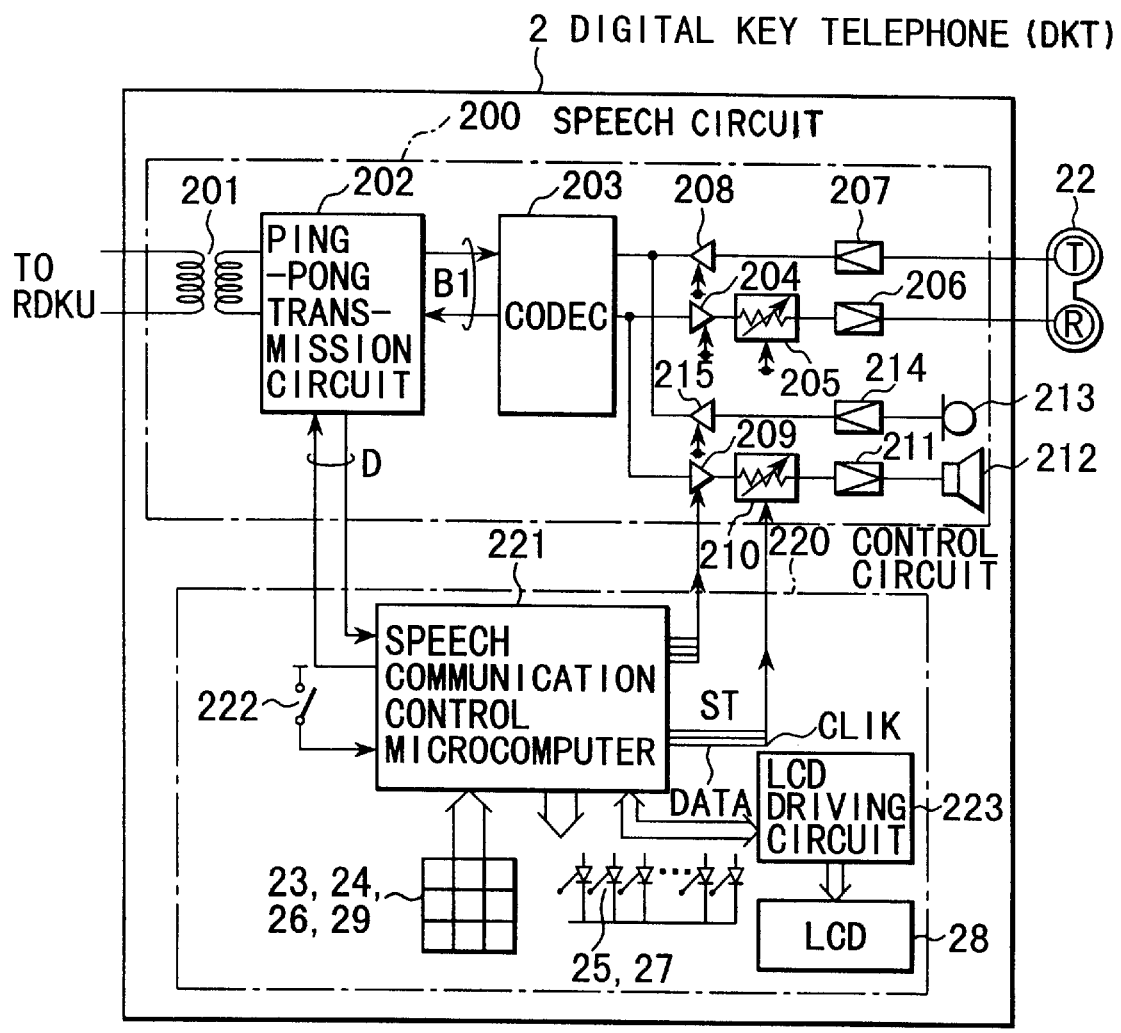
FIG. 11 is a block diagram showing the circuit arrangement of the digital key telephone.

Each of the digital key telephones 2 has the following arrangement. FIG. 10 is a plan view showing the outer appearance of the digital key telephone 2. FIG. 11 is a block diagram showing the circuit arrangement of the digital key telephone 2.

Referring to FIG. 10, a handset 22 is mounted on the cradle portion of a telephone body 21. The operation panel of the telephone body 21 has dial buttons 23, a plurality of flexible buttons 24, a plurality of LED display devices 25 respectively corresponding to the flexible buttons 24, a plurality of control buttons 26, LED display devices 27 each corresponding to a predetermined control button, and an LED display device 28.

Of the above operation buttons, the flexible buttons 24 are used by the user to freely set various functions such as an office line calling or automatic dialing. Examples of functions to be set other than office line calling are leased line calling, automatic dialing, pause, long pause, automatic redialing, saving, subaddress sending, dial sending, privacy cancel, messaging, message switching, message waiting, night switching, call reception rejection, absence transfer, fixed absence transfer, camp-on, pooling, park holding, call pickup, call answering, broadcasting, microphone-off, hot line, and conference/transfer.

Leased line calling is used for calling in communication between terminals connected to an intra-office communication network.

For automatic dialing, the telephone numbers of parties to be called are registered in a memory in advance in correspondence with the flexible buttons. Depressing a flexible button allows automatic calling to the corresponding called party.

Pause is a function of inserting a pause between, e.g., an office line calling dial number and a called party dial number in abbreviated dialing registration. Long pause is a function of inserting a longer pause.

Automatic redialing is a function of automatically repeating redialing when the called party is busy.

In saving, in a period from the end of the dialing operation to the end of the speech communication, a flexible button for which the save function is set is depressed to temporary store the dial number of the called party. After the speech communication is complete, automatic calling to the same called party is allowed by depressing the flexible button for which the save function is set.

Subaddress sending is a function used to designate one of a plurality of communication terminal devices connected to one digital line on the side of the other communication party connected to the ISDN.

In dial sending, the dial number and subaddress of the called party are input and then sent in calling to the ISDN.

Call reception rejection is a function of rejecting a call from another extension line. When an extension terminal for which call reception rejection is set is called, a busy tone with a period shorter than that of a normal busy tone is returned.

Messaging is a function of registering a message for absence answering in advance and sending the message to the calling line upon receiving a call in absence of the called party. Message switching is a function of selecting one of a plurality of messages recorded in advance for absence answering.

Message waiting is a function of causing the called terminal to display a message by designating it on the calling side when the called party is busy or absent.

Night switching is a function of switching between extension terminals for receiving a call in the daytime or weekdays and those for receiving a call in the nighttime or holidays.

Absence transfer or fixed absence transfer is a function of registering the extension number of a transfer destination in advance, and when a call is received in the absence transfer mode, automatically transferring the call to the transfer destination. Absence transfer and fixed absence transfer are different in the following points. In absence transfer, the user can register or cancel the desired transfer destination anytime. In fixed absence transfer, once the transfer destination is set at the time of installation, it cannot be changed later. Transfer destination setting for absence transfer can be made not only from the extension terminal as the transfer source but also from another extension terminal.

In camp-on, when a called extension terminal or office line terminal is busy, the calling terminal sets camp-on and goes on-hook. After the called terminal completes speech communication, the calling terminal is notified of it. The calling terminal automatically calls the called terminal upon off-hook. When the called terminal answers the call, the called terminal and the calling terminal are connected to allow speech communication.

In pooling, a number of accommodated office lines are divided into groups, and each group is assigned to a pool. By designating one pool, all office lines of the group assigned to the pool can be selectively used. This function is effectively used when there are a lot of office lines, and they cannot be individually assigned to the flexible buttons. Park holding is a function used to hold speech communication by using the pool. Holding using no pool is performed by depressing a holding button.

Call pickup or call answering is a function of answering an office line call in an extension terminal by a one-touch or special number operation when nobody answers the call. Call pickup and call answering are different in the following points. In call pickup, all office line calls can be answered. In call answering, however, a plurality of office lines are divided into groups, and the call answering function is set for different flexible buttons in units of groups, thereby allowing call answering for each group.

Broadcasting is a function of voice-calling all extension terminals or the extension terminals of a group. The microphone-off function is used when the called party does not want to answer by voice in broadcasting or group call. In this case, the microphone for loudspeaking speech communication is turned off.

Privacy cancel is a function of adding a third party to speech communication by a one-touch operation during office line speech communication to allow conference speech communication.

Hot line is a function of calling a desired extension terminal by a one-touch operation. During office line speech communication, by depressing a flexible button for which the hot line function is set, the call can be transferred by voice (call transfer) or a transfer tone (ring transfer). By depressing a flexible button for which conference/transfer is set when the transfer destination party answers the call, the mode changes to an office line conference mode. When the flexible button for which the hot line is set is depressed during extension speech communication, the extension speech communication is held. By depressing the flexible button for which conference/transfer is set when the other party of extension hot line answers the call, the mode changes to the extension conference mode. When the handset goes on-hook in the extension conference mode, the extension call is transferred.

Each of the digital key telephones 2 is constituted by a speech communication circuit 200 and a control circuit 220, as shown in FIG. 11.

Each of the digital key telephones 2 has, as speech communication modes, a handset speech communication mode using the handset 22 and a hands-free speech communication using a hands-free loudspeaker 212 and a hands-free microphone 213.

When the handset speech communication mode is selected, a transmission signal output from the microphone of the handset 22 is input to a codec 203 through a transmission amplifier 207 and a channel switch 208. When the hands-free speech communication is selected, a transmission signal output from the hands-free microphone 213 is input to the codec 203 through a transmission amplifier 214 and a channel switch 215.

The codec 203 converts the input transmission signal into speech communication data by PCM coding and supplies the speech communication data to a ping-pong transmission circuit 202 as B1 channel data. The ping-pong transmission circuit 202 has a 2B+D synthesis section. The 2B+D synthesis section synthesizes the B1 channel speech communication data with D channel control data output from a speech communication control microcomputer 221 (to be described later) to generate upward link transmission data having the 2B+D format. This transmission data is sent to the RDKU 13 through a transducer 201.

Downward link transmission data having the 2B+D format, which arrives from the RDKU 13, is input to the ping-pong transmission circuit 202 through the transducer 201. The ping-pong transmission circuit 202 has a 2B+D separation section. The 2B+D separation section performs processing of separating the downward link transmission data into B1 and B2 channel speech communication data and D channel control data. The B1 channel speech communication data is supplied to the codec 203. The D channel control data is supplied to the speech communication control microcomputer 221.

The codec 203 performs signal processing of PCM-decoding the B1 channel speech communication data to reproduce the reception signal. In the handset speech communication mode, the reception signal is supplied to the loudspeaker of the handset 22 through a channel switch 204, an attenuator 205, and a reception amplifier 206. In the hands-free mode, the reception signal is supplied to the hands-free loudspeaker 212 through a channel switch 209, an attenuator 210, and a reception amplifier 211 and output from the loud-speaker 212.

The control circuit 220 has the speech communication control microcomputer 221. The speech communication control computer 221 systematically performs all control operations associated with speech communication while transmitting/receiving control data to/from the main unit 1. The control contents include an operation of detecting the operation information of the dial buttons 23, the flexible buttons 24, the control buttons 26, and a hook switch 222, OF/OFF-control of the plurality of LED display devices 25 and 27, control of supplying display data to an LCD driving circuit 223 to cause the LED display device 28 to display it, selective ON/OFF-control of the channel switches 204, 208, 209, and 215 in accordance with the speech communication mode, and control of changing the attenuation amount of the attenuator 205 or 210 in accordance with the operation amount of the volume control (not shown).

Figure 12:
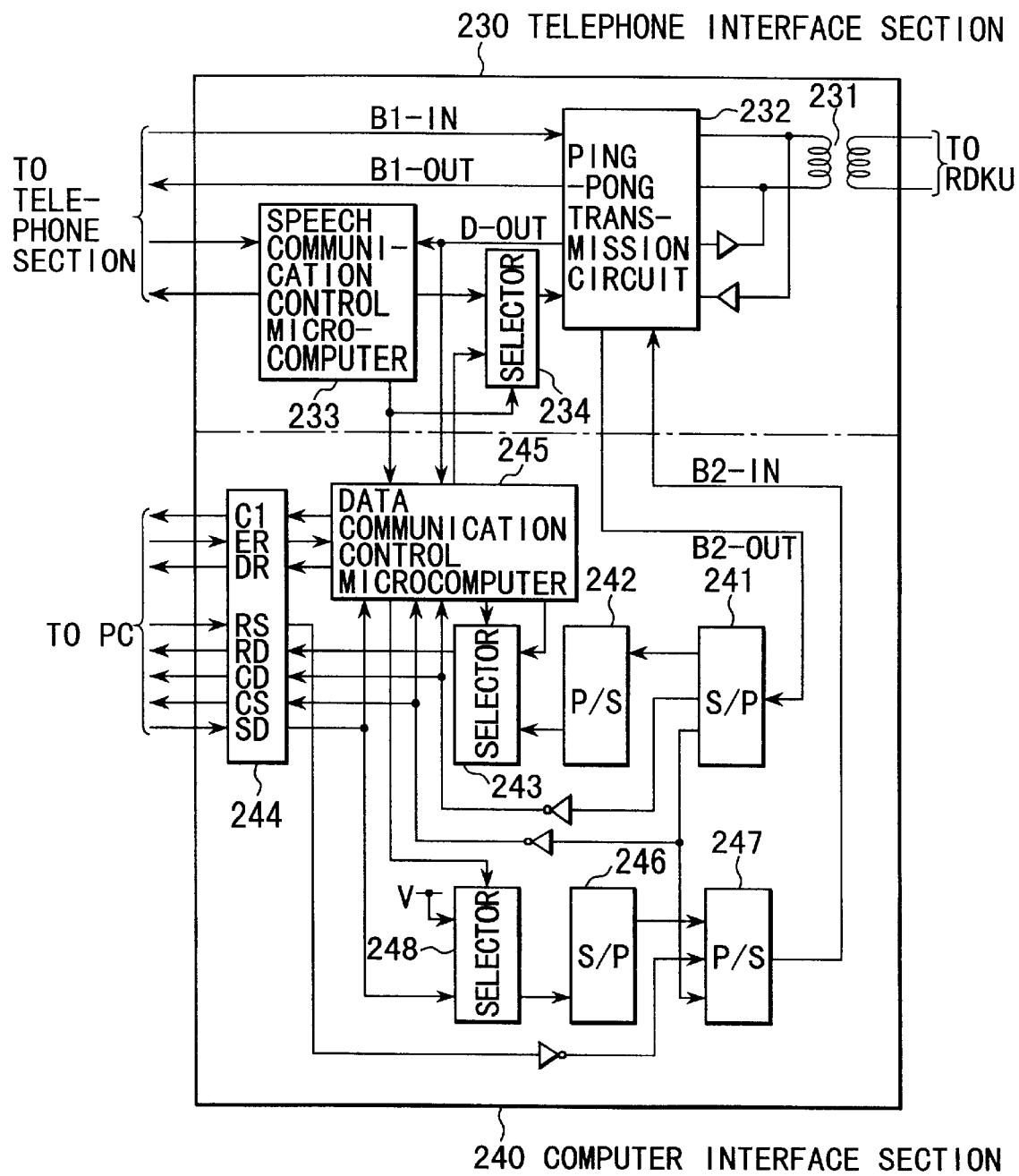
FIG. 12 is a block diagram showing the arrangement of an interface circuit section in the digital key telephone having a PCI-DI.

A digital key telephone having a PC interface unit (PCI-DI) 2b has the following arrangement. FIG. 12 is a block diagram showing the arrangement of the interface circuit.

The interface circuit comprises a telephone interface section 230 and a computer interface section 240. The telephone interface section 230 comprises a transducer 231, a ping-pong transmission circuit 232, a 5 speech communication control microcomputer 233, and a selector 234. The ping-pong transmission circuit 232 and the speech communication control microcomputer 233 have almost the same functions as those of the ping-pong transmission circuit 202 and the speech communication control microcomputer 221 described above with reference to FIG. 11.

The selector 234 selects one of speech communication control data output from the speech communication control microcomputer 233 and data communication control data output from a data communication control microcomputer 245 (to be described later) and supplies the selected data to the ping-pong transmission circuit 232 as D channel data.

The computer interface section 240 has the following arrangement.

B2 channel downward link transmission data separated by the ping-pong transmission circuit 232 is converted from the serial data into parallel data by a serial/parallel converter (S/P) 241. The B2 channel downward link transmission data has eight bits (64 kbps). The six bits of these eight bits are assigned to communication data RD (48 kbps), and the remaining two bits are assigned to a reception carrier detection signal CD (8 kbps) and a transmission enable signal CS (8 kbps) of the RS232C interface, respectively.

In the 8-bit parallel data output from the S/P 241, the 6-bit reception data RD is converted into serial data by a parallel/serial converter (P/S) 242 and then sent to the personal computer 3 through a selector 243 and an R232C driver/receiver 244. The reception carrier detection signal CD and the transmission enable signal CS are sent to the personal computer 3 through the driver/receiver 244 and also fetched by the data communication control microcomputer 245.

Transmission data SD (48 kbps) sent from the personal computer 3 is input to a serial/parallel converter (S/P) 246 through the RS232C driver/receiver 244 and a selector 248, converted into parallel data, and input to a parallel/serial converter (P/S) 247. Simultaneously, an RS232C interface transmission request signal RS (8 kbps) and the transmission enable signal CS (8 kbps) which are sent from the personal computer 3 are input to the parallel/serial converter (P/S) 247.

For this reason, 8-bit serial data constituted by the transmission data SD, the transmission request signal RS, and the transmission enable signal CS is output from the P/S 247. This serial data is supplied to the ping-pong transmission circuit 232 as B2 channel upward link transmission data. The ping-pong transmission circuit 232 multiplexes it with the B1 channel upward link speech communication data and D channel upward link control data and sends the data to the RDKU 13 of the main unit 1.

The operation of the digital key telephone system having the above arrangement will be described next.

(1) Various Operations Using Caller ID (1-1) Reception and Call Reception Processing of Caller ID A caller ID is received by the RCIU 12. The RCIU 12 checks the caller ID transmitted from the analog public network NW. Upon confirming that the caller ID has been normally received, the RCIU 12 transfers the caller ID to the RCTU 16 through the data highway 17; otherwise, the RCIU 12 transfers an error code to the RCTU 16. The RCTU 16 analyzes the caller ID transferred from the RCIU 12 and extracts information such as the calling line name and calling line number which are used for the subsequent call processing.

Figure 13:
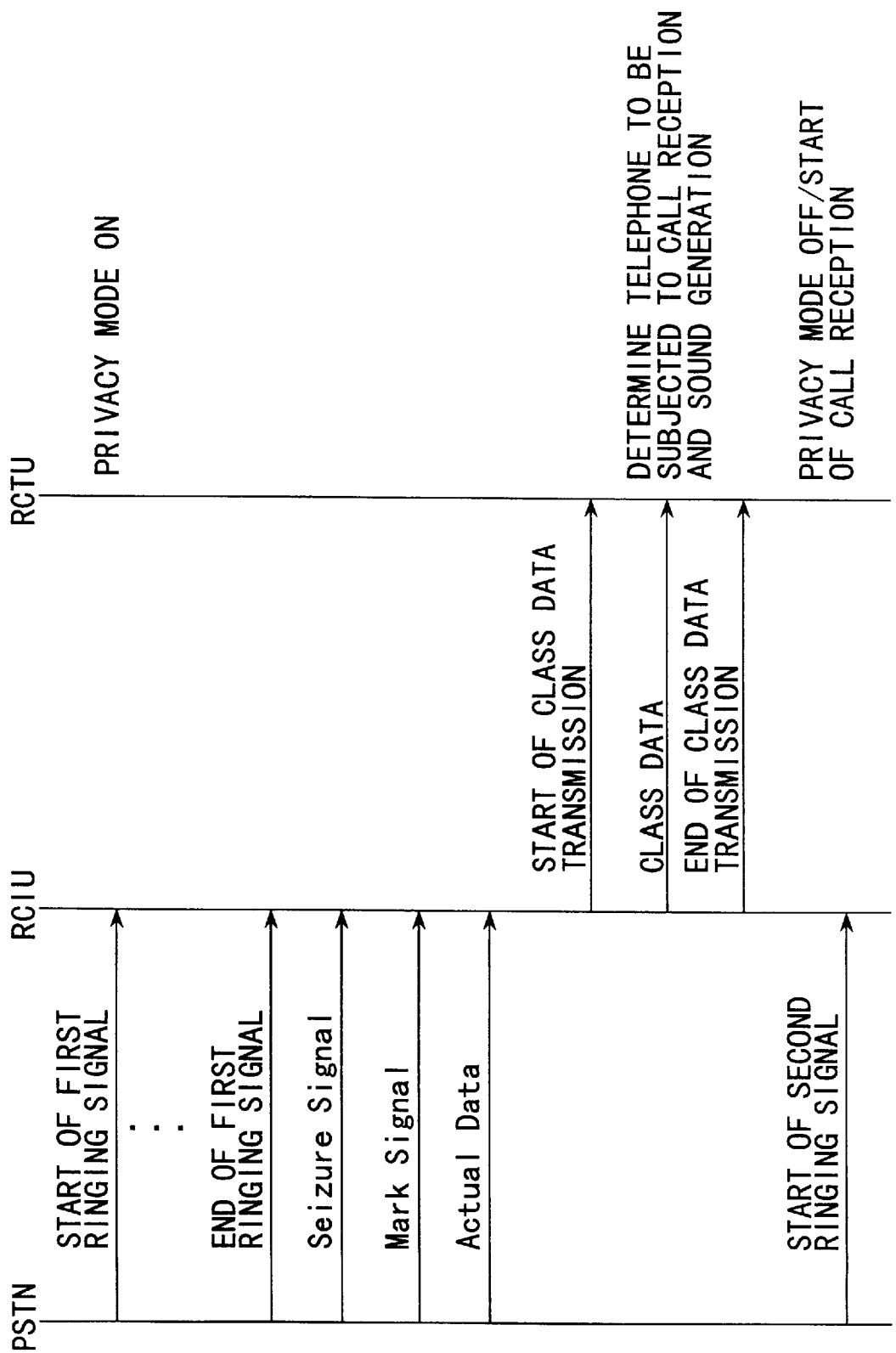
FIG. 13 is a timing chart showing a caller ID reception operation.

FIG. 13 is a timing chart showing the caller ID reception operation. As shown in FIG. 91, the caller ID arrives at the interval between the first ring (2 sec) and the second ring of a ringing signal. When the ringing signal arrives, the RCIU 12 detects the end of the first ring of the ringing signal and then waits for the arrival of the caller ID. The RCIU 12 sequentially receives the channel seizure signal, the mark signal, and the actual data, and finally, the checksum. Upon receiving all of these signals, the RCIU 12 transfers these signals to the RCTU 16 through the data highway 17.

When the start of reception of the first ring of the ringing signal is detected, the RCTU 16 sets a privacy mode for the CO line which has received the signal, thereby preventing congestion of calling and call reception. The privacy mode is canceled upon detecting the start of reception of the second ring of the ringing signal. The caller ID is not always constituted by a piece of information (message type) and may have a plurality of pieces of information (a plurality of message types). Therefore, in receiving the caller ID, the RCIU 12 confirms the message type and receives all pieces of information.

Figure 14:
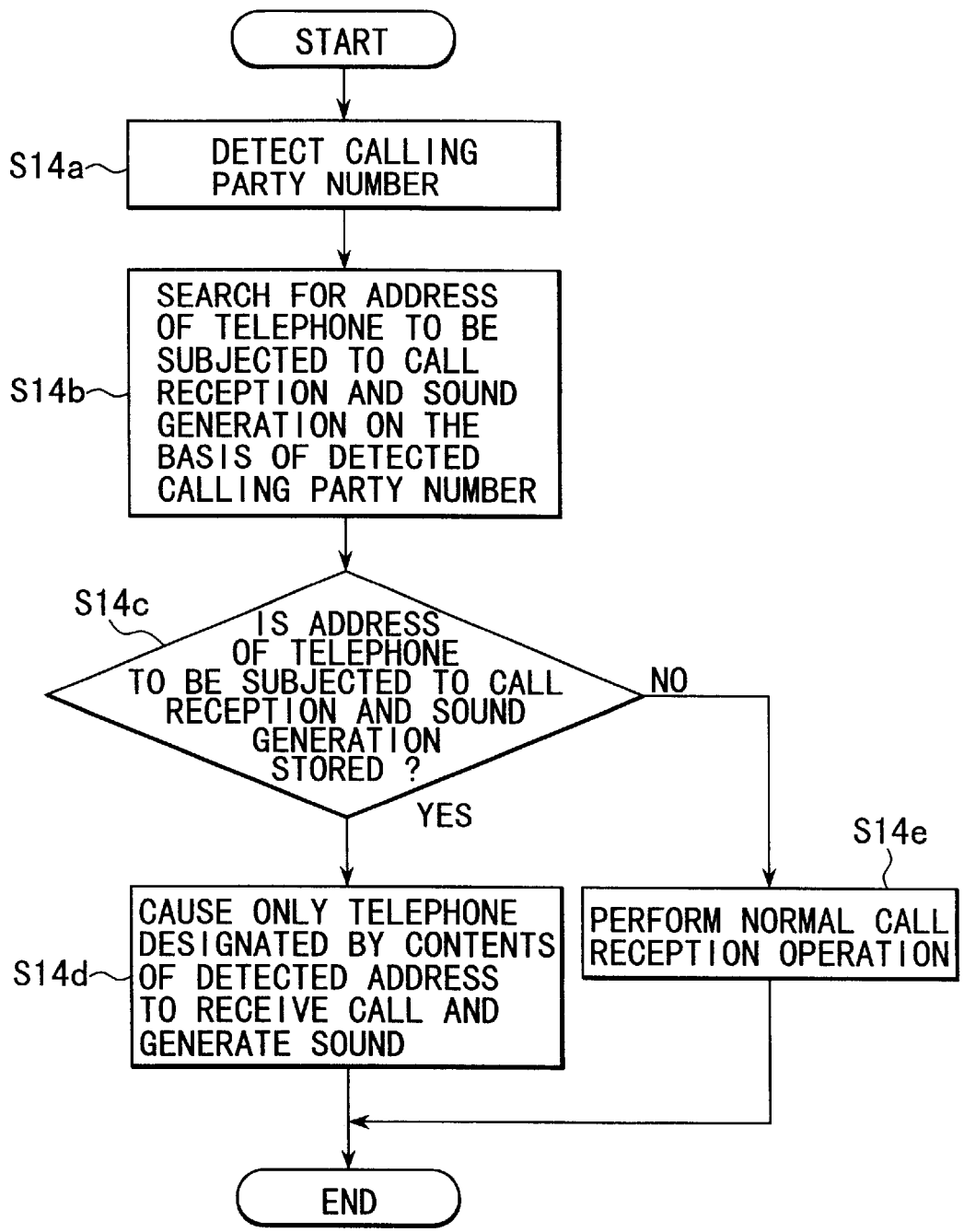
FIG. 14 is a flow chart showing the procedure and contents of call reception sound generation control using the caller ID.

The RCTU 16 analyzes the transferred caller ID to determine the called telephone and causes the telephone to generate sound. FIG. 14 is a flow chart showing the control procedure.

In step S14a, the RCTU 16 analyzes the caller ID to detect the calling line number. In step S14b, the RCTU 16 accesses a table memory storing the correlation between calling line numbers and sound generation telephone numbers. In step S14c, it is determined whether the called telephone number corresponding to the received calling line number is stored.

FIG. 15 shows an example of the table memory which is arranged in the RAM 163 shown in FIG. 8. The storage contents of this table memory, i.e., the correlation between the calling line numbers and the sound generation telephone numbers is set in advance upon wiring installation. The user of an extension telephone who has done the answering operation for the call arriving from the CO line for the first time, including a transfer operation to another extension telephone (RT: Ring Transfer), can operate the extension telephone, as needed to change the sound generation telephone number stored in the table memory to the self extension telephone number. In addition, the sound generation telephone number stored in the table memory can be automatically rewritten to the number of the extension telephone which has answered the call for the first time. Furthermore, in place of or in addition to the calling line number, the name of the calling line contained in the caller ID may be registered in the table memory.

When it is determined in step S14c that the called telephone number corresponding to the received calling line number or calling line name is stored, the RCTU 16 advances to step S14d. The telephone corresponding to the stored telephone number is determined as the called telephone, and the RDKU 13 sends call reception information to this telephone and causes it to generate sound. If no corresponding called telephone number is stored, the flow advances to step S14e to perform the normal call reception operation. In the normal call reception operation, a repeater (ATT) or a predetermined extension telephone receives the call.

Upon receiving the call reception information, the extension telephone displays the calling line name, the number of the CO line which has received the call, or the like on the LCD 28, as shown in FIG. 16. In normal call reception to the repeater, the calling line name, the number of the CO line which has received the call, and the like are displayed on the LCD of the repeater, as shown in FIG. 17.

Assume that the user of the extension telephone which has received the call temporarily answers the call and then transfers it to another extension telephone, i.e., an RT (Ring Transfer) operation is performed. In this case, the RCTU 16 causes an extension telephone corresponding to the extension telephone number as the transfer destination input by the transfer operation to receive the call. In RT, the RCTU 16 sends the caller ID to the extension telephone of the transfer destination, and the caller ID is displayed on the LCD of the extension telephone of the transfer destination. In recalling RT, the call is received by the extension telephone of the transfer source again. At this time, the received caller ID is displayed on the LCD of the extension telephone which has received the call.

With the above operation, an optimum extension telephone user can answer each calling line. For example, a terminal for receiving and answering a call can be appropriately selected such that a person in charge directly answers a call from an important client while a secretary answers calls from other clients.

(1-2) Storage of Caller ID

If nobody answers the call from the CO line, and the calling line quits calling, the received caller ID is stored in a storage buffer allocated to each extension terminal.

Assume that nobody answers the call from the CO line, and the calling line quits calling. Upon determining that the office line call reception is restored, the RCTU 16 stores the received caller ID in a storage buffer corresponding to the called extension line in the buffer memory area in the RAM 163. In storing the received caller ID, if the storage buffer has a free area, the received caller ID is written in the free area. If no free area is present, the received caller ID is overwritten on the oldest caller ID. The caller ID to be stored has the calling line name (15 characters), the calling line number or ID code (10 digits), the call reception date (8 digits), and the status (contents of storage data or data reference condition).

If RT is performed, and the extension telephone of the transfer destination does not answer the call, the received caller ID is stored in the storage buffer corresponding to the extension line of the transfer destination. In recalling the call transfer, the received caller ID is stored in both the storage buffer of the transfer source extension line and that of the transfer destination extension line.

Assume that call forward (CF) has been set in the extension telephone which has received the call. If a call is received by another extension telephone, the extension telephone of the CF destination does not answer the call, and calling is quitted, the received caller ID is stored in the storage buffer corresponding to the extension telephone of the CF source.

When only one extension telephone corresponds to the CO line which has received the call, the caller ID is stored in the storage buffer corresponding to this extension telephone. If two or more extension telephones correspond to the CO line, the caller ID is received in the buffer corresponding to a predetermined extension telephone corresponding to the call reception CO line.

If a primary DN or a phantom DN is designated as a called party, the caller ID is stored in the buffer corresponding to an owner terminal corresponding to the DN.

By storing caller IDs in correspondence with the respective extension telephones, the following effects can be obtained.

(1-2-1) The user of each extension telephone can refer to the stored caller IDs by a read operation or delete them as needed. That is, the user can generate and manage the list of necessary caller IDs on the self extension telephone. If the list desired by each user is to be managed on the main unit, the load on the main unit increases.

(1-2-2) Call back (to be described later in detail) can be performed using the stored data.

(1-2-3) The number of IDs to be stored can be arbitrarily assigned to each extension telephone. For example, a large storage area can be assigned to an extension line to be used by a secretary to frequently receive a call, and a small storage area can be assigned to an extension telephone set in a warehouse to rarely receive a call. Therefore, the limited storage area of the storage buffer can be effectively utilized.

(1-2-4) By allowing only a corresponding extension telephone to read the caller IDs stored in the storage buffer or causing each extension user to use a password, the privacy of the stored caller IDs can be protected.

(1-3) Display of Stored Caller ID and Call Back

The stored caller IDs are used to confirm the calling line or perform call back by the user operation.

Assume that the user of an idling extension telephone operates, e.g., "mode key +62" to display the caller IDs. The extension telephone shifts to a stored information display mode and sends a caller ID display request to the RCTU 16. To end display, e.g., "mode key +0" is operated.

Upon receiving the caller ID display request from the extension telephone, the RCTU 16 first reads out, e.g., the latest caller ID from the storage buffer corresponding to the extension telephone, transfers the caller ID to the extension telephone of the request source, and causes it to display the caller ID on the LCD 28. Every time a scroll operation is performed on the extension telephone, the RCTU 16 reads out the caller IDs from the storage buffer one by one from the latest reception timing, transfers the caller ID, and causes the extension telephone to display the caller ID on the LCD.

When a call is received in the caller ID display mode, the extension telephone blinks the LED and generates sound while keeping the caller ID displayed. Upon answering the call, the extension telephone exits the stored information display mode. After this, the display operation upon receiving a call is performed on the LCD, as shown in FIG. 16.

Figure 18:
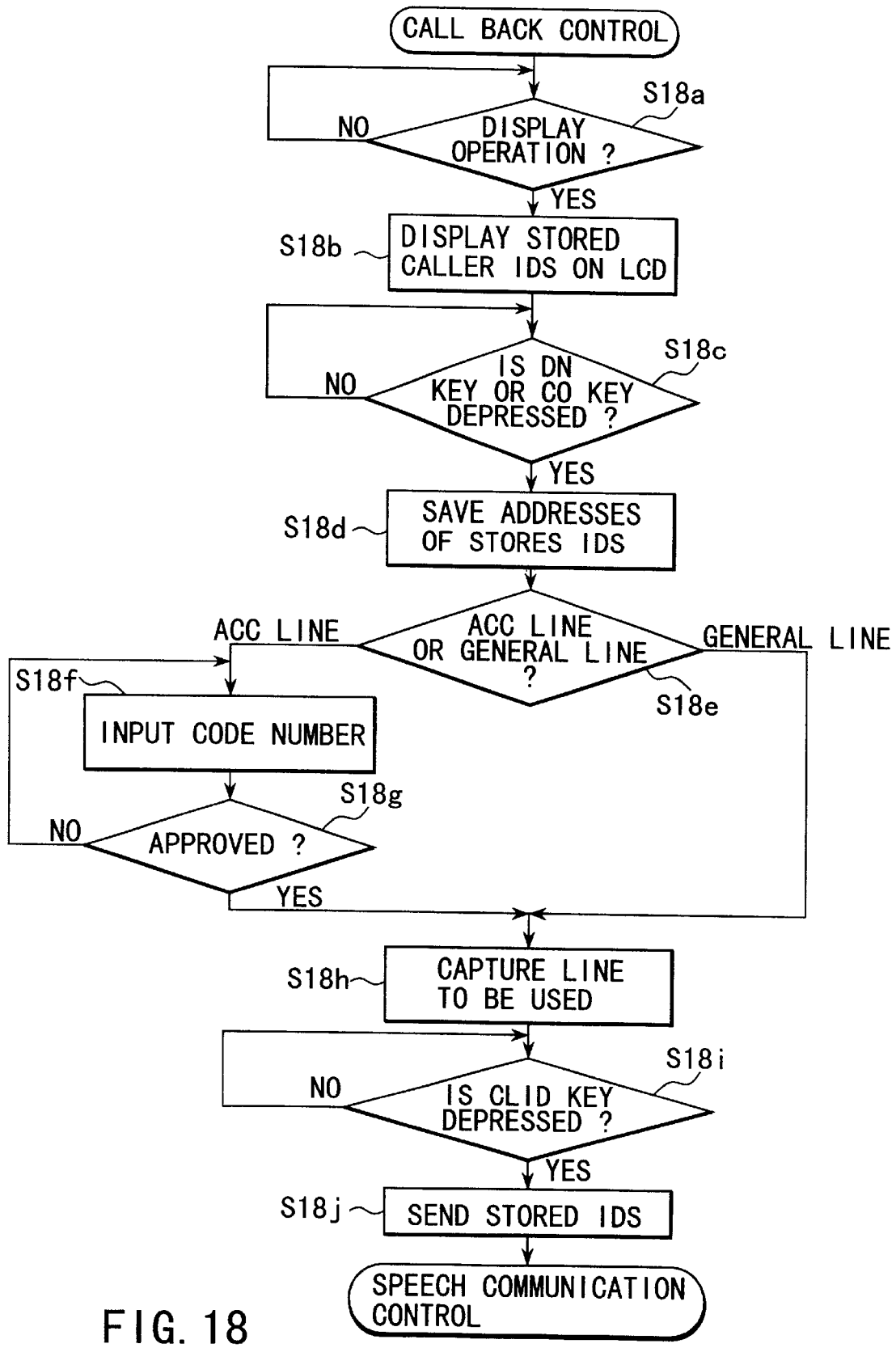
FIG. 18 is a flow chart showing the procedure and contents of call back control.

Assume that an operation of accessing the CO line is performed on the extension telephone in the caller ID display mode. At this time, the RCTU 16 of the main unit 1 executes call back control. FIG. 18 is a flow chart showing the procedure and contents of the control.

When the DN key or CO key of the extension telephone is depressed during display of the caller ID, the RCTU 16 detects this operation in step S18c, and the flow advances to step S18d. In step S18d, the caller ID being displayed is read out from the storage buffer and saved in a dialing buffer. It is determined in step S18e whether the line selected by the DN key or CO key is an ACC line which can be used by a specific person or a general line which can be used by anyone. If the line to be used is an ACC line, the account code input by the user from the extension telephone is received in step S18f and approved in step S18g. If the code is approved, the flow advances to step S18h to capture the CO line to be used for calling. In this state, when a trigger key (CLID key) for sending an ID is depressed on the extension telephone, the flow advances from step S18i to step S18j to read out the caller ID saved from the dialing buffer and send the caller ID to the captured CO line.

If the line to be used is a general line, the RCTU 16 omits approval of the account code. The flow advances from step S18e to step S18h to capture the line to be used. In this state, when the CLID key is depressed on the extension telephone, the flow advances from step S18i to step S18j to read out the caller ID from the dialing buffer and send it to the CO line.

If the lowest cost route (LCR) function is set, the RCTU 16 performs processing of selecting the lowest cost route before capturing the line to be used, and a call is sent to the selected route.

As described above, automatic call back using the stored caller ID is allowed. When a call has been received in the absence of an extension telephone user, the user can perform call back only by performing the call back request operation without performing the dialing operation. Therefore, the user operation associated with the call back operation can be simplified.

(1-4) Dump Output of Received Caller ID

The RCIU 12 has, as modes of transferring the received caller ID to the RCTU 16, a normal mode of analyzing the received caller ID and outputting the analysis result to the RCTU 16, and a dump mode of directly transferring the received modem data to the RCTU 16 without any processing for the purpose of maintenance/inspection of the RCIU 12 itself. The RCIU 12 selects one of the modes in accordance with a downward link transmission code sent from the RCTU 16 through the data highway 17.

Figure 19A:
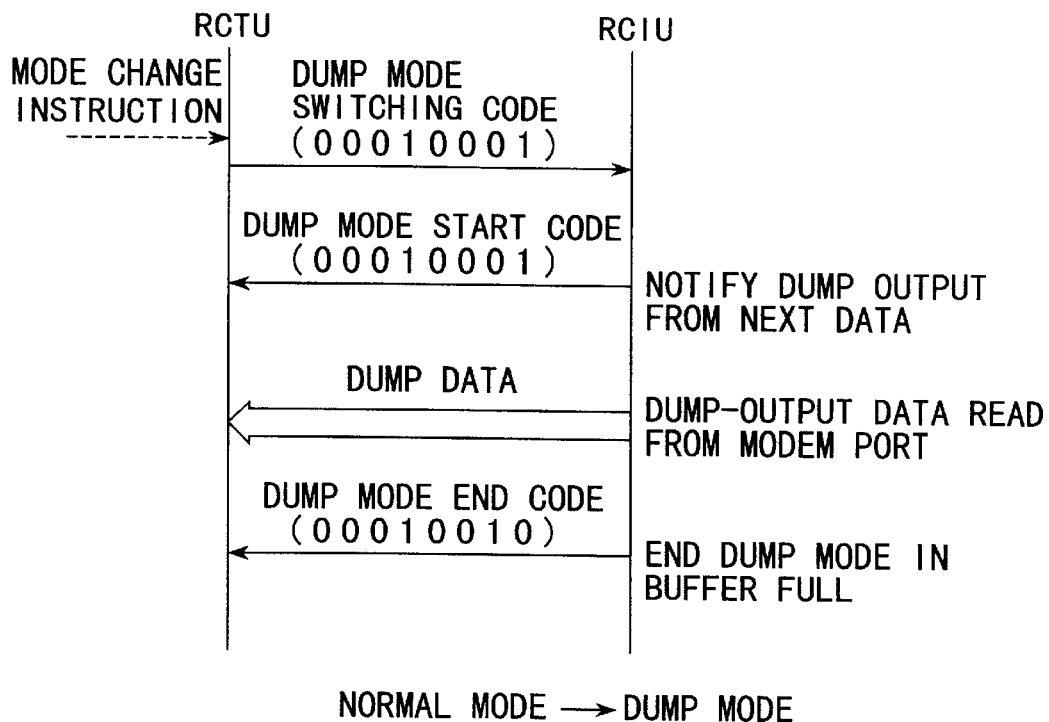
FIG. 19A is a view showing the switching sequence in changing the caller ID transfer mode from the normal mode to the dump mode.

In the normal mode, the maintenance operator inputs a mode change command from the maintenance personal computer to test the operation of the RCIU 12. The RCTU 16 transmits a dump mode switching code (00010001) to the RCIU 12 through the data highway 17, as shown in FIG. 19A. Upon receiving the dump mode switching code, the RCIU 12 changes the self mode from the normal mode to the dump mode, and then returns a dump mode start code (00010001) to notify the RCTU 16 of the start of a dump output operation from the next received data. After this, every time a ringing signal arrives, modem data read from the modem port is directly transferred to the RCTU 16. The RCIU 12 reads a predetermined amount of dump data and outputs it to the RCTU 16 while storing the dump data in the internal buffer. After a predetermined amount of dump data is transmitted to the RCTU 16, the RCIU 12 waits for transmission for a predetermined time in consideration of the time required for the RCTU 16 to process the data. After this predetermined time has elapsed, the next dump data in a predetermined amount is transmitted.

Figure 19B:
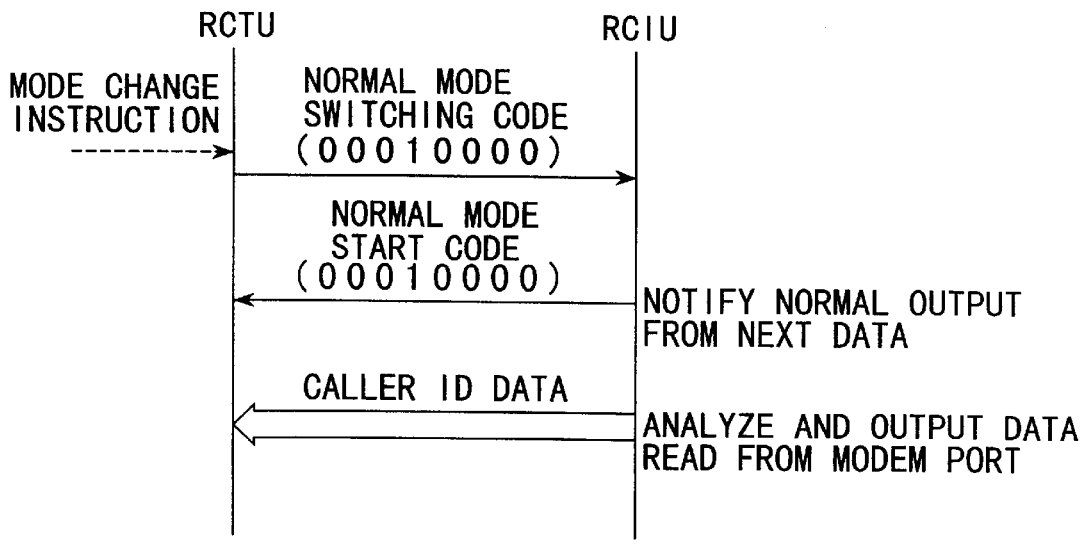
FIG. 19B is a view showing the switching sequence in changing the caller ID transfer mode from the dump mode to the normal mode.

When the test is complete, and the maintenance operator inputs a mode change command, the RCTU 16 transmits a normal mode switching code (00010000) to the RCIU 12 through the data highway 17, as shown in FIG. 19. Upon receiving the normal mode switching code, the RCIU 12 changes the self mode from the dump mode to the normal mode, and then returns a normal mode start code (00010000) to notify the RCTU 16 of the start of analyzed data output from the next received data as the normal operation. After this, every time a ringing signal arrives, caller ID data read from the modem port is analyzed, and the analysis result is transferred to the RCTU 16.

As described above, the RCIU 12 reads a predetermined amount of dump data and transmits it to the RCTU 16 while storing the dump data in the internal buffer. When the internal buffer is filled, the dump mode is ended at that time point. A dump mode end code (00010010) is transmitted to the RCTU 16 to notify it of the end of the dump mode.

Although mode switching can be set in units of CO lines, two or more lines are not simultaneously set in the dump mode. Upon powering on (starting), the normal mode is set for all CO lines. At this time, the normal mode start code (00010000) is not transmitted from the RCIU 12 to the RCTU 16.

As described above, the RCIU 12 has the dump mode and is changed from the normal mode to the dump mode, as needed. With this arrangement, in maintenance/inspection, a fault occurrence position can be detected using the caller ID arriving from the analog telephone network. As a result, the fault can be relatively easily and properly disconnected and determined, so a measure against the fault can be appropriately and quickly taken.

(2) Various Operations Associated with Function Setting and Maintenance of System (2-1) Prevention of Congestion among A Plurality of Wiring installation Terminals The basic cabinet 1a of the main unit 1 has six slots S11 to S16 for accommodating main interface units. Of the slots S11 to S16, the slots S11 and S12 receive the RSIU 14 and the RDKU 13, respectively. Wiring installation is normally performed using the digital key telephone 2 connected to the sixth port of the RDKU 13.

However, when the user does not use the RSIU 14, the RDKU 13 is also connected to the slot S11. In this case, wiring installation can also be performed from the digital telephone connected to the sixth port of this RDKU 13. When two digital telephones can perform wiring installation, wiring installation from the two digital telephones may congest.

To prevent this, the RCTU 16 of the system of this embodiment has a wiring installation regulation function.

More specifically, when wiring installation is to be performed, the maintenance operator inputs a special number, e.g., "*#*#1*2*3" representing a wiring mode start request from the digital telephone connected to the sixth port of the slot S11 or S12.

Figure 92:
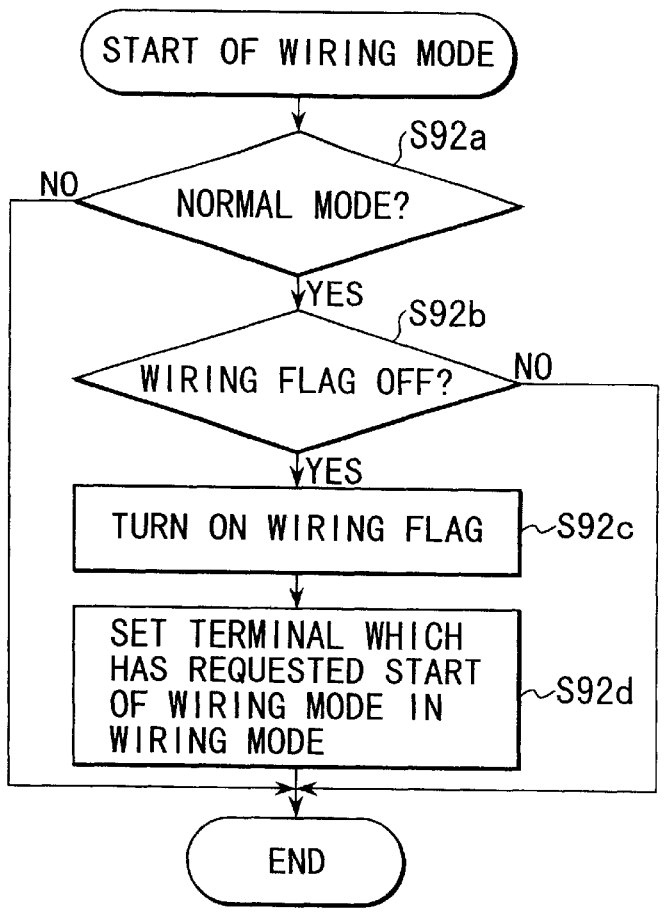
FIG. 92 is a flow chart showing the procedure and contents of a wiring mode start control.

As shown in FIG. 92, the RCTU 16 determines in step S92a whether the digital telephone which has sent the wiring mode start request is in the normal mode. If YES in step S92a, it is determined in step S92b whether the wiring flag is OFF. If YES in step S92b, the flow advances to step S92c to turn on the wiring flag ON. In step S92d, the digital telephone which has sent the wiring mode start request is set in the wiring installation mode. After this, the digital telephone can perform an input operation for wiring installation.

When the digital telephone which has sent the wiring mode start request is not in the normal mode, or even in the normal mode, the wiring flag is already ON, the wiring mode start request is rejected. A message representing the reason for rejection is sent from the RCTU 16 to the digital telephone of the request source and displayed on the LCD 28.

Therefore, when the digital telephone connected to one of the slots S11 and S12 is in the wiring mode, the digital telephone connected to the other slot never changes to the wiring mode even when it sends the wiring mode start request.

With this function, simultaneous function setting inputs from a plurality of wiring installation terminals can be prevented, and congestion of function setting processing from a plurality of wiring installation terminals can be prevented.

Figure 93:
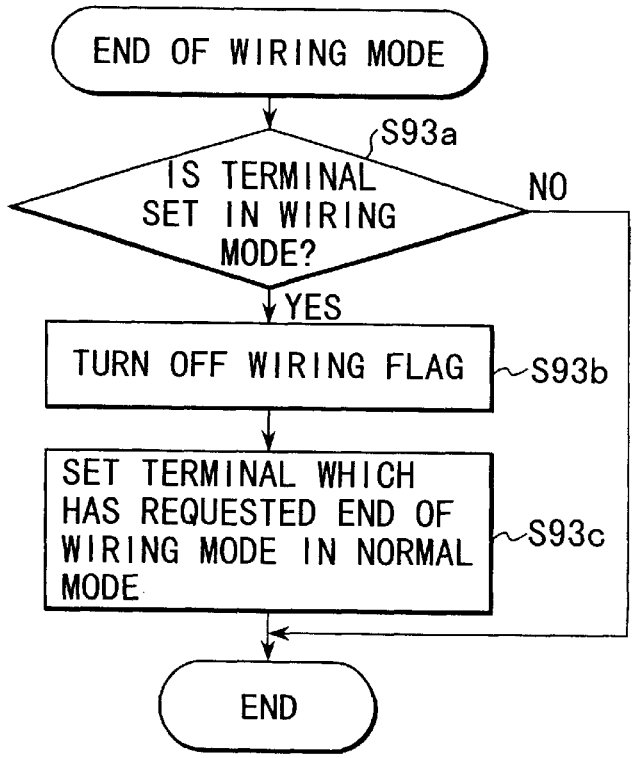
FIG. 93 is a flow chart showing the procedure and contents of a wiring mode end control.

Assume that, upon completing wiring installation, the maintenance operator dials a special number, e.g., "##+hold key" representing a wiring mode end request from the digital telephone. As shown in FIG. 93, the RCTU 16 determines in step S93a whether the digital telephone of the request source is in the wiring mode. If YES in step S93a, the wiring flag is turned off in step S93b. The digital telephone which has sent the wiring mode end request is changed from the wiring mode to the normal mode.

(2-2) Error Prevention in Function Setting

In wiring, telephone numbers are set for the extension ports, or functions are assigned to the buttons of the digital telephone. Due to misunderstanding or erroneous input by the wiring installation operator, one function may be set for a plurality of ports, or a plurality of functions may be set for one port.

In the system of this embodiment, the following measure is taken to prevent such erroneous function setting. When one function is set for only one port after power-on, this setting is valid. However, when one function is set for a plurality of ports, setting for the port with the smallest ordinal number is valid, and that for the remaining ports is invalid.

FIG. 20 is a flow chart showing the procedure and contents of function setting determination processing upon powering on. In steps S20a and S20b in FIG. 20, a port number and a temporary port number are set at "0" as initial values. The temporary port number means an area for directly saving functional setting contents. The RCTU 16 detects a valid function and port number from this area and uses them.

In step S20c, it is determined whether the port number larger than the temporary port number. If NO in step S20c, the flow advances to step S20f to validate the function set for the port number. In step S20g, the port number is incremented by one, and it is determined in step S20h whether all ports are processed.

If unprocessed ports remain, the flow returns to step S20b to set the temporary port number at "0" again.

If YES in step S20c, the flow advances to step S20d to determine whether the function set for the port number matches that set for the temporary port. If YES in step S20d, it is determined that one function is set for a plurality of ports, or this function is already valid for the temporary port number. In step S20g, the port number is incremented by one, and the flow advances to determination processing of the next port.

If NO in step S20d, the temporary port number is incremented by one in step S20e. The flow returns to step S20c to repeat processing from step S20c.

Function setting change during the operation of the system will be described next. In this case, when the function newly set for an arbitrary port does not work at any other ports, the new function setting for the port is valid. However, when the newly set function already works at another port, the newly set function is regarded as temporary setting, and the function set for another port is made to continuously work. In this state, upon powering on again, one function is set for a plurality of ports, so the function set for the port with the smallest ordinal number is valid.

Figure 21:
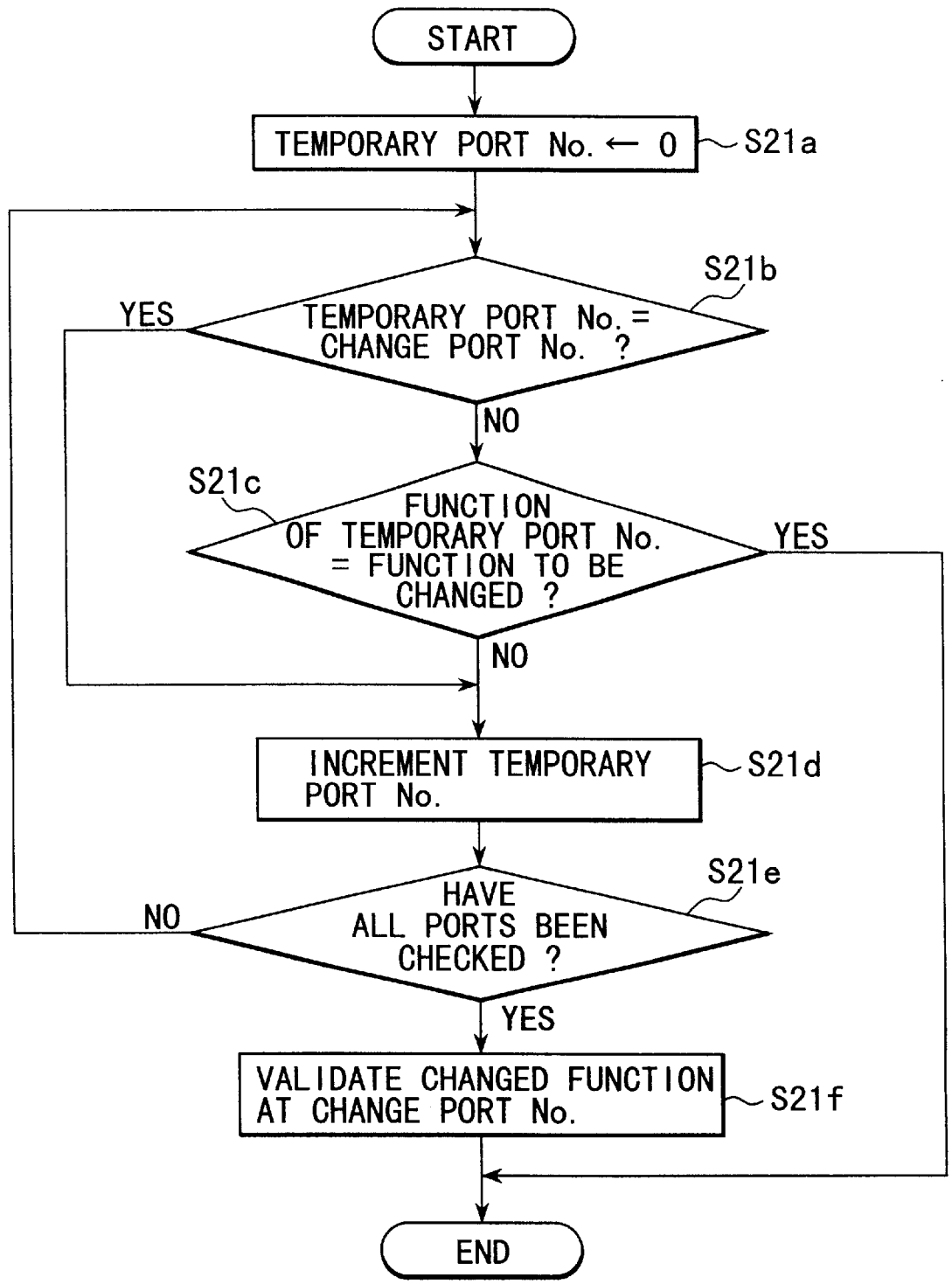
FIG. 21 is a flow chart showing the procedure and contents of determination processing when function setting is performed during the operation of the system.

FIG. 21 is a flow chart showing the procedure and contents of determination processing when function setting is performed during the operation of the system. In step S21a in FIG. 21, the temporary port number is set at "0" as an initial value. In step S21b, it is determined whether the temporary port number matches the port number to be changed. If NO In step S21b, it is determined in step S21c whether the function at the temporary port number equals the function to be changed.

If YES in step S21c, the newly set function works at another port. Function determination processing is ended. If NO in step S21c, the flow advances to step S21d to increment the temporary port number by one. If YES in step S21b, the flow advances to step S21d to increment the temporary port number by one.

When the temporary port number is incremented by one, the flow advances to step S21e to determine whether all ports are checked. If unchecked ports remain, the flow returns to step S21b to repeat the above determination processing. If YES in step S21e, the newly set function works at any other ports. The flow advances to step S21f to validate the function set for the port number to be changed.

With this function, even when functions with different contents are set from the personal computer, one of the functions is validated in accordance with a predetermined rule. For this reason, even when a plurality of inconsistent functions are set, the system can be prevented from erroneously operating.

(2-3) Switching of Connection Interface in RSIU 14

As shown in FIG. 7, the RSIU 14 has the serial communication port 1413 with the RS232C interface function and the modem interface function, which switches these functions by the switching circuit 141e. The serial communication port 1413 is used in the following forms.

Figure 22:
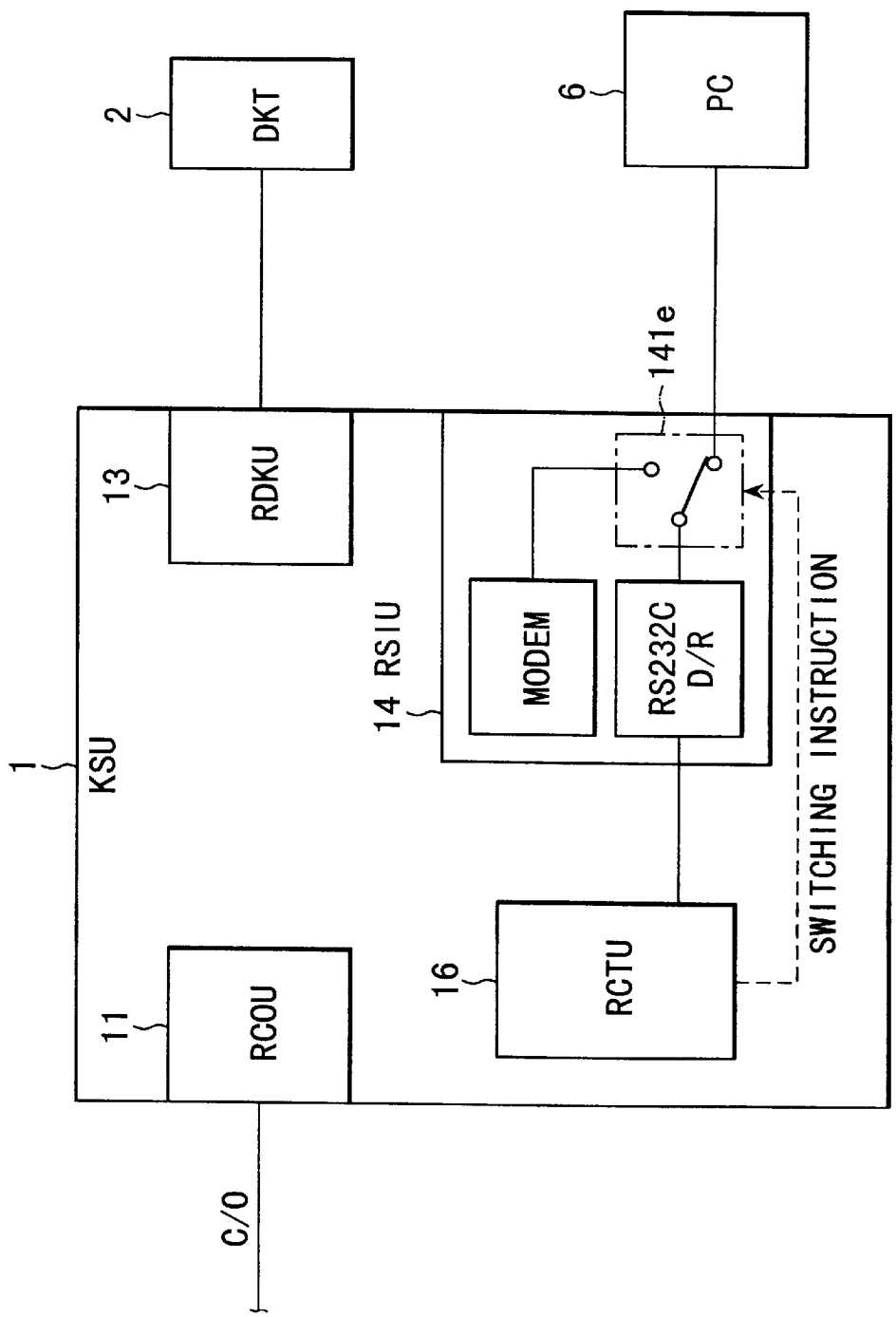
FIG. 22 is a view for explaining a state wherein an RS232C interface connection mode is set for the RSIU.

To use the serial communication interface function, the switching circuit 141e is set to the RS232C driver/receiver 141b side in accordance with a switching instruction from the RCTU 16, as shown in FIG. 22. The personal computer 3 as an external information device is connected to the RSIU 14. For this reason, the user can set the function of the system or confirm the set information in the system by using the personal computer 3.

Figure 23:
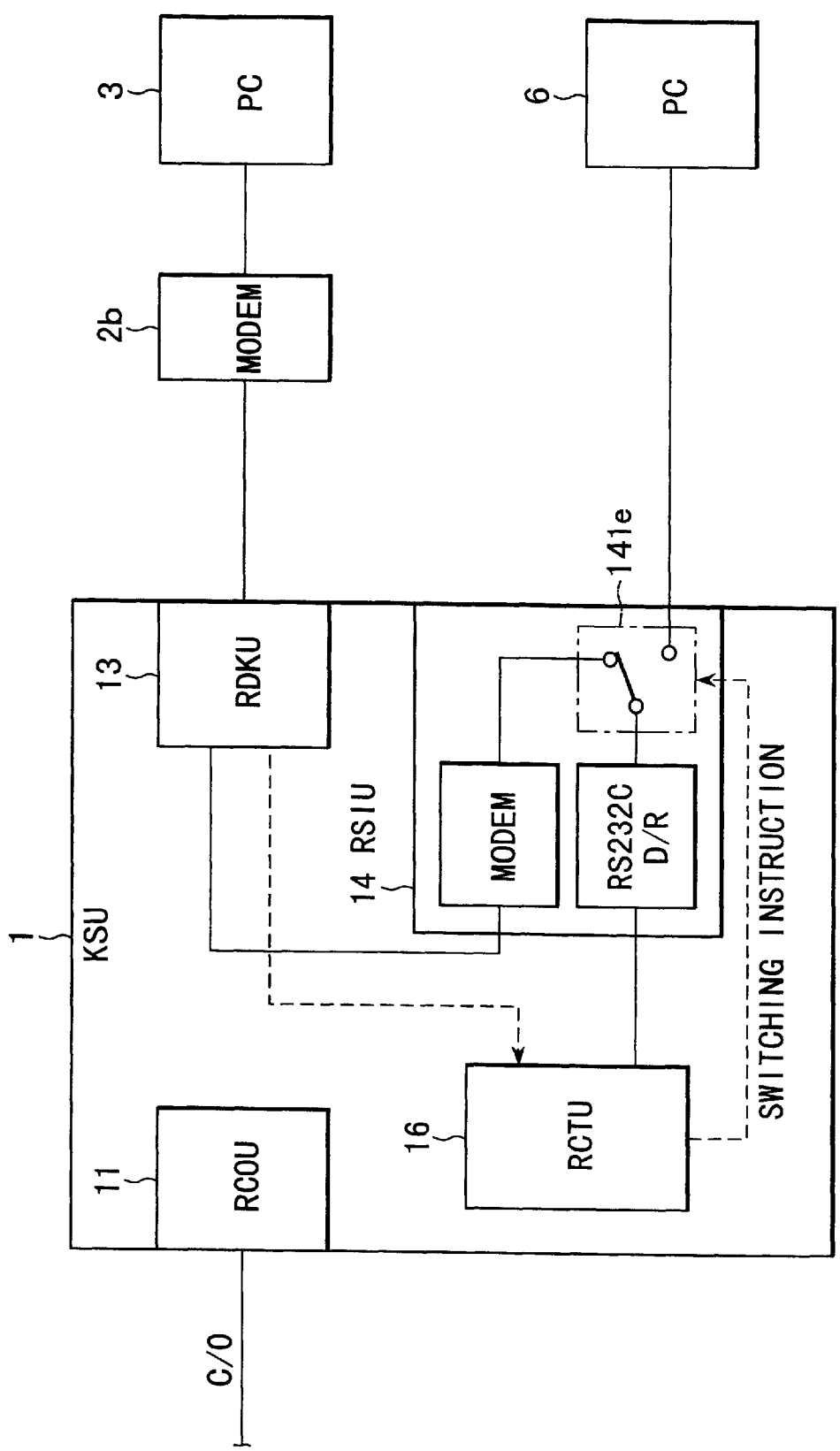
FIG. 23 is a view for explaining a state wherein a connection mode using a modem interface is set for the RSIU.

To use the modem interface function, the switching circuit 141e is set to the side of the modem 141c and the codec 141d in accordance with an instruction from the RCTU 16, as shown in FIG. 23. The personal computer 3 as an extension terminal device is connected to the RSIU 14 through the PCM highway 18 and the RDKU 13. For this reason, the user can perform function setting by using the personal computer serving as an extension terminal device. This use form can be set by inputting a command from the personal computer 3 as an extension terminal device to the RCTU 16.

Figure 24:
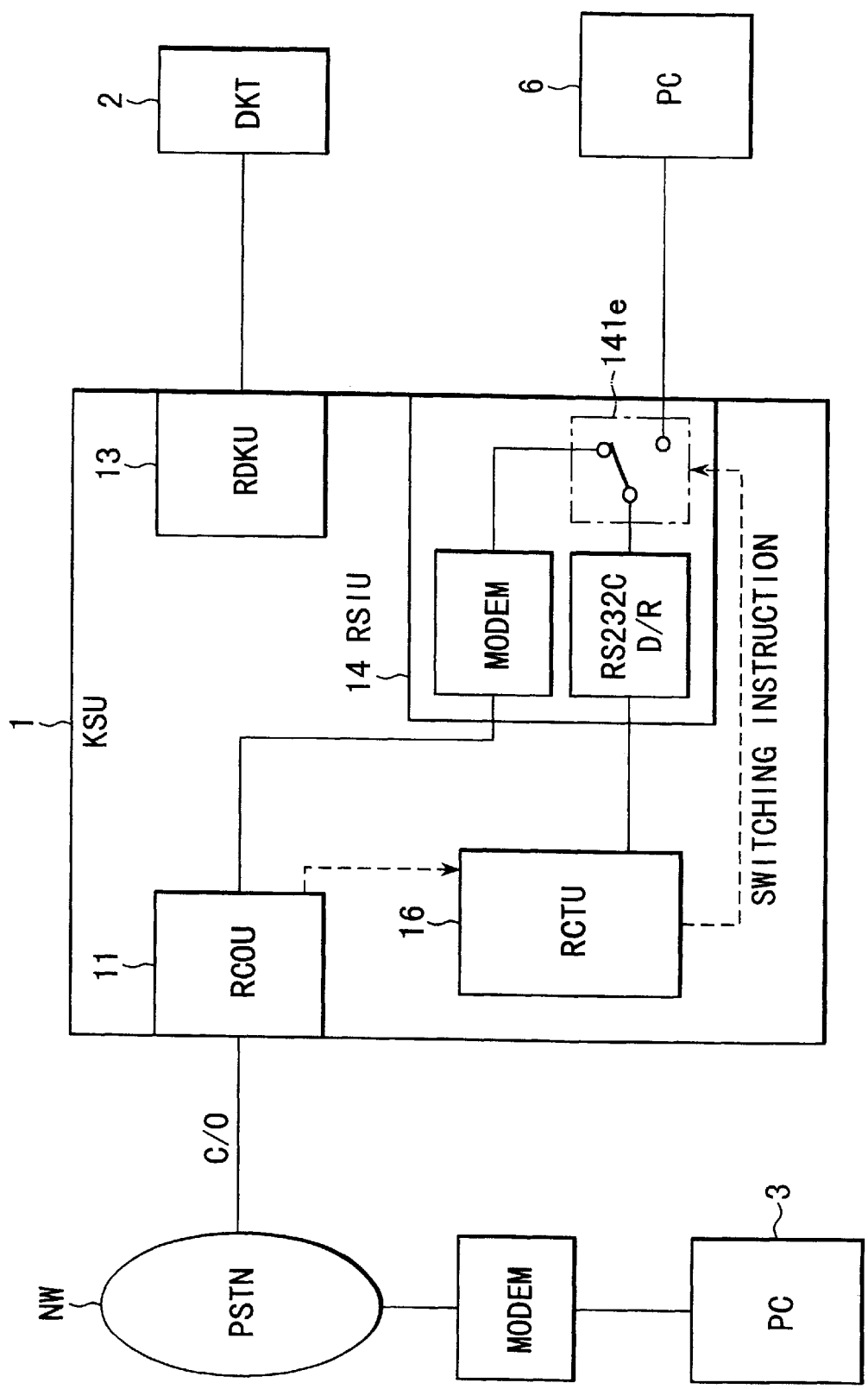
FIG. 24 is a view for explaining a state wherein a connection mode using a modem interface is set for the RSIU.

Another example of use of the modem interface function is shown in FIG. 24. The main unit 1 is called from the personal computer 3 in a remote site through the analog telephone network NW. After the response of the main unit 1, a command is input from the personal computer 3 to the RCTU 16. A switching instruction is sent from the RCTU 16 to the RSIU 14, and accordingly, the switching circuit 141e in the RSIU 14 is switched to the side of the modem 141c and the codec 141d. Subsequently, the personal computer 3 in the remote site is connected to the RSIU 14. The user can set the function of the system or confirm the set information in the system by using the personal computer 3.

As a result, data can be transmitted/received not only to/from the personal computer 3 connected to one of the serial communication ports 1410 to 1413 as an external information device but also to/from a personal computer connected as an extension terminal device or a personal computer in a remote site, which is connected through the analog telephone network NW.

(2-4) Loop Back Transfer in RSIU 14 The RSIU 14 has a loop back function for the RS232C port. As shown in FIG. 7, the RSIU 14 has a normal mode wherein data sent from the personal computer 3 is received by one of the serial communication ports 1410 to 1413 and then transferred to the RCTU 16 through the CPU bus 143 and the dual port RAM 142, and a loop back mode wherein data sent from the personal computer 3 is received by one of the serial communication ports 1410 to 1413, temporarily stored in the RAM 142 through the CPU bus 143, and then read out and transmitted from one of the serial communication ports 1410 to 1413 to the personal computer 3 of the data transmission source. Data transmission control in these modes is performed by the control section 140 in accordance with an instruction from the RCTU 16.

By using this function, the operation of, e.g., the main unit 1 can be evaluated. A personal computer having an evaluation function is connected to one of the serial communication ports 1410 to 1413. Evaluation data is transmitted from the personal computer while the transmission mode of the RSIU 14 is set in the normal mode and in the loop back mode.

In the normal mode, the evaluation data is received by the serial communication port, transferred to the RCTU 16 through the CPU bus 143, returned from the RCTU 16 to the RSIU 14 through the CPU bus 143, and then returned from the serial communication port to the personal computer of the evaluation data transmission source.

To the contrary, in the loop back mode, the evaluation data is received by the serial communication port, temporarily stored in the RAM 143 through the CPU bus 143, and then read out and returned from the serial communication port to the personal computer of the evaluation data transmission source.

The personal computer analyzes the evaluation data returned in both the modes and compares the data. It is determined on the basis of the analysis result whether a fault is present in the RSIU 14 itself or another unit such as the RCTU 16.

(2-5) Confirmation of Operation of Arbitrary Unit in Main Unit 1

The system of this embodiment can individually evaluate the operation of an arbitrary unit in the main unit 1. A monitor unit is connected to one of the serial communication ports 1410 to 1413 in the RSIU 14. A unit to be evaluated is individually selected from the units such as the RCOU 11, the RCIU 12, the RDKU 13, the RSTU 15, and the like. An evaluation unit is connected to the selected unit to supply evaluation data. The evaluation data is an ASCII code or a command for remote maintenance of the main unit, which is input from a personal computer.

The unit to be evaluated operates in accordance with the evaluation data. Data generated by the operation is transferred to the RCTU 16 through the data highway 17 and then transmitted from the RCTU 16 to the monitor unit through the RSIU 14. The monitor unit displays or prints the operation result data transmitted from the main unit 1. Therefore, the inspector or maintenance operator of the product can evaluate the operation state of the unit to be evaluated on the basis of the data displayed on or printed by the monitor unit.

For example, in the normal mode, a command for remote maintenance is input. If normal response data is returned from the main unit and displayed on the monitor unit, it is determined that the unit to be evaluated is normal. However, when abnormal response data is returned, the loop back mode is set, and an arbitrary ASCII code is input from the personal computer. If this input ASCII code is returned and displayed on the display of the personal computer without any change, it is determined that the data transmission system between the personal computer and the main unit is normal. In this case, it is determined that the remote maintenance program of the main unit has a problem. If the input ASCII code is not returned or displayed on the display, it is determined that the data transmission system between the personal computer and the main unit is abnormal.

(2-6) Wiring Installation of Transmission Rate for Serial Communication Ports 1410 to 1413 in RSIU 14

The total data transmission rate provided by the RSIU 14 is set at, e.g., 9,600 bps. When a transmission rate is permanently assigned to the serial communication ports 1410 to 1413 within this range of the total transmission rate, the transmission rate is 2,400 bps. However, all serial communication ports are not always connected to personal computers. In this case, the transmission capability of the RSIU 14 is partially unused.

To prevent this, in the system of this embodiment, the RSIU 14 has a function of assigning and controlling an adaptive data transmission rate. The RSIU 14 stores a table storing the correlation between the number of ports to be used and the data transmission rate in the RAM 142. FIG. 25 shows an example of the table storing the correlation between the number of ports to be used and the data transmission rate. In wiring installation, the control section 140 assigns a transmission rate to each port. Every time a transmission rate is assigned, it is checked with reference to the table whether the total transmission rate does not exceed 9,600 bps. If the total transmission rate exceeds 9,600 bps, the user is notified of the error. The user checks transmission rate setting for the remaining ports and reassigns a transmission rate to the target port. If the sum of the assigned transmission rates is equal to or smaller than 9,600 bps, this wiring installation is valid.

A total of five types of external connection devices can be connected to the serial communication ports 1410 to 1413: a teletype (TTY), a communication management recording unit (SMDR), a communication information management terminal (MIS), an SMDI, and a CLASS/O.A. When the user determines the type of unit to be connected, i.e., the use purpose of a port, the communication scheme such as a bit length, i.e., the transmission attribute is automatically determined by the control section 140. FIG. 26 shows the correlation between the use purpose and the communication scheme.

In starting for the first time, the first port 1410 is set for a TTY to allow an operation at 2,400 bps while the remaining ports are set in an inoperative state. If wiring installation has been performed upon powering on, the wiring set value has priority. Therefore, the user can perform wiring installation by using the first port without setting a port to be exclusively used for wiring installation. With this arrangement, the user can always grasp the transmission rate and is not confused anymore.

Presence of the same use purpose at a plurality of ports is inhibited. If a plurality of ports have the same use purpose, the port with the smallest ordinal number has priority over the remaining ports, and ports with larger ordinal numbers are neglected. This determination is done by the RCTU 16 when the unit is inserted.

(2-7) Determination of Capacity (Power Factor) of Units and Extension Terminals in System Installation In the conventional power factor determination, the engineer manually calculates the power factor of each unit or digital telephone to be mounted, and the obtained value is collated with the sum of power factors of the system, thereby determining whether the connection capacity of the units and digital telephones is appropriate. For this reason, power factor determination takes much labor and time.

In the system of this embodiment, the RCTU 16 detects the power factor of each of the units mounted in the main unit 1 and the digital telephones 2 connected to the RDKU 13 to calculate the sum. The calculated value is collated with the rated value of the power factor of the system, e.g., 24 V/70 mA. If the resultant value exceeds the rated value, a warning message is sent to the digital telephone or personal computer for wiring installation and displayed on the LCD.

Even when a number of extension terminals beyond the prescribed value of the power factor are to be connected by the engineer or the like, he/she is warned of it by the message. Therefore, mounting and connection of a number of units and extension terminals beyond the prescribed value of the power factor can be prevented.

(2-8) Connection between Basic cabinet 1a and Extension cabinet 1b

As shown in FIG. 1, the main unit 1 is constituted by stacking a plurality of extension cabinets 1b on the basic cabinet 1a and connecting the basic cabinet 1a to the extension cabinets 1b through data cables. The data transmission format between the basic cabinet 1a and each extension cabinet 1b is individually set on the basic cabinet 1a side in advance in accordance with the stacking position of the basic cabinet.

Assume that each extension cabinet 1b has four slots A, B, C, and D. Let BA, BB, BC, and BD be downward link data transmitted from the basic cabinet 1a to the slots A, B, C, and D. The number of channels of these downward link data BA, BB, BC, and BD changes for each extension cabinet 1b, as shown in FIG. 35. In FIG. 35, EA, EB, EC, and ED represent data names in each extension cabinet 1b.

For this reason, each extension cabinet 1b must have a unique data transmission function according to its stacking position. In this case, however, extension cabinets of different types corresponding to the number of stages must be prepared, and common extension cabinets cannot be used, resulting in an increase in cost of the system.

The system of this embodiment solves this problem in the following manner. A cabinet position recognition signal is sent from the basic cabinet 1a to each extension cabinet 1b, and the extension cabinet 1b recognizes its stacking position on the basis of the cabinet position recognition signal. In accordance with the recognized frame stacking position, an interframe transmission channel for signal transmission between the extension cabinet and the basic cabinet 1a and an intraframe transmission channel for signal transmission between the slots of the self frame are switched, and the number of time slots of each channel is converted.

Figure 27:
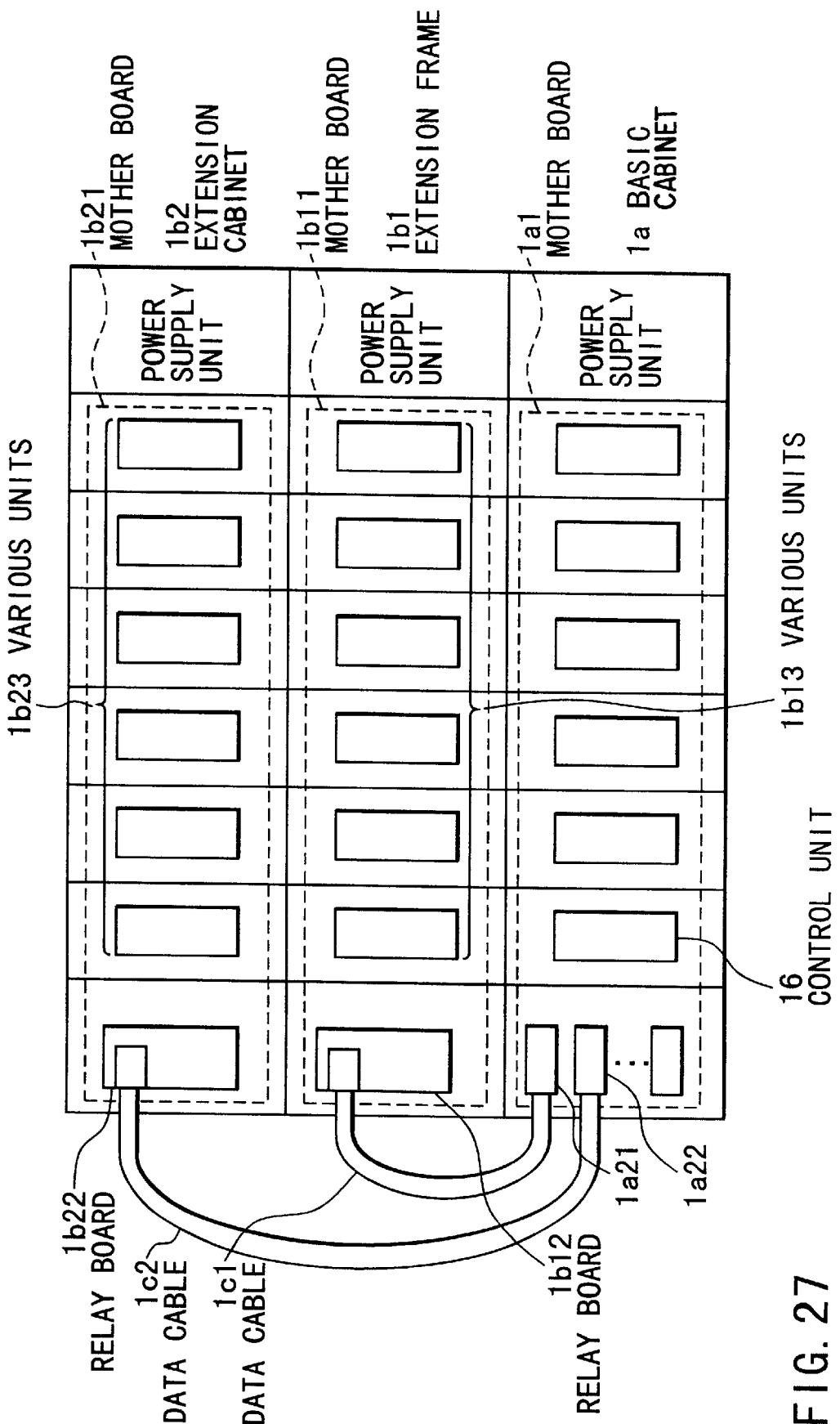
FIG. 27 is a view showing the connection structure between a basic cabinet and extension cabinets.
Figure 28:
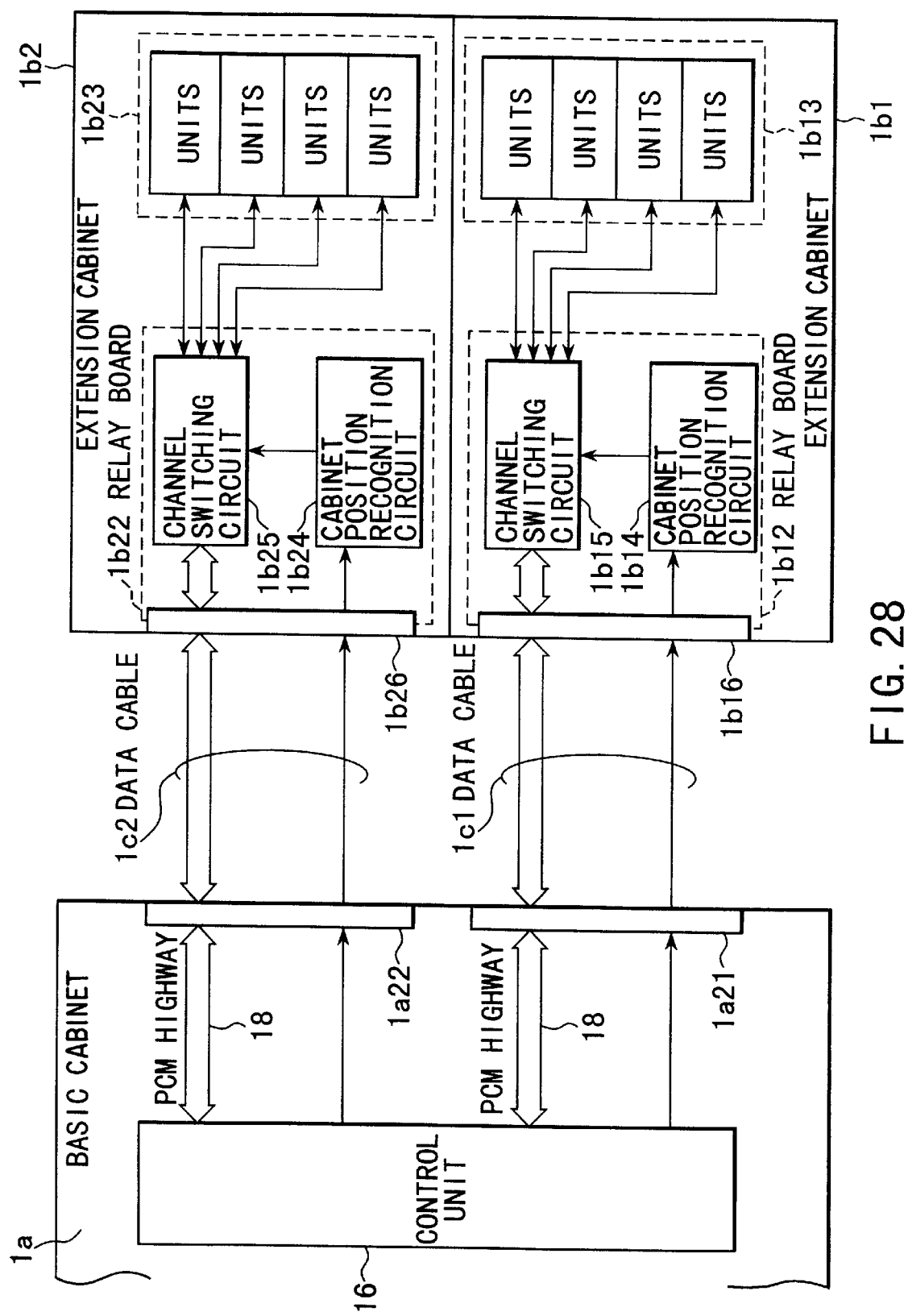
FIG. 28 is a block diagram showing the arrangement of a connection interface circuit between a basic cabinet 1a and extension cabinets 1b.

FIG. 27 is a view showing the connection structure between the basic cabinet 1a and the extension cabinets 1b. FIG. 28 is a block diagram showing the arrangement of a connection interface circuit. In FIGS. 27 and 28, only two of a plurality of (five in FIG. 1) extension cabinets 1b are illustrated for the descriptive convenience.

As shown in FIG. 27, a mother board 1a1 of the basic cabinet 1a has connectors 1a21 and 1a22 for connecting extension cabinets. Relay boards 1b12 and 1b22 of extension cabinets 1ba and 1b2 have relay boards 1b12 and 1b22 in addition to various units 1b13 and 1b23 such as the RDKUs 13, respectively. The relay boards 1b12 and 1b22 also have connectors 1b16 and 1b26, respectively. The connectors 1b16 and 1b26 are connected to the connectors 1a21 and 1a22 of the basic cabinet 1a through data cables 1c1 and 1c2, respectively.

The relay boards 1b12 and 1b22 have cabinet position recognition circuits 1b14 and 1b24 and channel switching circuits 1b15 and 1b25, respectively. The cabinet position recognition circuits 1b14 and 1b24 recognize the stacking positions of the self frames on the basis of cabinet position recognition signals sent from the basic cabinet 1a through the data cables 1c1 and 1c2 and notify the channel switching circuits 1b15 and 1b25 of the recognized cabinet position information. The cabinet position recognition signal is, e.g., a 2-bit signal generated by selectively connecting two signal lines to the power supply (5V) and the ground terminal on the mother board 1a1 of the basic cabinet 1a or generated by the control unit 16.

Figures 29, 30:
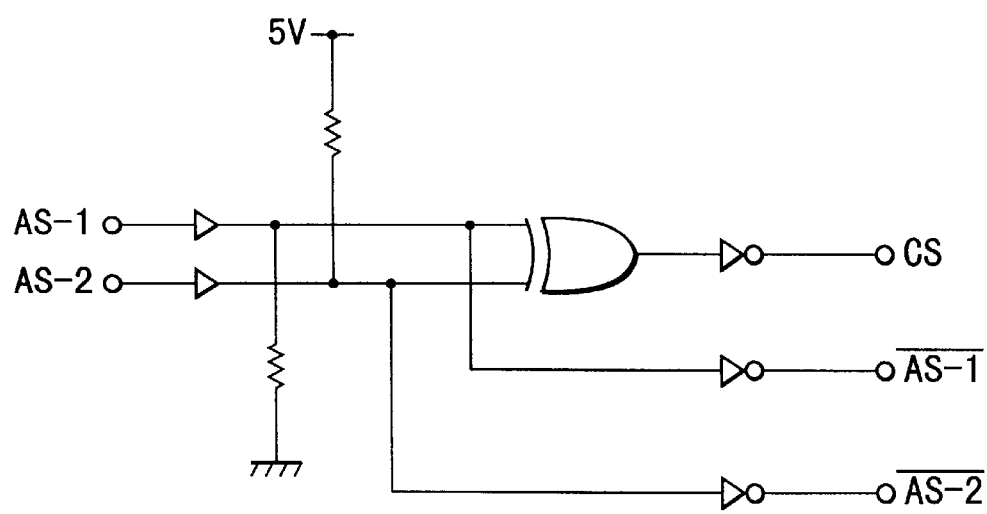
FIG. 29 is a table showing the correlation between each extension cabinet, a cabinet position recognition signal, and a data channel switching signal.
FIG. 30 is a circuit diagram showing the circuit arrangement of a cabinet position recognition circuit.

FIG. 29 is a table showing the correlation between the extension cabinets 1b1 and 1b2, cabinet position recognition signals AS-1 and AS-2, and a data channel switching signal CS (to be described later). FIG. 30 shows the circuit arrangement of each of the cabinet position recognition circuits 1b14 and 1b24. Each cabinet position recognition circuit is constituted by an exclusive OR circuit, an inverter circuit, a pull-up circuit, and a pull-down circuit. This circuit generates inverted cabinet position recognition signals AS-1/ and AS-2/ and the data channel switching signal CS in accordance with the input logic levels of the cabinet position recognition signals AS-1 and AS-2.

Each of the channel switching circuits 1b15 and 1b25 has a downward link switching circuit for channel-switching downward link data from the basic cabinet 1a to downward link data for a corresponding one of the extension cabinets 1b1 and 1b2 and an upward link switching circuit for channel-switching upward link data sent from each slot of the extension cabinet 1b1 or 1b2 to upward link data for the basic cabinet 1a on the basis of the cabinet position recognition signals AS-1/ and AS-2/ and the data channel switching signal CS output from a corresponding one of the cabinet position recognition circuits 1b14 and 1b24.

Figures 31, 32:
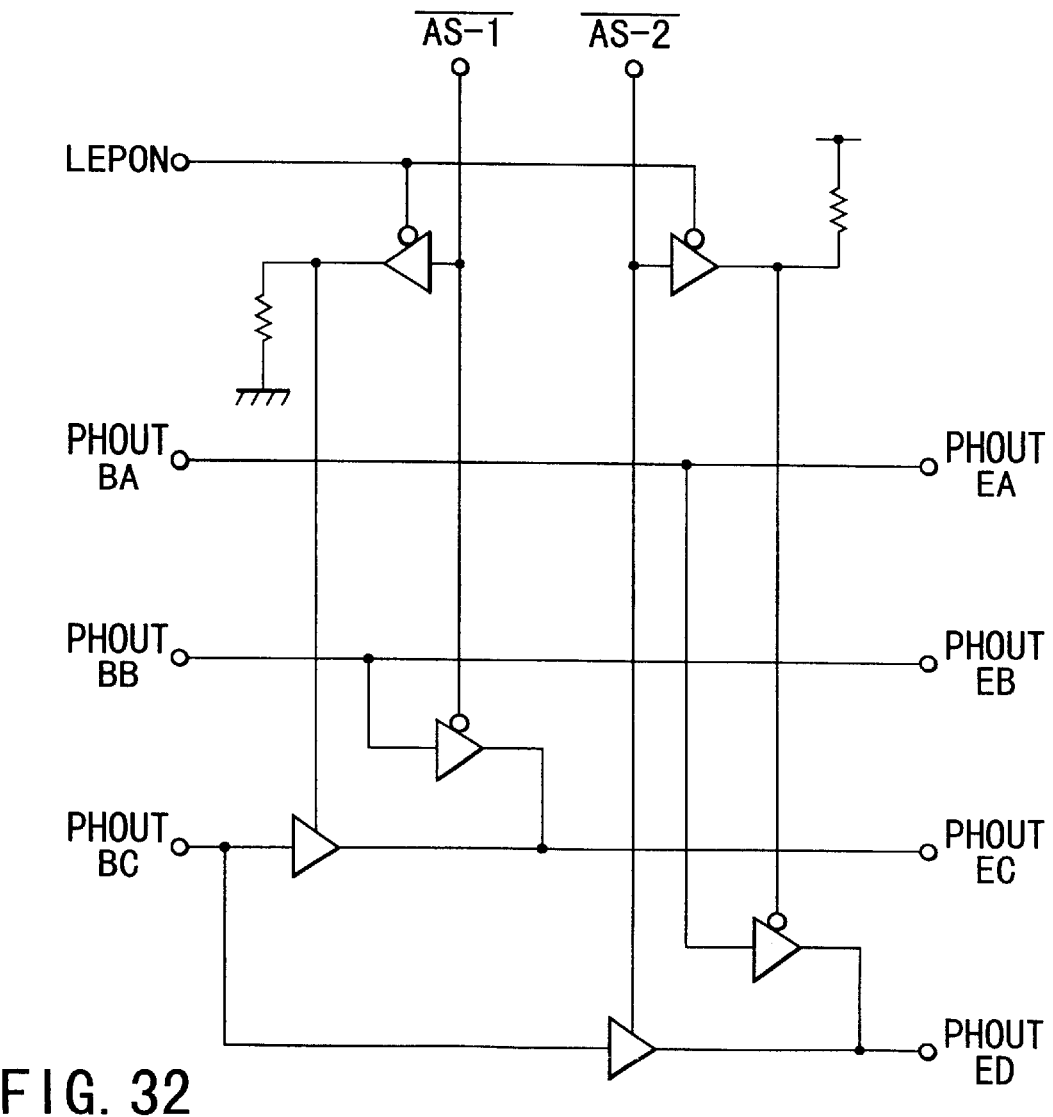
FIG. 31 is a table showing the correlation between basic-cabinet-side data and extension-cabinet-side data in a downward link switching circuit of each extension cabinet.
FIG. 32 is a circuit diagram showing the arrangement of the downward link switching circuit.

FIG. 32 shows an arrangement of the downward link switching circuit. This circuit has a plurality of gate circuits which are turned on/off in accordance with the cabinet position recognition signals AS-1/ and AS-2/. These gate circuits switch the downward link data BA, BB, and BC sent from the basic cabinet 1a to the downward link data EA, EB, EC, and ED for the slots A, B, C, and D in the extension cabinets 1b1 and 1b2. FIG. 31 shows the correlation between the basic cabinet side data BA, BB, and BC and the extension cabinet side data EA, EB, EC, and ED in the downward link switching circuits of the extension cabinets 1b1 and 1b2.

Figures 33, 34:
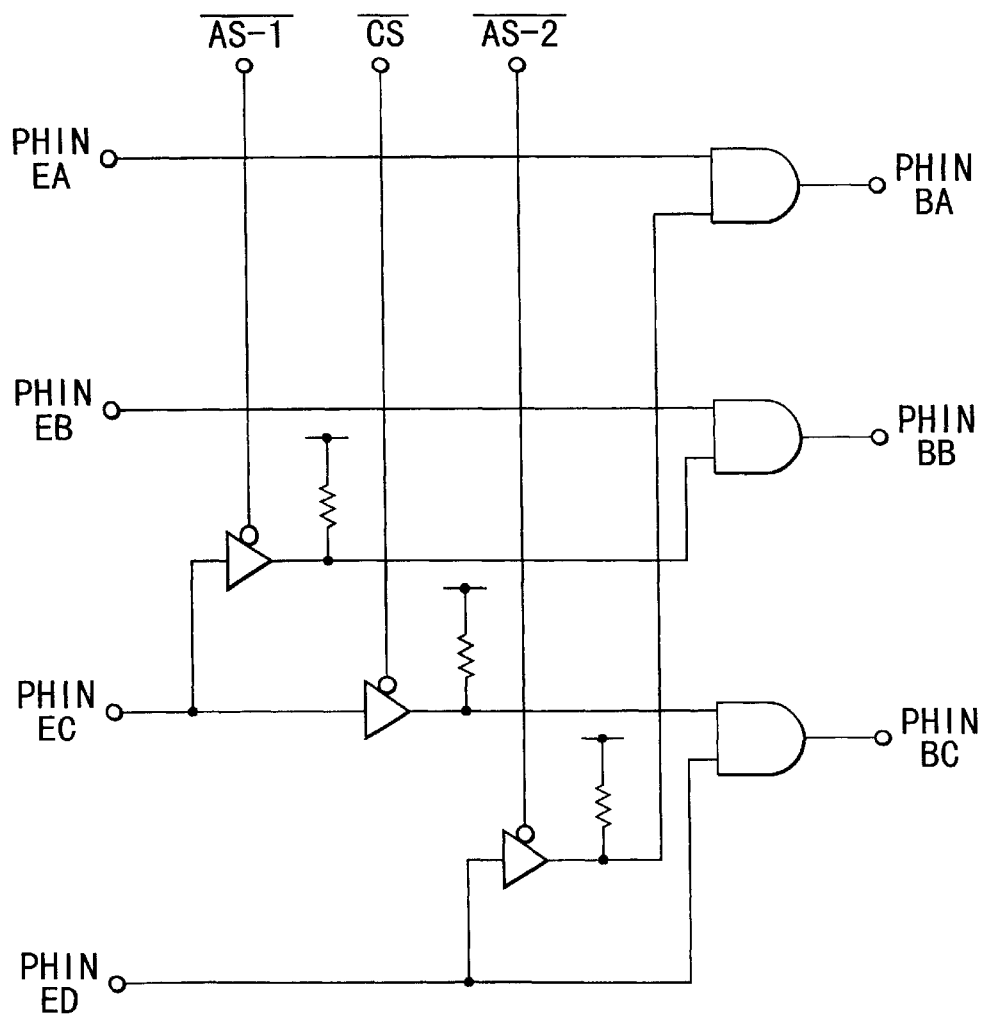
FIG. 33 is a table showing the correlation between the basic-cabinet-side data and the extension-cabinet-side data in an upward link switching circuit of each extension cabinet.
FIG. 34 is a circuit diagram showing the arrangement of the upward link switching circuit.

FIG. 34 shows an arrangement of the upward link switching circuit. This circuit has three gate circuits which are turned on/off in accordance with the cabinet position recognition signals AS-1/ and AS-2/ and the data channel switching signal CS/, three pull-up circuits for pulling up the output terminals of the gate circuits, and three AND gates which are turned on in accordance with the output signals from the gate circuits. Upward link data sent from the slots A, B, C, and D in the extension cabinets 1b1 and 1b2 are switched to the upward link data BA, BB, and BC to the basic cabinet 1a in accordance with the cabinet position recognition signals AS-1/ and AS-2/ and the data channel switching signal CS/. FIG. 33 shows the correlation between the basic cabinet side data BA, BB, and BC and the extension cabinet side data EA, EB, EC, and ED in the upward link switching circuits of the extension cabinets 1b1 and 1b2.

With this arrangement, the extension cabinets 1b1 and 1b2 recognize the self stacking positions on the basis of the cabinet position recognition signals AS-1 and AS-2 from the basic cabinet 1a. In accordance with the recognition result, the transmission data channel between the basic cabinet 1a and the slots A, B, C, and D in each of the extension cabinets 1b1 and 1b2 is switched. That is, the extension cabinets 1b1 and 1b2 autonomously execute channel switching according to their stacking positions. For this reason, the extension cabinets 1b1 and 1b2 can have a common arrangement, and the cost of the extension cabinet can be reduced.

In the above description, the cabinet position recognition circuits 1b14 and 1b24 and the channel switching circuits 1b15 and 1b25 are mounted on the relay boards 1b12 and 1b22, respectively. However, these circuits may be directly mounted on mother boards 1b11 and 1b21.

(3) Characteristic Operation in Sending/Receiving Call and in Communication (3-1) Level Control for DTMF Signal When a dialing signal is to be sent from the main unit 1 to the public network NW, a DTMF signal is used. At this time, a signaling tone is sent to the calling digital key telephone 2 in synchronism with the DTMF signal sending operation to the public network NW. The signaling tone also uses a DTMF signal. However, the level of the DTMF signal as the signaling tone is set to be lower than that of the DTMF signal sent to the public network NW as the dialing signal. For this purpose, conventionally, a tone oscillator for generating a DTMF signal as a dialing signal and a tone oscillator for generating a DTMF signal as a signaling tone are independently arranged. A dialing signal and a signaling tone each having an appropriate signal level are sent by biasing the tone oscillators. With this arrangement, however, two tone oscillators having the same arrangement are required, resulting in a complex and expensive unit.

In the embodiment of the present invention, the time switch section 165 in the control unit 16 has the digital attenuator section 1653, as shown in FIG. 9. The digital attenuator section 1653 has eight attenuators from −18 dB to +3 dB. Every time slot data is input from the data memory 1652, one of the attenuators is activated in accordance with control data output from the connection memory 1657, so that the input time slot data is gain-controlled by the activated attenuator and output.

Figure 36:
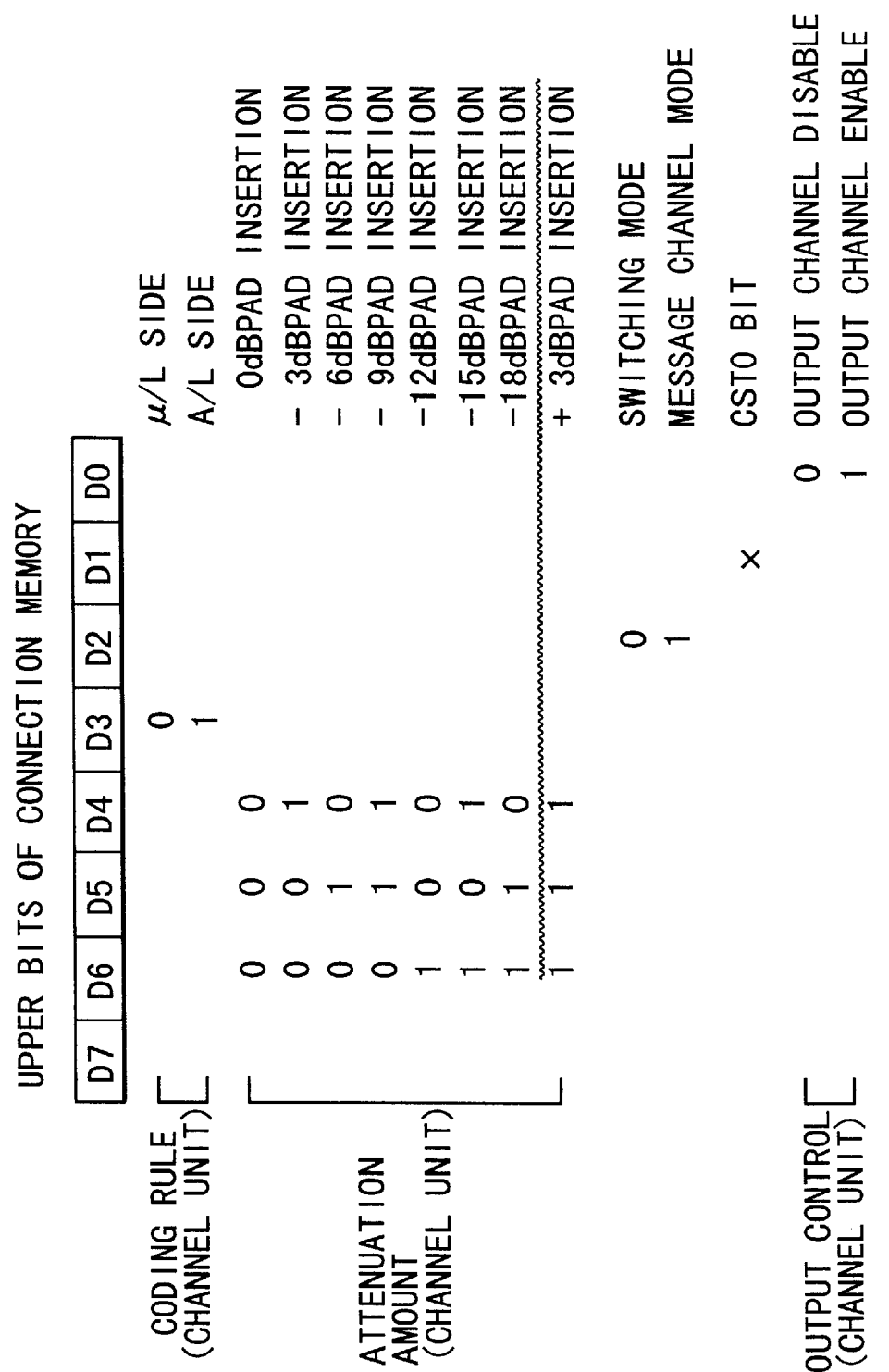
FIG. 36 is a view showing control data output from a connection memory.

FIG. 36 shows an example of control data output from the connection memory 1657. Control data output from the connection memory 1657 has eight bits (D0 to D7). The signal bits D4 to D6 are used as bits for selecting one of the eight attenuators. The signal bit D3 is used to select one of the $\mu$/L rule and the A/L rule as a coding rule. The $\mu$/L rule is a PCM coding rule mainly used in the North America and Japan. The A/L rule is a PCM coding rule mainly used in England or the Southeast Asia. By allowing selection of one of the rules, a time switch of certain type can be used in any countries employing different coding rules.

The signal bit D0 is used to control the data output from the data memory 1652 or the multiplexer 1654 in units of channels. The signal bit D2 is used to select one of the switching mode and the message channel mode.

Figure 37A:
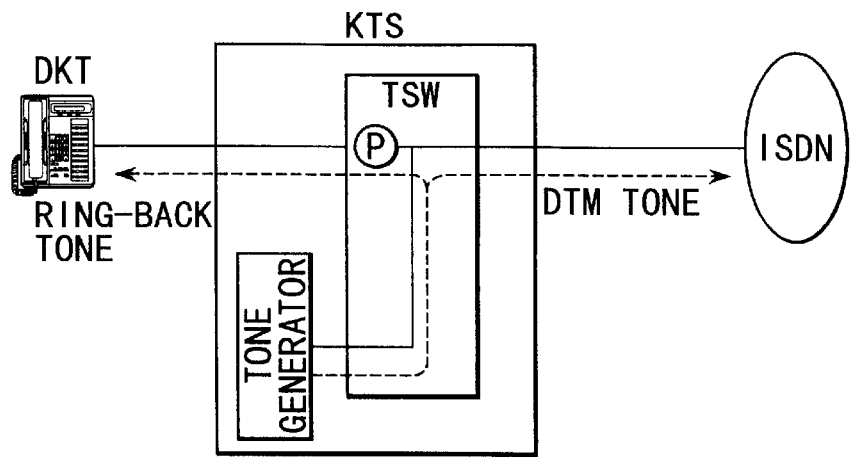
FIG. 37A is a view for explaining the first use example of a digital attenuator arranged in a time switch section.

With this arrangement, when a dialing signal consisting of a DTMF signal is to be sent to the public network NW in response to a calling request from the digital telephone key DKT, a DTMF signal generated from a tone generator is inserted into two different time slots and input to the time switch section 165, as shown in FIG. 37A. In the time switch section 165, an attenuator is selected at the switching timing of the first slot of the two time slots to apply an attenuation amount for a dialing signal to the DTMF signal. The DTMF signal in the first time slot is supplied with the attenuation amount for a dialing signal by the attenuator, transferred to the RCOU 11, and sent from the RCOU 11 onto the CO line toward the public network NW. When the signal sending destination is a CO line, an attenuation amount of −15 dB is inserted.

At the switching timing of the second slot, an attenuator is selected to apply an attenuation amount for a signaling tone. The DTMF signal in the second time slot is supplied with an attenuation amount for a signaling tone, i.e., an attenuation amount larger than that for the dialing signal by the attenuator, transferred to the RDKU 13, and sent from the RDKU 13 to the calling digital key telephone DKT. The above attenuation amount is not inserted during speech communication between the extension line and the CO line.

An attenuation amount of 8 dB is inserted for speech communication between extension lines.

That is, on the basis of a common DTMF signal generated by one tone generator, a DTMF signal having a signal level suitable for a dialing signal and a DTMF signal having a signal level suitable for a signaling tone are generated and sent to the public network NW and the calling digital key telephone DKT. For this reason, two DTMF generators having different output signal levels need not be prepared, so the circuit arrangement can be simplified and reduced in size, resulting in cost reduction of the main unit.

The attenuation amount insertion timing by the attenuator is limited to the signal sending timing. For example, in calling the CO line, the attenuation amount is inserted only during the dialing input period. After the dialing input period, attenuation amount insertion is canceled.

Figure 37B:
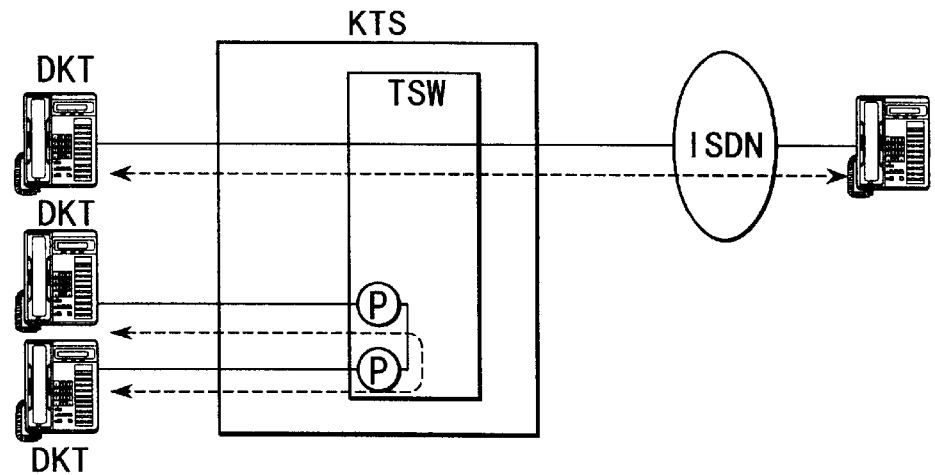
FIG. 37B is a view for explaining the second use example of the digital attenuator arranged in the time switch section.
Figure 37C:
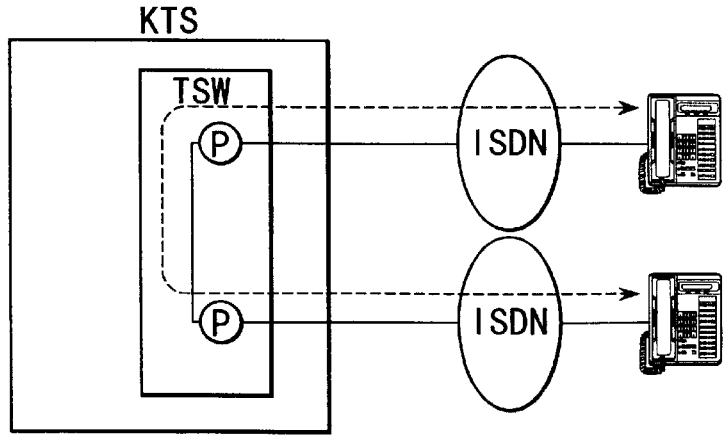
FIG. 37C is a view for explaining the third use example of the digital attenuator arranged in the time switch section.

Even when speech communication is performed between the digital key telephones DKT through the main unit 1, as shown in FIG. 37B, or speech communication is performed between office lines through the main unit 1, as shown in FIG. 37C, the speech communication signal level can be changed using the signal level changing function of the time switch section 165. For example, when the received volume from the other party of speech communication is too small to catch the words, the reception-side speaker performs an operation of increasing the reception level on the self digital key telephone. Control data having a received volume increasing request is sent from the digital key telephone to the main unit 1. In response to the request of the control data, the main unit 1 changes the attenuation amount of the digital attenuator section 1653 in the time switch section 165 to a smaller one at the switching timing of the time slot where the reception signal for the digital key telephone of the request source is inserted. With this operation, the volume of the reception signal for the digital key telephone of the request source is increased, and the speaker can obtain a satisfactory reception quality to catch the words.

(3-2) Differentiation of Camp-on Tone

The digital key telephone system according to the present invention has a camp-on function. The camp-on function will be described below.

By employing a multi DN function, various calls are received at DN keys. In this case, if there is an available DN key, a call is received at this DN key. However, if all DN keys are used, the call is not received and waits for an available DN key. At this time, the main unit send a tone signal to the called DKT and causes it to output a tone, thereby notifying the DKT user of call reception. The tone output from the DKT at this time is called a camp-on tone. The camp-on is called office line camp-on when a call is received by an office line, or extension camp-on when an extension line receives a call.

It is very convenient for the user if he/she can determine office line call reception or extension call reception only by listening to the output camp-on tone. The reason for this is as follows. When a new call is received by the office line during extension speech communication, the extension speech communication is immediately ended to answer the call on the office line because the call is from outside the company. If the call is received by the extension line, the extension speech communication can be continued such that the new call is answered after the end of the extension speech communication because the call is made inside the company. As described above, calls can be coped with in different manners.

However, conventionally, only a predetermined type of tone signal is used as the camp-on tone. For this reason, the user cannot determine the called line, i.e., the office line or the extension line only from the camp-on tone.

According to the present invention, in camp-on, the main unit 1 determines extension call reception or office line call reception, and the camp-on tone to be sent from the main unit 1 to the called DKT 2 in the busy state is changed in accordance with the determination result.

For example, for a call from the extension line, an unmodulated beep tone having a frequency of 2,000 Hz is sent to the called DKT 2 in the busy state using an intermittent pattern of 1-sec ON and 3-sec OFF. For a call from the office line, a beep tone having a frequency of 2,000 Hz and modulated at 10 Hz is sent to the called DKT 2 using an intermittent pattern of 1-sec ON and 3-sec OFF.

The arrangement for generating the camp-on tone changes depending on whether the called terminal is the DKT/EKT 2 or the standard telephone (STT) 4. The DKT/EKT 2 incorporates a beep tone (2 KHz) sound source. Therefore, when the called terminal is the DKT/EKT 2, the main unit 1 sends a command for instructing output of a camp-on tone for extension call reception or a command for instructing output of a camp-on tone for office line call reception to the DKT/EKT.

To the contrary, the standard telephone 4 has no beep tone sound source. For this reason, when the called terminal is the standard telephone 4, the main unit 1 must generate a camp-on tone by itself, mix or insert the camp-on tone into a speech communication signal, and send it to the standard telephone 4. In the main unit 1 of the present invention, the main CPU 161 controls the time switch section 165 in the control unit 16 to connect a sound source channel to the channel for the standard telephone 4 in a predetermined time.

Figure 104:
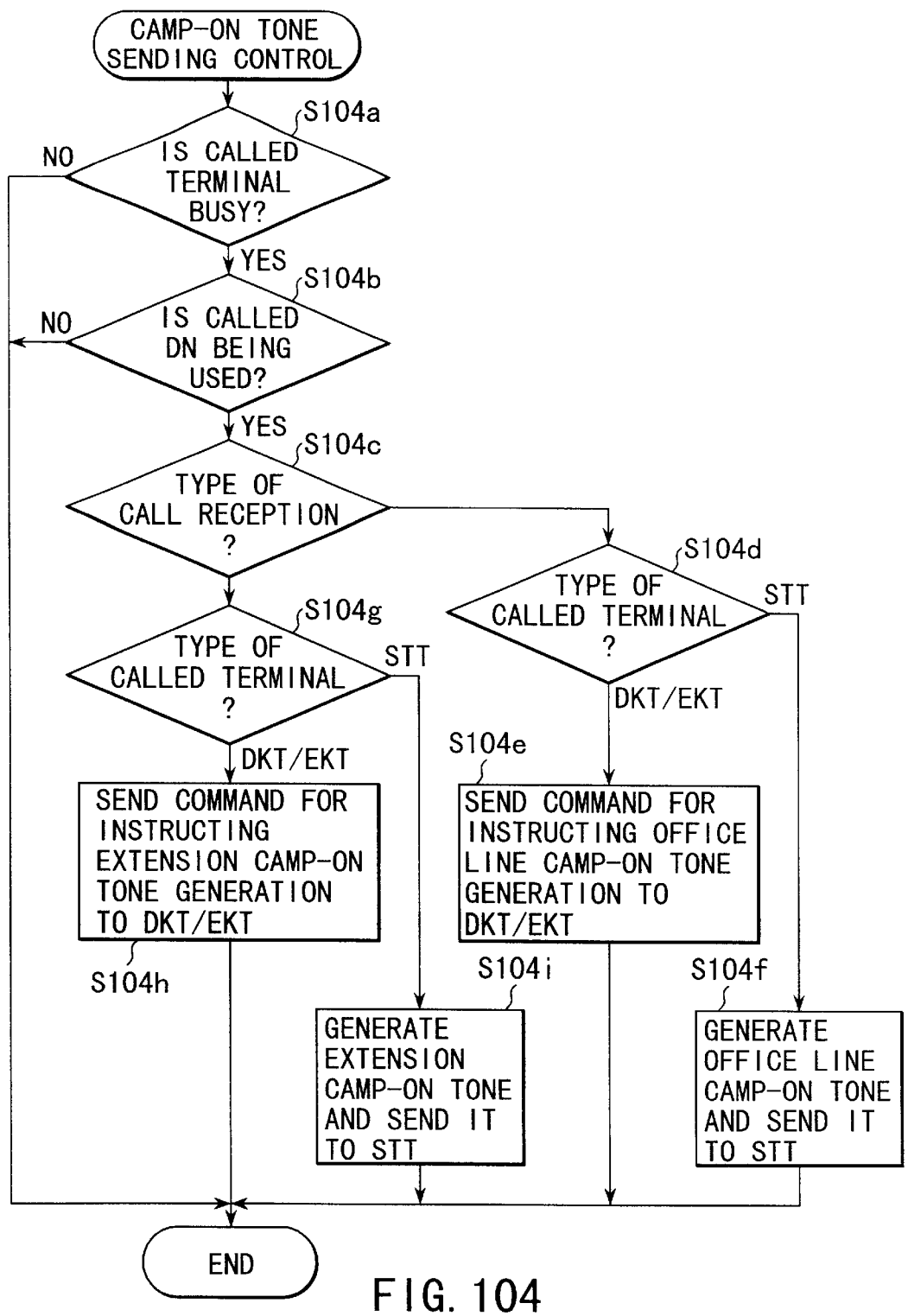
FIG. 104 is a flow chart showing the procedure and contents of camp-on tone sending control.

FIG. 104 is a flow chart showing the procedure and contents of the above-described camp-on sending control. Every time a calling request arrives from the office line (CO line) or the extension line, the RCTU 16 of the main unit 1 determines in step S104a whether the called terminal is busy. If YES in step S104a, the flow advances to step S104b to determine whether the called DN is a DN being used. If YES in step S104b, the flow advances to step S104c to determine the call reception type.

Figure 105A:
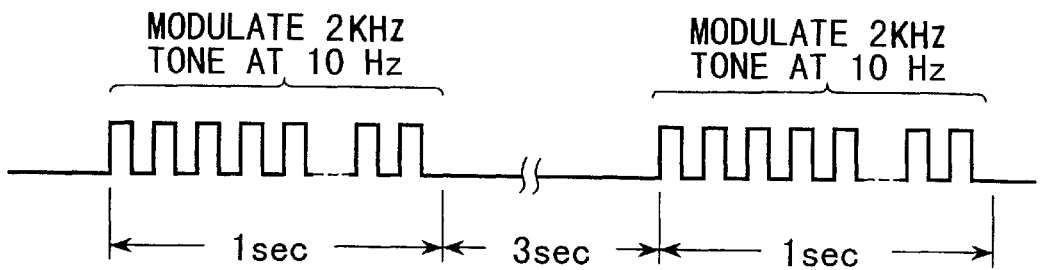
FIG. 105A is a chart showing the signal waveform of an office line camp-on tone generated by the DKT/EKT.

If it is determined in step S104c that a call from the office line is received, the flow advances to step S104d to determine whether the called terminal is the standard telephone (STT) 4 or the DKT/EKT 2. If the terminal is the DKT/EKT 2, a command for instructing generation of a camp-on tone for office line call reception is sent to the called DKT/EKT 2 in step S104e. In the called DKT/EKT 2 in the busy state, the internal sound source is driven in accordance with the command to generate a camp-on for office line call reception and notify the user of the call reception. As the camp-on tone to be used at this time, a beep tone having a frequency of 2,000 Hz and modulated at 10 Hz is generated using an intermittent pattern of 1-sec ON and 3-sec OFF. FIG. 105A shows the signal waveform.

Figure 105B:
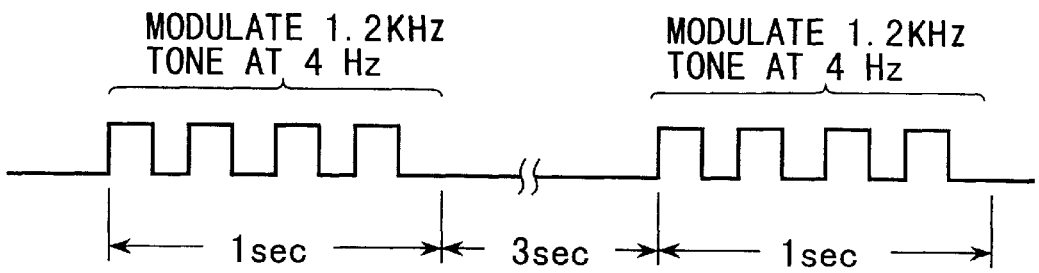
FIG. 105B is a chart showing the signal waveform of an extension camp-on tone generated by the DKT/EKT.

When the called terminal is the standard telephone 4, the flow advances to step S104f. The RCTU 16 drives a sound source channel for tone generation which is arranged in the main unit 1. The time switch section 165 is controlled to connect the sound source channel to the reception channel of the called standard telephone 4 intermittently at a predetermined period for office line call reception. Therefore, the camp-on tone for office line call reception, which is generated by the main unit 1, is mixed or inserted into the reception signal, sent to the standard telephone 4, and output from the reception loudspeaker together with the reception tone. As the camp-on tone to be output at this time, a beep tone having a frequency of 1,200 Hz and modulated at 4 Hz is generated using an intermittent pattern of 1-sec ON and 3-sec OFF. FIG. 105B shows the signal waveform.

Figure 105C:
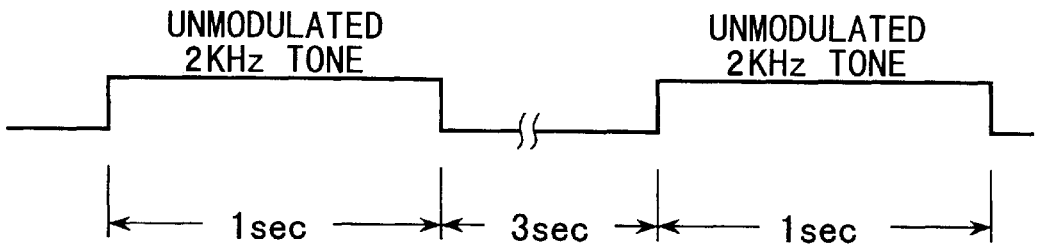
FIG. 105C is a chart showing the signal waveform of an office line camp-on tone generated by a standard telephone.

If a call is received from the extension line, the flow advances from step S104c to step S104g. The RCTU 16 determines whether the called terminal is the standard telephone (STT) 4 or the DKT/EKT 2. If the terminal is the DKT/EKT 2, a command for instructing generation of a camp-on tone for extension call reception is sent to the called DKT/EKT 2 in step S104h. In the called DKT/EKT 2 in the busy state, the internal sound source is driven in accordance with the command to output a camp-on for extension call reception and notify the user of the call reception. As the camp-on tone to be used at this time, an unmodulated beep tone having a frequency of 2,000 Hz is generated using an intermittent pattern of 1-sec ON and 3-sec OFF. FIG. 105C shows the signal waveform.

Figure 105D:
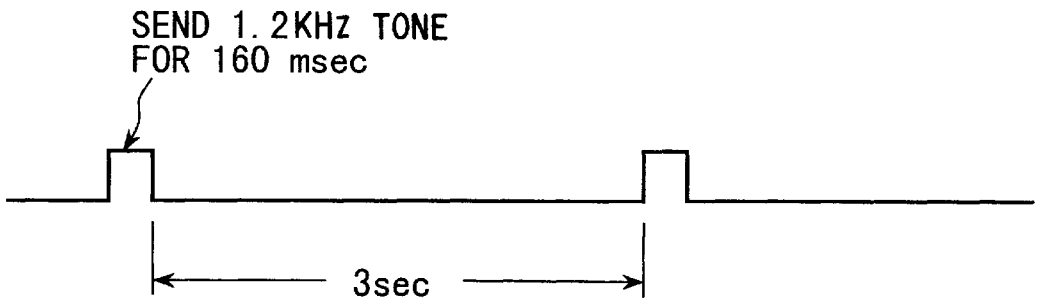
FIG. 105D is a chart showing the signal waveform of an extension camp-on tone generated by the standard telephone.

When the called terminal is the standard telephone 4, the flow advances to step S104i. The RCTU 16 drives the sound source channel for tone generation which is arranged in the main unit 1. The time switch section 165 is controlled to connect the sound source channel to the reception channel of the called standard telephone 4 intermittently at a predetermined period for extension call reception. Therefore, the camp-on tone for extension call reception, which is generated by the main unit 1, is mixed or inserted into the reception signal and sent to the standard telephone 4. As the camp-on tone to be used at this time, an unmodulated beep tone having a frequency of 1,200 Hz is generated using an intermittent pattern of 160-msec ON and 3-sec OFF. FIG. 105D shows the signal waveform.

With this arrangement, the DKT user who has received camp-on notification can identify whether the called line is the extension line or the office line from the difference between camp-on tones. On the basis of the identification result, the user can determine whether he/she should immediately answer the call or may answer the call after the current extension speech communication is complete.

It is determined whether the called terminal is the DKT/EKT 2 or the standard telephone 4, and if the terminal is the DKT/EKT 2, a command is sent from the main unit 1 to cause the DKT/EKT 2 to generate and output the camp-on tone. If the called terminal is the standard telephone 4, the camp-on tone is generated in the main unit 1 and sent to the standard telephone 4, so that the camp-on tone is output from the standard telephone 4. For this reason, both the DKT/EKT 2 and the standard telephone 4 can output the camp-on tone according to the present invention.

(3-3) Display of Directory Number (DN)

The digital key telephone system according to the present invention has a multi DN function. In the multi DN function, a plurality of directory numbers are set in correspondence with different DN keys of each digital key telephone, and various control operations including call sending/reception in the office line and extension line, various transfer operations such as call forward (CF), conference speech communication, voice calling (HFU), message waiting (MW), and call park (CP) are performed using the directory numbers.

The directory numbers are classified into a primary DN handled as a representative number, a secondary DN handled as a subordinate number, and a phantom DN handled as a virtual number. These directory numbers are arbitrarily set in one digital key telephone.

Operation examples of use of the DNs in the digital key telephone DKT will be described.

3-31 Extension Speech Communication Using DN Keys

Figure 95:
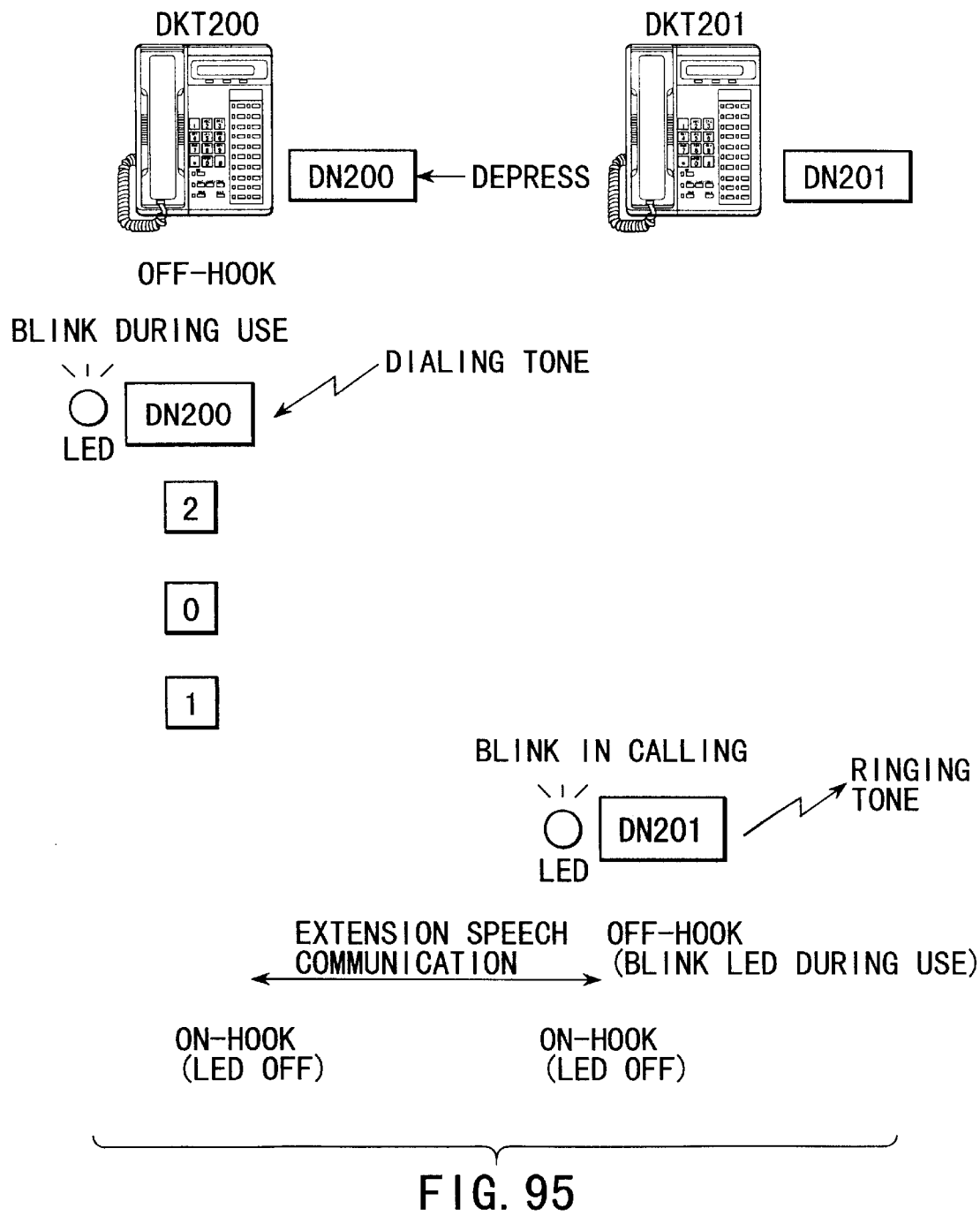
FIG. 95 is a view for explaining an extension speech communication operation using the DN keys.

FIG. 95 is a view for explaining this operation. Assume that the user of the DKT 200 performs an off-hook operation and depresses the DN200 key. An LED corresponding to the DN200 key blinks to display that the DN200 is being used. Upon depressing the DN200 key, the DKT 200 outputs a dialing tone. When the user who confirmed the dialing tone dials the extension number of the DKT 201, a call signal is sent from the main unit to the DKT 201. The called DKT 201 outputs an extension ringing tone, and at the same time, an LED corresponding to the DN201 key blinks to indicate that the DKT 201 is being called.

In this state, the user of the DKT 201 performs the off-hook operation or depresses the DN201 key, the calling DKT 200 and the called DKT 201 are connected by the main unit to allow speech communication between the DKTs 200 and 201. In the speech communication state, the LED corresponding to the DN201 key of the called DKT 201 blinks to indicate that the DKT 201 is being used. When speech communication is ended, and one of the DKTs performs a speech communication ending operation, the extension lines are disconnected, and the LEDs of the DKTs 200 and 201 are turned off.

3-32 Setting of CF Destination DN Using Primary DN Key

Figure 96:
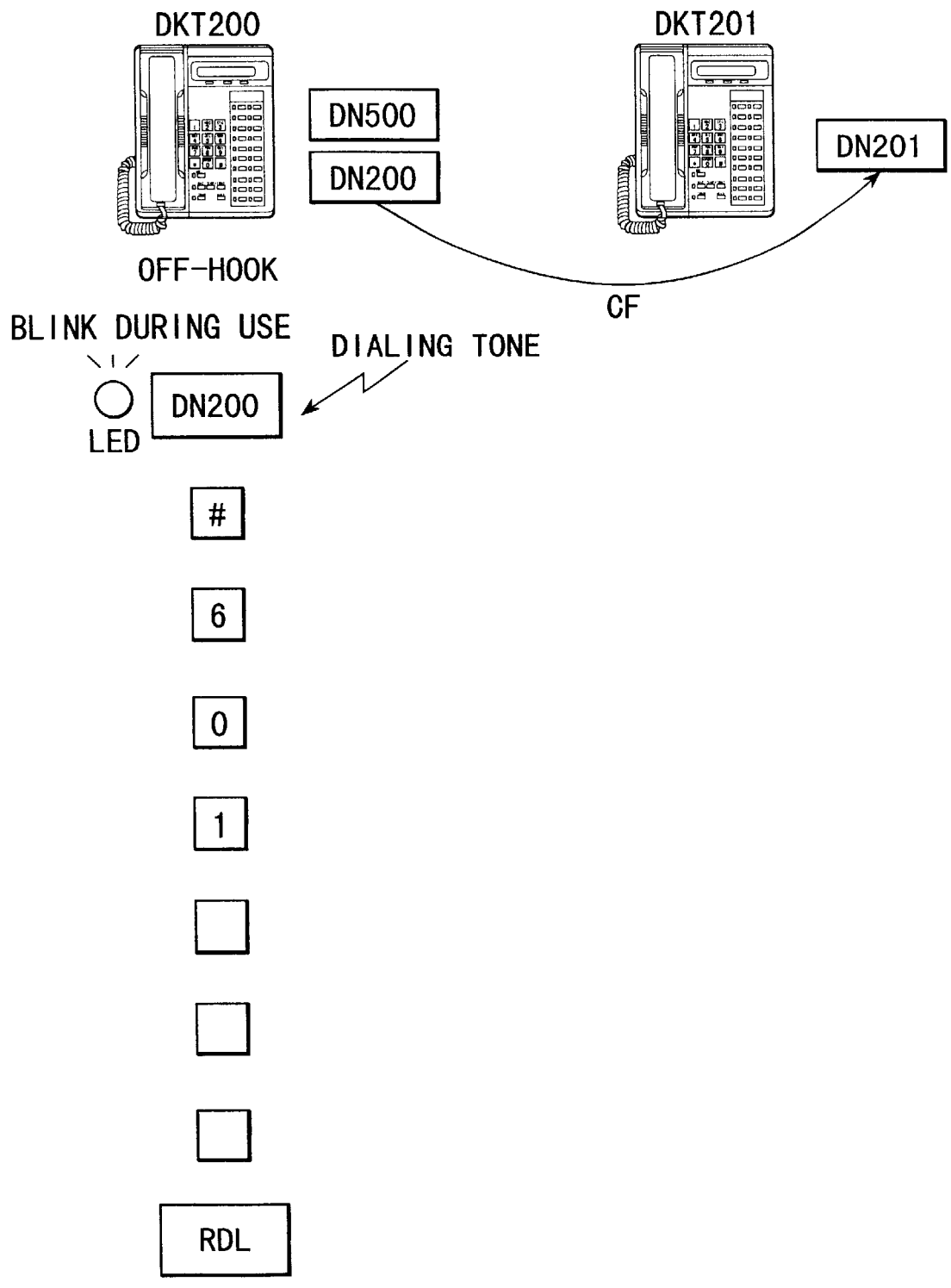
FIG. 96 is a view for explaining a CF destination DN setting operation using a primary DN key.

FIG. 96 is a view for explaining this operation. When a CF destination is to be set using the primary DN key, the user of the DKT 200 of the CF setting source depresses the DN200 key, confirms the dialing tone, and then dials a CF setting special number "#601". Next, the user dials the extension number of the DKT 201 as the CF destination. Finally, the user depresses the RDL key to end setting. After this, a call received by the DN200 is transferred to the DN201 by the main unit.

3-33 Setting of CF Destination Using Phantom DN Key

Figure 97:
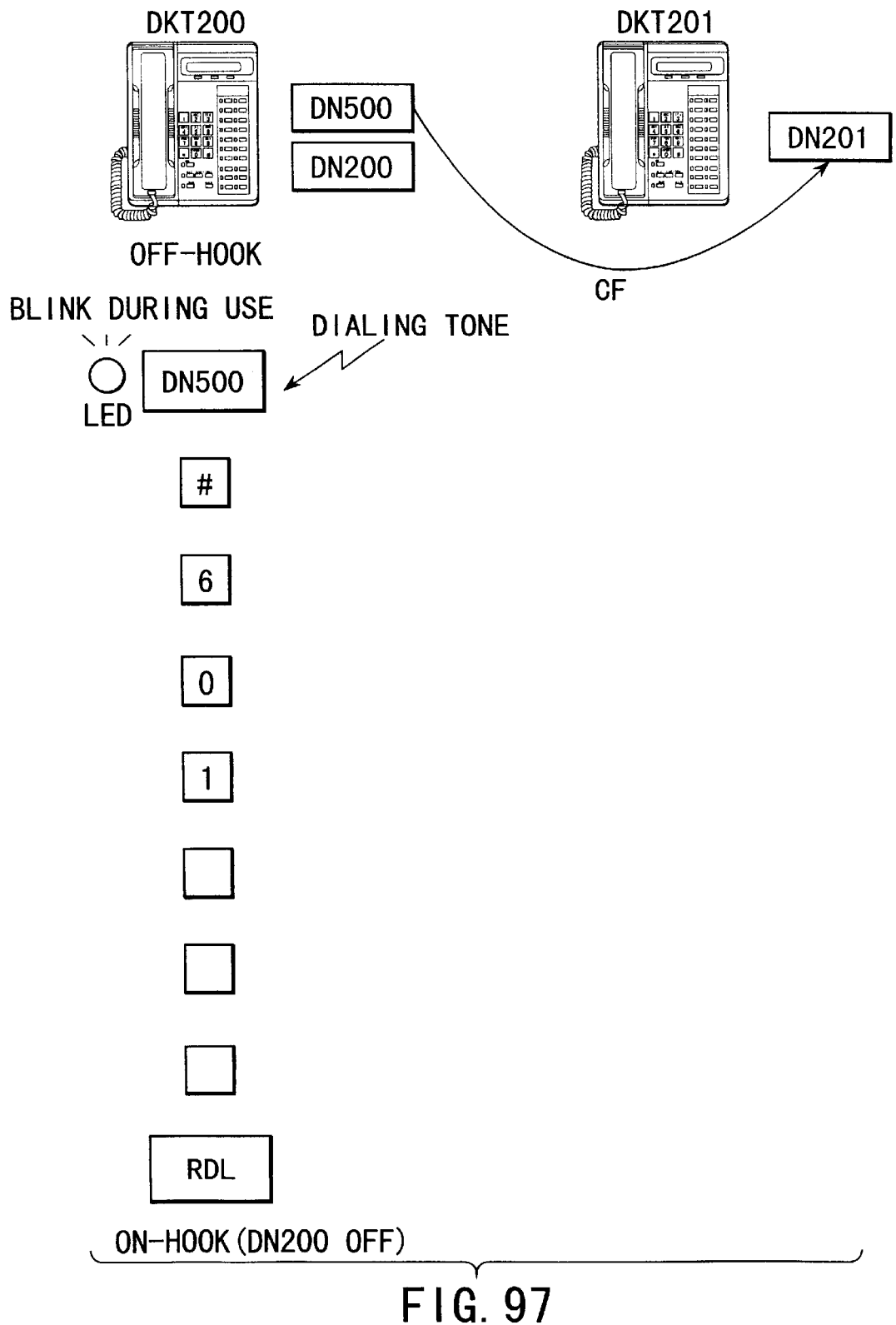
FIG. 97 is a view for explaining the CF destination DN setting operation using a phantom DN key.

FIG. 97 is a view for explaining this operation. A description will be made below assuming that the DKT 200 is registered in advance as the owner terminal of the DN500. To set the CF destination using the phantom DN key, the user of the DKT 200 of the CF setting source depresses the phantom DN500 key. The user confirms the dialing tone, dials the CF setting special number "#601", and then dials, e.g., the extension line, 203, of the DKT 203 as the CF destination. Finally, the user depresses the RDL key to end CF setting. After this, a call received by the DN500 of the setting source is transferred to the D 203.

3-34 Setting of Voice Mail ID Code Using Primary DN Key

Figure 98:
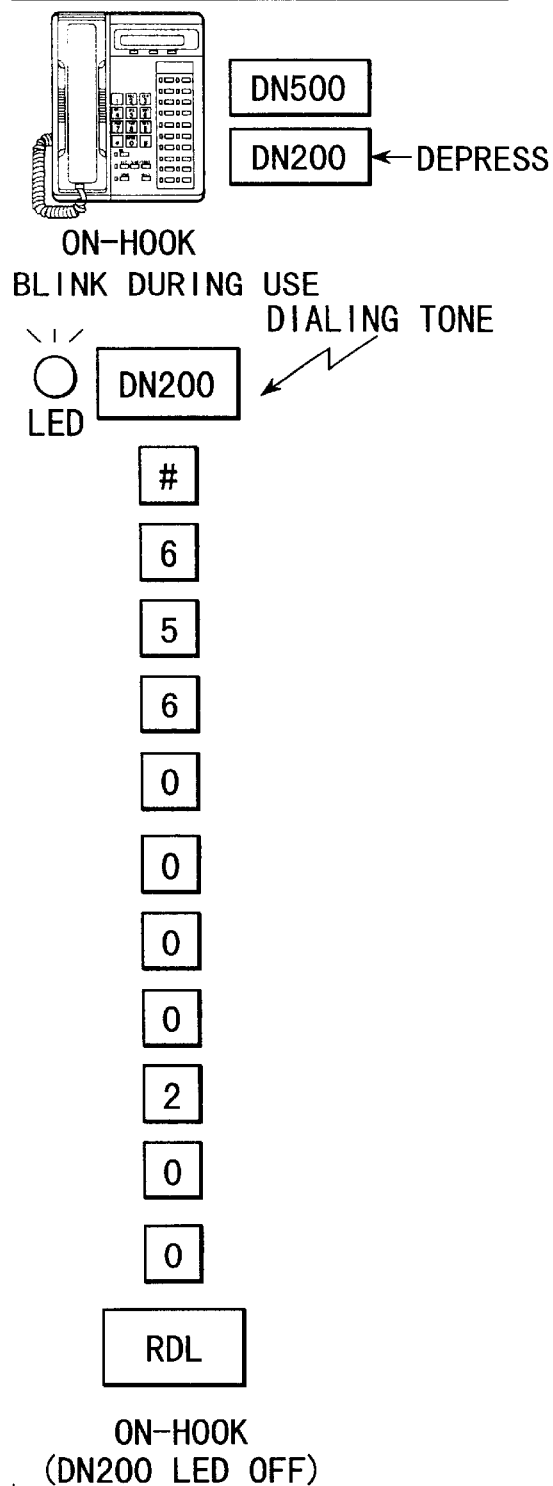
FIG. 98 is a view for explaining a voice mail ID code setting operation using the primary DN key.

FIG. 98 is a view for explaining this operation. When a voice mail ID code is to be set using the primary DN key, the user of the DKT 200 as the setting source depresses the DN200 key. The user confirms the dialing tone, dials a special number "#656" for setting the voice mail ID code, and dials the ID code. The user finally depresses the RDL key to end voice mail ID code setting.

A method of using the voice mail ID code will be described. The user performs, on the self DKT 200, an operation of setting the voice mail unit as the CF destination before he/she leaves the position. After this, a call received by the DKT 200 is transferred to the voice mail unit by the main unit so that the message from the calling line is recorded in the voice mail unit. The voice mail ID code represents an address for recording the message. When the voice mail unit answers the call, the voice mail ID code is sent from the main unit to the voice mail unit as a DTMF signal. With this operation, an address of the voice mail unit is designated to store the message.

When the message is recorded in the voice mail unit, the DKT of the CF source blinks a message lamp to notify the user that the message is recorded. The message lamp blinks when the voice mail unit sends a special number for blinking the message lamp to the DKT.

In this state, when the user comes back to the position and depresses the message lamp key, the voice mail unit is called back. The voice mail unit answers the call back, reproduces the message from the address represented by the ID code, and sends the message to the DKT.

3-35 Voice Mail ID Code Setting Using Phantom DN Key

Figure 99:
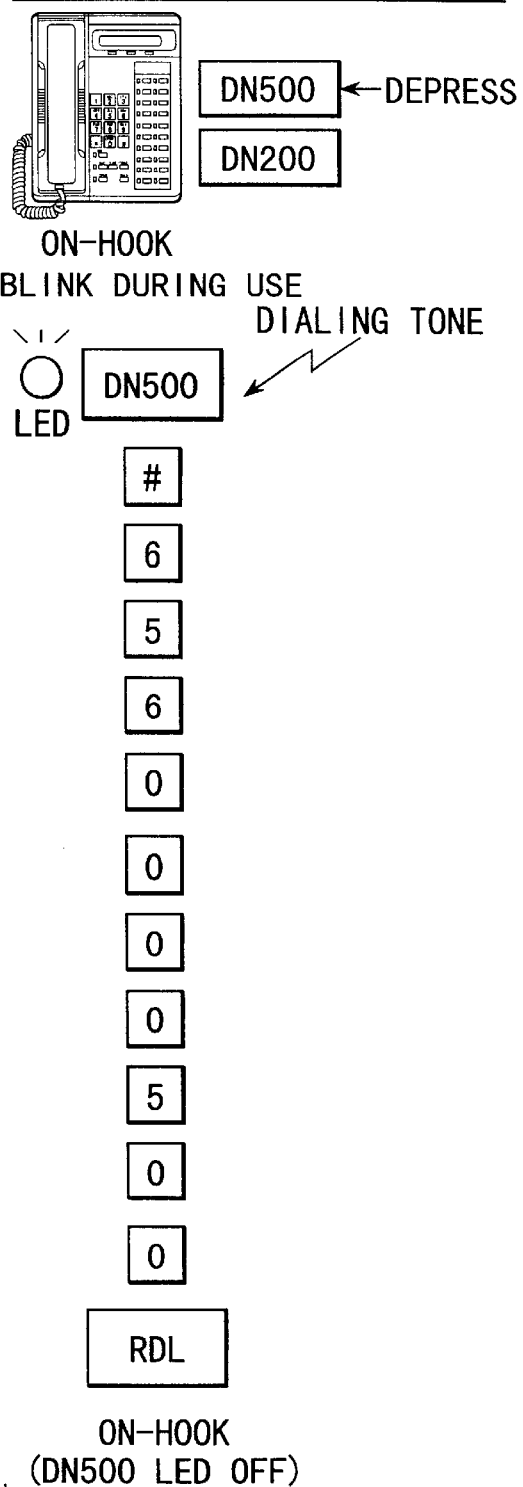
FIG. 99 is a view for explaining the voice mail ID code setting operation using the phantom DN key.

FIG. 99 is a view for explaining the operation. The user depresses the phantom DN500 key of the DKT 200 of the setting source. After confirmation of the dialing tone, the user dials #656 or the special number for setting the voice mail ID code and then dials the ID code corresponding to the phantom DN500. Finally, the RDL key is depressed. With this operation, voice mail ID code setting is complete.

When a call addressed to the DN500 is transferred to the voice mail unit, the voice mail ID code is sent from the main unit to the voice mail unit to designate a message storage address.

3-36 Display for Confirming DN Number

In the above-described multi DN function, the user can arbitrarily set a plurality of DN numbers in correspondence with the DN keys. Therefore, when the user is to use the key telephone of the third party, the user does not know the correspondence between the DN keys and the DN numbers. Even the user himself/herself may forget the directory numbers set for the DN keys to hinder call forward setting or the like. In addition, when the installation operator is to test extension calling in installing the system, and the DN numbers of the extension lines are unknown, function setting must be referred to, resulting in a considerably cumbersome operation.

Figure 38A:
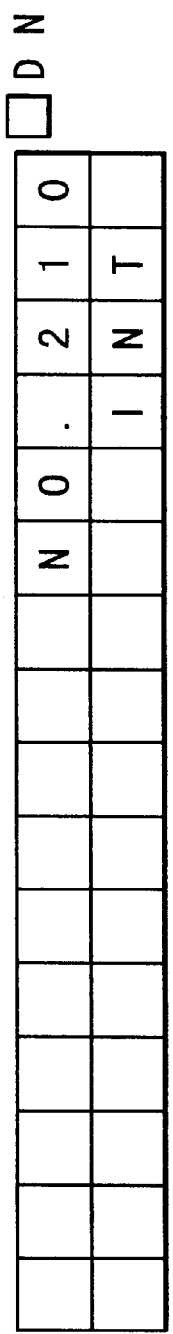
FIG. 38A is a view showing a display example upon depressing a directory key.
Figure 38B:
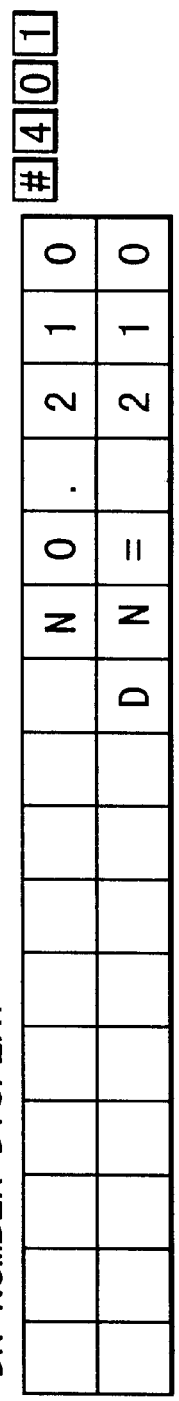
FIG. 38B is a view showing a display example upon inputting a directory number.
Figure 38C:
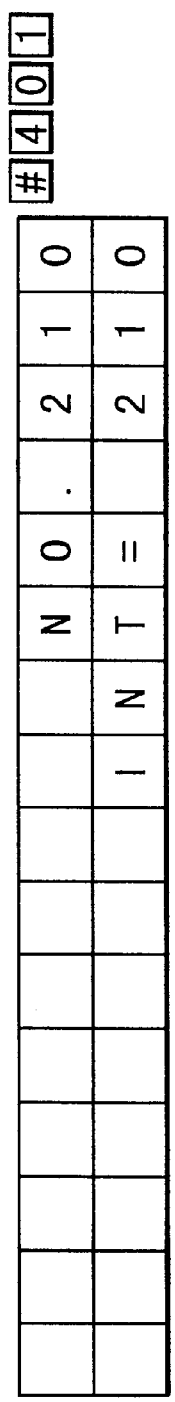
FIG. 38C is a view showing a display example upon inputting an extension number.

In the system of the present invention, when a directory key of the digital key telephone is depressed, and a predetermined special number operation is performed, the main unit 1 reads out the directory numbers set for the DN keys from the memory and displays them on the LCD 28 of the digital key telephone. FIGS. 38A to 38C show examples of the operation procedure and contents displayed on the LCD 28.

More specifically, to confirm the directory number set for an arbitrary DN key of the digital key telephone, the object DN key is depressed first. At this time, "INT" is displayed on the LCD 28 of the telephone, as shown in FIG. 38A. In this state, when a special number "#401" is input, the directory number corresponding to the DN key, "DN=210", is displayed on the LCD 28 under the control of the main unit 1, as shown in FIG. 38B.

Directory number confirmation is performed in correspondence with a selected DN key. For this reason, if the special number operation is performed while the secondary DN key is being selected, the directory number of the secondary DN key is displayed. Similarly, if the special number operation is performed while the phantom DN key is being selected, the directory number of the phantom DN key is displayed.

When the special number operation is performed to confirm the extension number after the DN key operation, the extension number "INT=210" is displayed, as shown in FIG. 38C. Therefore, the user can confirm the extension number corresponding to the DN key from this display.

FIGS. 39A to 39D show examples of the operation and display associated with an inquiry. FIGS. 39A, 39B, 39C, and 39D show DN number confirmation, extension number confirmation, accommodation position number confirmation, and slot number confirmation, respectively.

Figure 100:
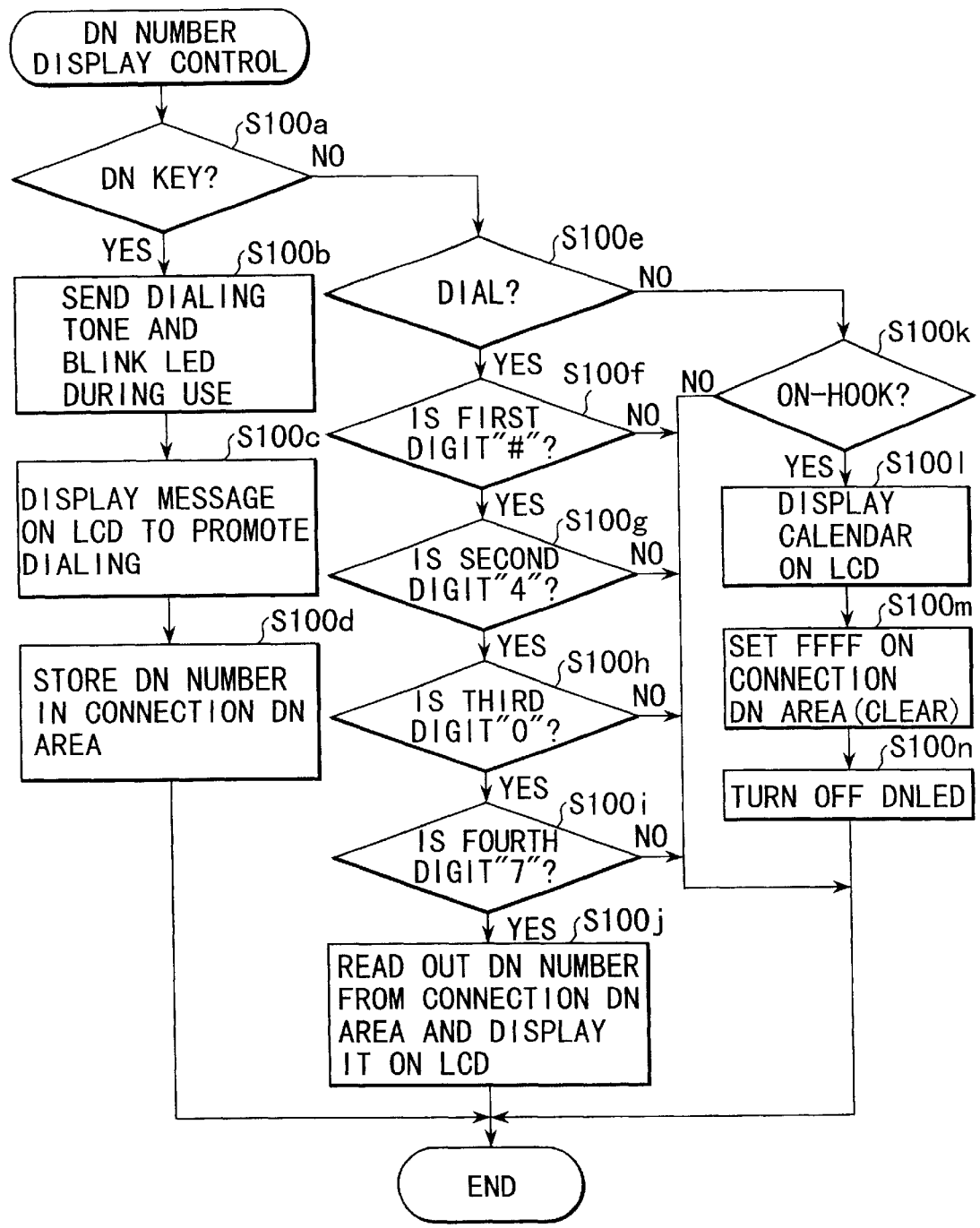
FIG. 100 is a flow chart showing the procedure and contents of DN number display control.
Figure 101:
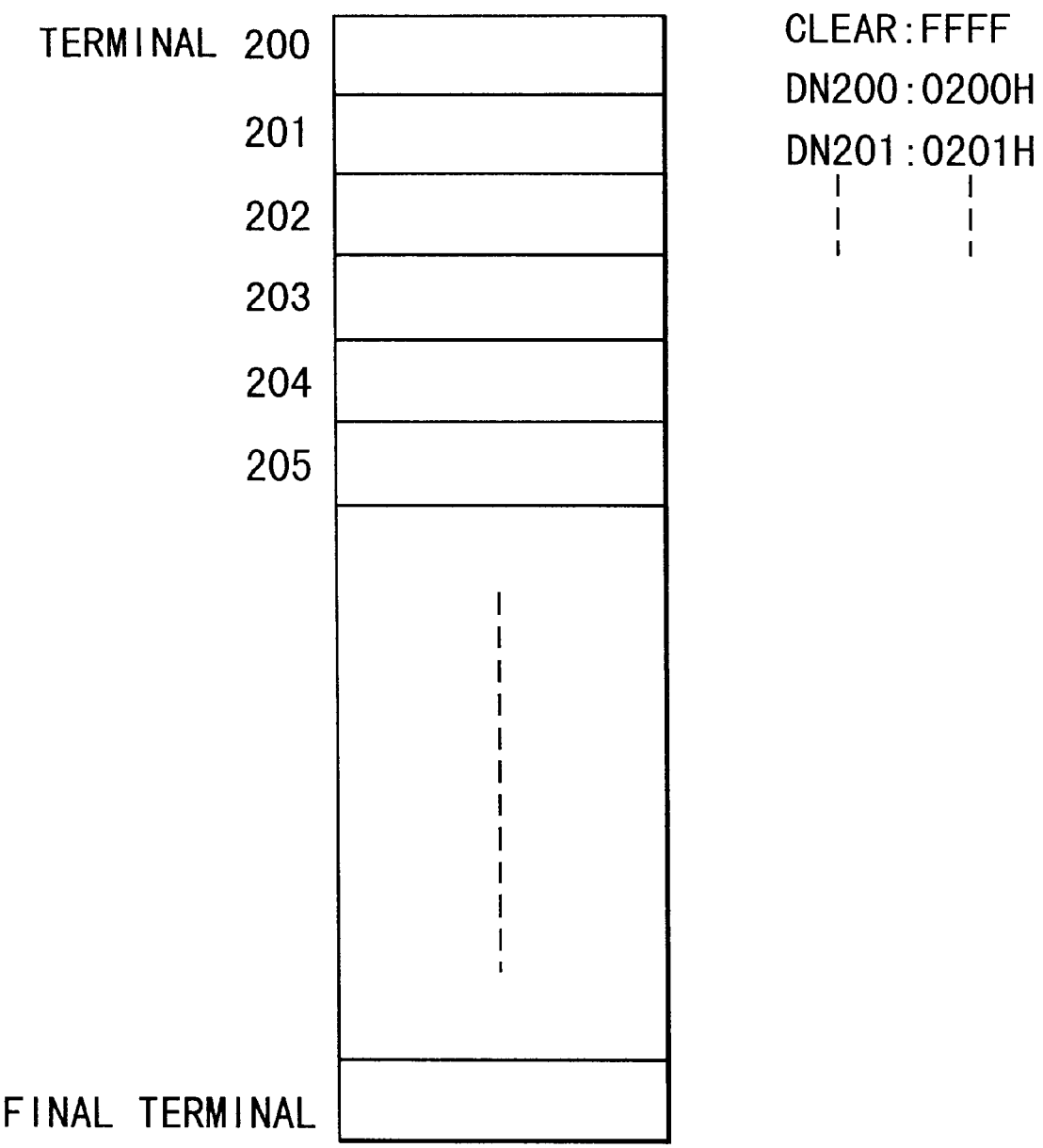
FIG. 101 is a view showing an example of the connection DN area map in a RAM.

FIG. 100 is a flow chart showing the procedure and contents of the above-described DN number display control. When the user depresses a DN key to be checked, the main unit detects this operation in step S100a. The flow advances to step S100b to send a dialing tone to the DKT where the DN key is depressed and also send a display control signal to blink an LED corresponding to the DN key. In step S100c, a message for promoting dialing is displayed on the LCD of the DKT. In step S100d, the DN number of the depressed DN key is read out from the key arrangement area (RAM) corresponding to the DKT and writes the DN number in the connection DN area corresponding to the DKT. FIG. 101 shows an example of this connection DN area.

If the key depressed on the DKT is a key other than DN keys, the flow advances from step S100a to step S100e. The main unit determines whether the input key is a dial key. If YES in step S100e, it is determined in steps S100f to S100i whether the input number is the DN display special number (#407). When it is confirmed that the input number is the DN display special number, the connection DN area is searched for, and the DN number corresponding to the DN key is displayed on the LCD of the DKT.

In this state, when the user of the DKT performs the on-hook operation, the flow advances from steps S100e and S100k to step S100l. The main unit ends display of the DN number on the LCD of the DKT and restores calendar display. In step S100m, the storage contents in the connection DN area are cleared. In step S100n, the LED of the DKT is turned off.

With this function, it can be easily and reliably confirmed that the DN key has the primary DN, the secondary DN, or the phantom DN. Therefore, the user and the wiring installation operator can easily determine the DN key to be used to set call forward or the like.

3-37 Function Setting for Keys of DKT/EKT

FIG. 102 is a view showing the setting procedure. By dialing the special number "*#*#1*2*3" on the DKT as a fixed terminal, the DKT is set in the function setting mode. When a key operation is performed in the procedure shown in FIG. 102, the function of each key is set. The set functions are stored in the key arrangement area of the RAM. FIG. 103 shows an example of the key arrangement area.

(3-4) Storage/Display Control of Call Reception Information

In the digital key telephone system according to the present invention, when one or a plurality of calls are received by a busy digital key telephone, pieces of call reception information associated with the received calls are stored in the main unit 1. In this state, when a request for knowing the contents of the received calls is sent from the busy digital key telephone or a personal computer connected to the telephone, the pieces of stored call reception information are sent from the main unit 1 to the digital key telephone or the calling line identification information of the request source and displayed.

Figure 40B:
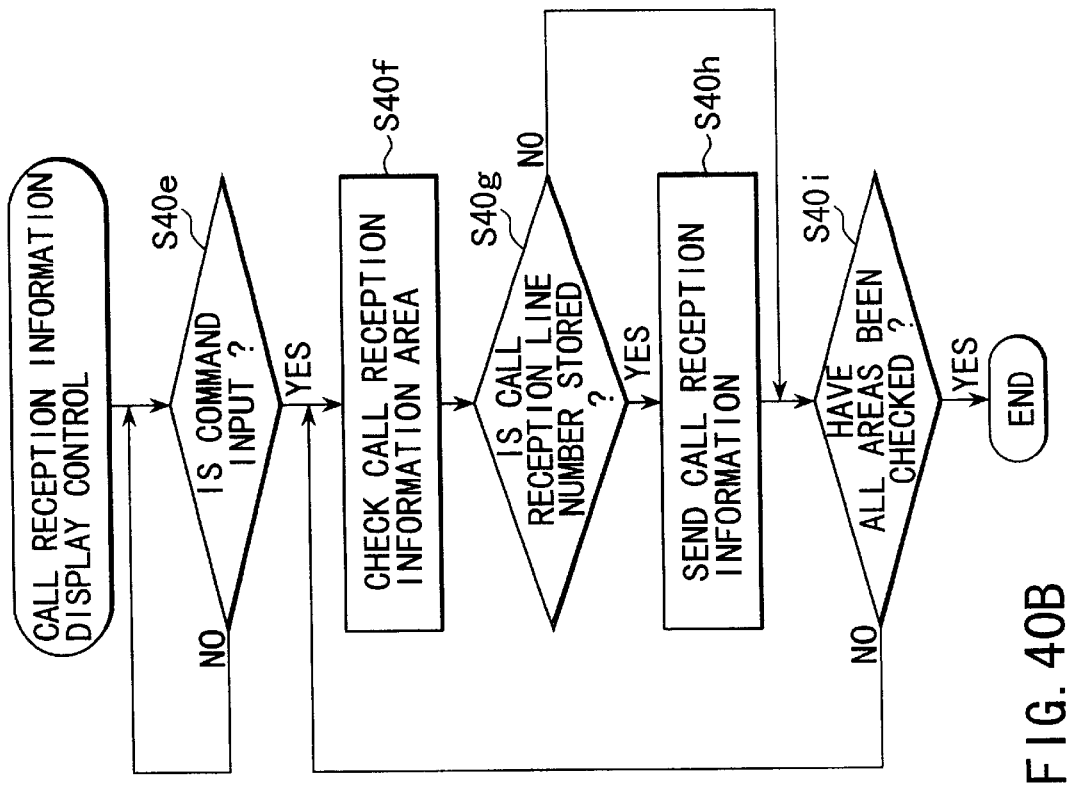
FIG. 40B is a flow chart showing the procedure and contents of call reception information display control.
Figure 40A:
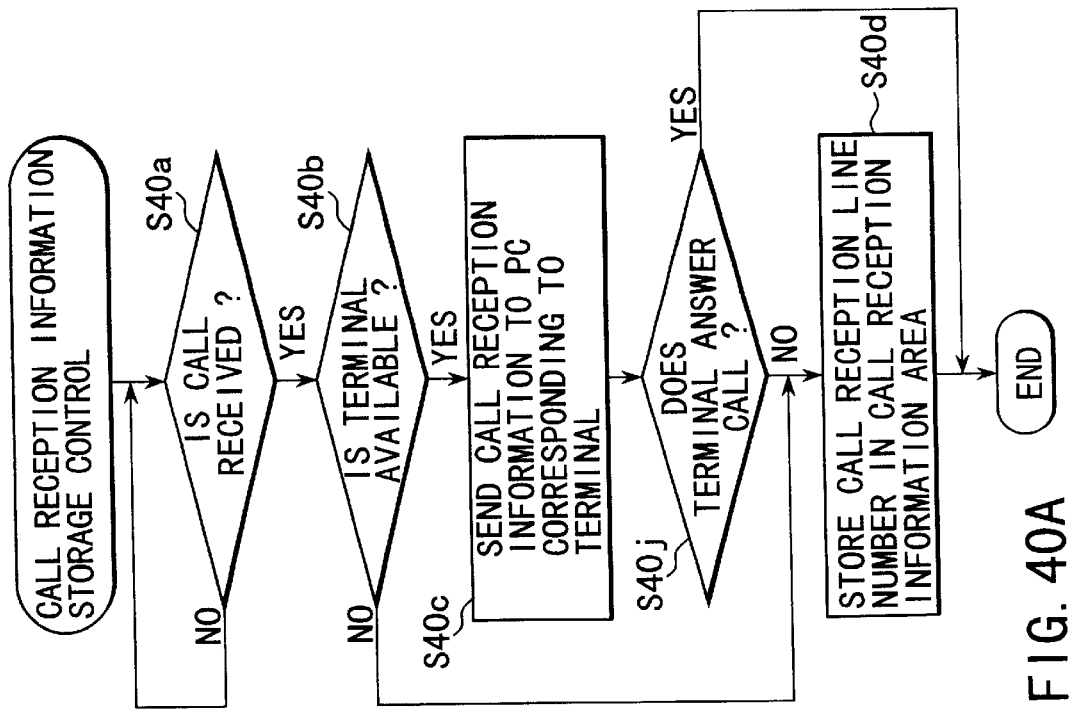
FIG. 40A is a flow chart showing the procedure and contents of call reception information storage control.

FIGS. 40A and 40B are flow charts showing the procedure of call reception information storage and display control. The main unit 1 monitors arrival of a call from the office line in step S40a. In this state, when a call arrives, it is determined in step S40b whether the called digital key telephone 2 is available. If YES in step S40b, the call is received by the digital key telephone 2, and call reception information is transmitted to the personal computer 3 and displayed. In step S40j, it is determined whether the telephone 2 answers the call. If YES in step S40j, control is ended without storing the call reception information. If NO in step S40*j*, the flow advances to step S40*d* to store the call reception in the call reception answering area in correspondence with the called office line number. This call reception information area is provided in units of digital key telephones 2.

If the called digital key telephone 2 is busy, the flow advances from step S40*b* to step S40*d* to store the call reception in the call reception information area in correspondence with the called office line number.

In this state, assume that the user performs a command input operation on the personal computer 3 corresponding to the self digital key telephone 2 to know the contents of calls addressed to the user. The command is sent from the personal computer 3 to the main unit 1. When the command is received, the flow advances from step S40*e* to step S40*f*. The main unit 1 checks the corresponding call reception information area. In step S40*g*, it is determined whether the called office line numbers in waiting for call reception are stored. If YES in step S40*g*, one of the office line numbers is selected in step S40*h* to read out the corresponding call reception information and send it to the personal computer of the request source. The call reception information is displayed on the display of the personal computer 3.

If NO in step S40*g*, the flow advances to step S40*i* to determine whether all areas are checked. If unchecked areas remain, the flow returns to step S40*f* to check the next area, and call reception information sending and display control is repeated.

With this operation, pieces of call reception information addressed to the user are sequentially displayed on the personal computer 3. Therefore, even in the busy state, the user can confirm all pieces of information of calls addressed to the user and waiting for reception on the personal computer 3. An important call can be selected from the calls waiting for reception after the end of speech communication, so the user can answer the call.

In the above description, when a plurality of pieces of call reception information are stored in the call reception information area, the call reception information area is checked by every scroll operation on the personal computer 3. The pieces of call reception information are read out one by one, sent to the personal computer 3 of the request source, and displayed on the display of the personal computer 3. However, the present invention is not limited to this. For example, the plurality of pieces of call reception information may be read out at once in accordance with the request from the personal computer 3, sent to the personal computer 3, and listed on the display of the personal computer 3.

In addition, in the above description, when the user performs a call reception information display request operation on the personal computer 3, the call reception information area is checked to send the call reception information to the personal computer 3 and display it. The display request command may be sent from the personal computer 3 in the busy state once automatically or periodically, and the main unit 1 may check the call reception information area accordingly to send the stored call reception information to the personal computer 3 and display it. Alternatively, even time a new call arrives in the busy state, the main unit 1 may send the call reception information to the personal computer 3 to display it.

(3-5) Control Associated with Call Park

In call park, when an extension terminal answers an incoming call and performs a predetermined operation of requesting call park, the call is held at a virtual holding position called a park zone. In this state, when a special number operation of answering the call is performed by another extension terminal, the extension terminal can reanswer the call.

Assume that an extension terminal a answers a call to be received by an extension terminal g. When the user of the extension terminal a performs a special number operation, the call is parked in the park zone. In this state, the user of the extension terminal a calls the extension terminal g by broadcasting and requests the user of the extension terminal g to answer the parked call. When the user of the extension terminal g performs a predetermined park answering operation in accordance with the request, the extension terminal g and the held call are connected to allow the user of the extension terminal g to answer the call.

The call is parked in the park zone in correspondence with information representing a park address called an orbit number. Conventionally, different orbit numbers are used to park a call for the first time and repark the same call. For this reason, when the called party does not answer the parked call, and the call is reparked, the same call is undesirably parked in correspondence with different orbit numbers.

To prevent this, in the digital key telephone system of the present invention, when a call to be subjected to call park is parked in correspondence with an orbit number, the orbit number is held until the end of the speech communication of the call. When a call park request for the call is generated again during speech communication of the call, the call is parked in correspondence with the held orbit number.

FIG. 41 shows an example of a park reservation table used for call park, which is arranged in the memory in the RCTU 16. This park reservation table has n park areas with orbit numbers #1 to #n. The numbers of office line trunks which have received calls to be parked and the number of terminals which have sent call park requests are stored in these park areas.

FIG. 42 is a flow chart showing the procedure of call park control by the RCTU 16. In step S42*a*, the RCTU 16 monitors whether the park key of the called extension terminal is depressed during office line call reception. In this state, when the park key of the extension terminal is depressed, the RCTU 16 determines in step S42*b* whether the park reservation table has an available park area, i.e., an available orbit. If YES in step S42*b*, the flow advances to step S42*c* to perform the park operation.

In step S42*d*, the number of the trunk which has received the call and the number of the extension terminal which has sent the park request are stored in one of available orbits. Assume that extension terminal "005" has sent a park request for a call received by office line trunk "001", and orbit #1 is available. In this case, as shown in FIG. 41, the trunk number "001" and the extension terminal number "005" are stored in orbit #1. The RCTU 16 stores orbit number #1 as a reservation orbit corresponding to the call until the speech communication of the call is ended.

If NO in step S42*b*, park is disabled in step S42*e*.

Figure 43:
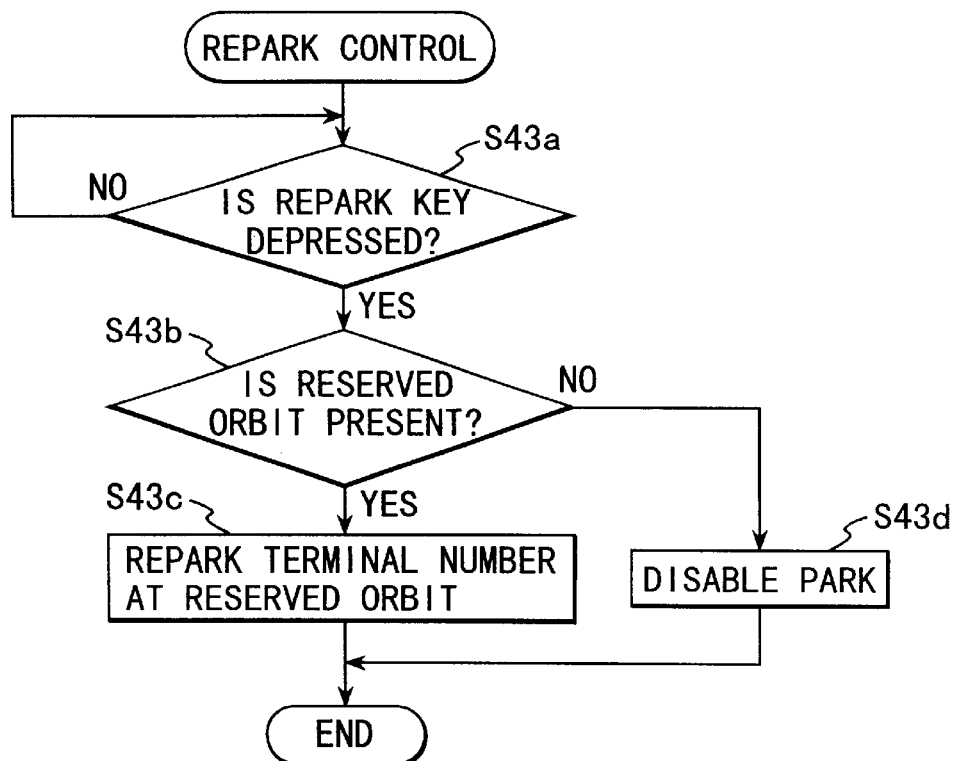
FIG. 43 is a flow chart showing a repark control procedure by the RCTU.

Assume that the called party does not answer the parked call, and the user of the extension terminal depressed the call park key again to call another extension terminal. The RCTU 16 executes park control again. FIG. 43 is a flow chart showing the control procedure. When the call park operation is detected, the flow advances from step S43*a* to step S43*b*, and the RCTU 16 determines whether the reservation orbit is present. If YES in step S43*b*, the flow advances to step S43*c* to store the number of the trunk which has received the parked call and the number of the extension terminal which has sent the call park request again in correspondence with the reservation orbit.

If the call park request is sent, and no reservation orbit is stored, the flow advances to step S43*d* to disable park.

Figure 44:
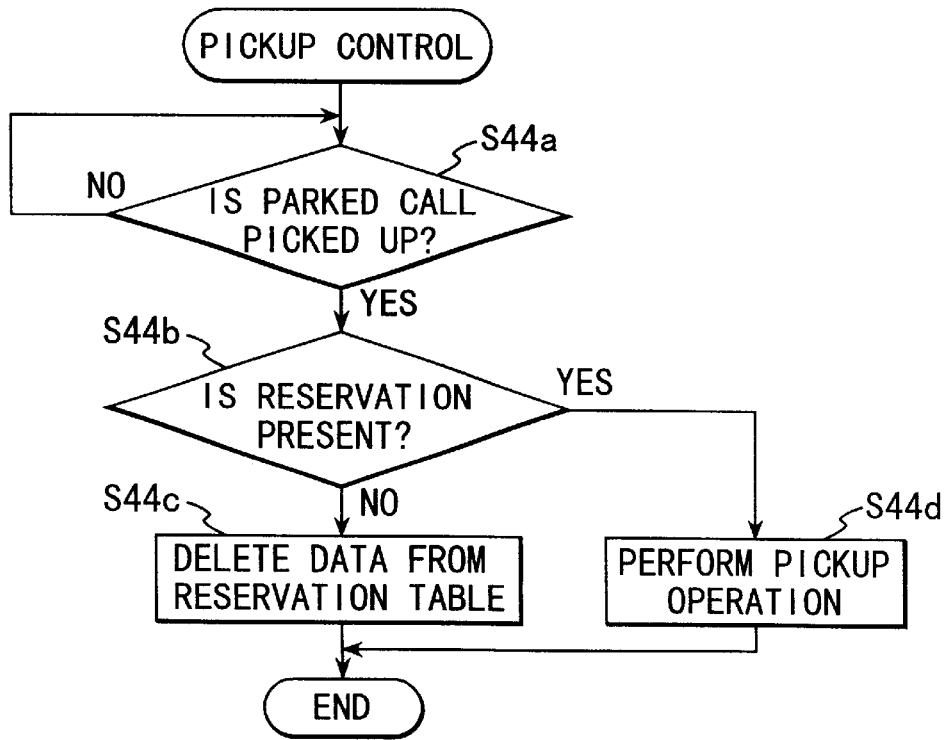
FIG. 44 is a flow chart showing a pickup control procedure by the RCTU.

Assume that the called party answers the call in park or repark. In this case, the RCTU 16 executes pickup control in the following manner. FIG. 44 is a flow chart showing the control procedure. When a pickup operation for the parked call is detected, the flow advances from step S44a to step S44b. The RCTU 16 accesses the reservation orbit of the park reservation table to determine whether the call is parked. If YES in step S44b, the flow advances to step S44d to perform pickup control. More specifically, the extension terminal which has answered is connected to the trunk which has received the parked call to allow speech communication. If NO in step S44b, information stored in the corresponding orbit of the park reservation table is deleted.

In the system with the above arrangement, when the repark operation is performed, the call to be subjected to call park is parked in correspondence with the same orbit number as that in the preceding call park. For this reason, the call is prevented from being parked in correspondence with different orbit numbers.

(3-6) Control for Mode Change Request from Personal Computer

In the system according to the present invention, an operation mode change request sent from the personal computer 3 is transferred to the main unit 1 through the personal computer interface unit (PCI-DI) 2b of the DKT/EKT 2. When the mode change request is transferred, the main unit 1 determines whether the mode change request is appropriate and notifies the PCI-DI 2b of the mode change request transfer source of the determination result. The PCI-DI 2b performs mode change processing according to the mode change request of the personal computer on the basis of the notified determination result.

Figure 45:
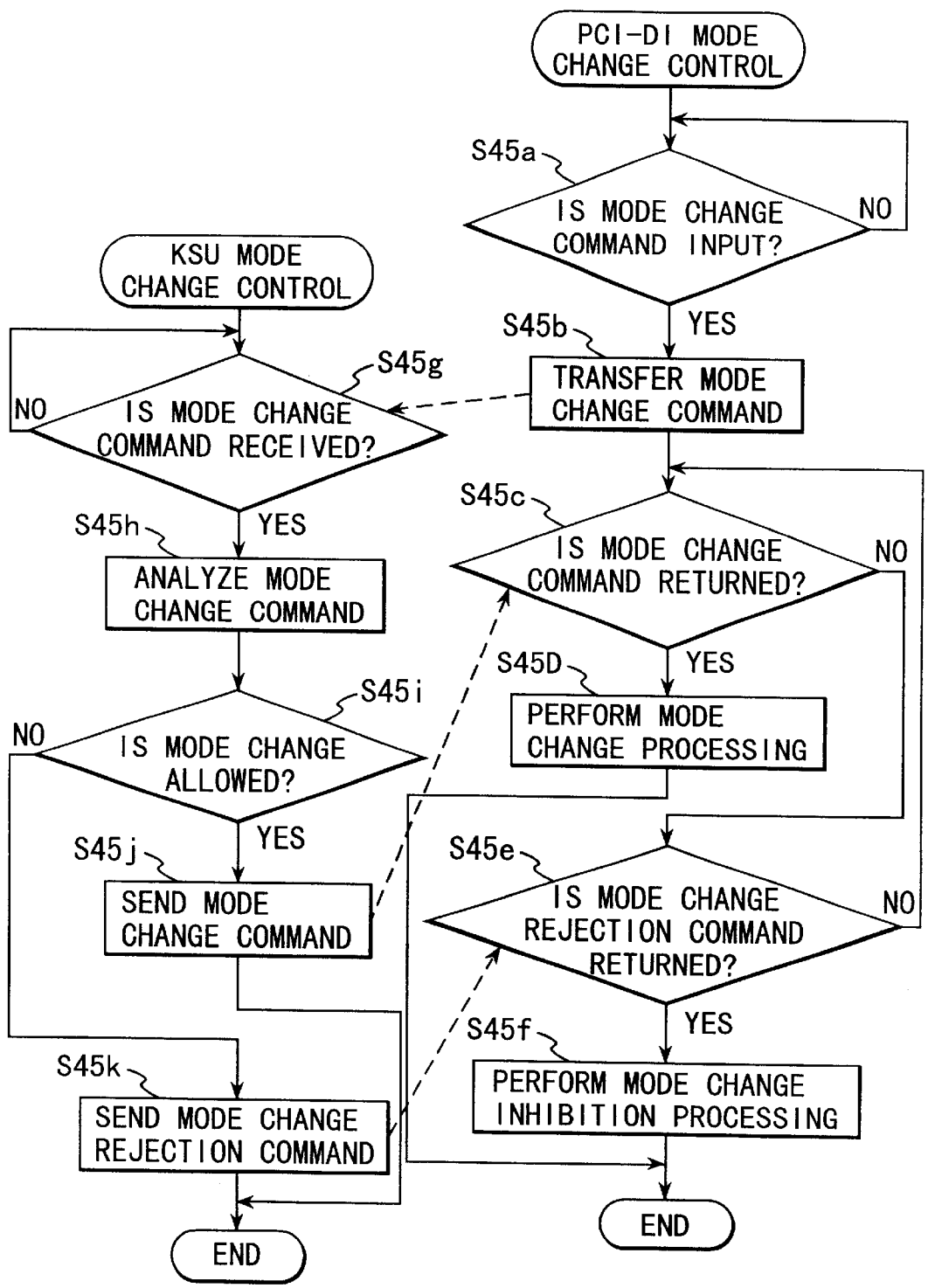
FIG. 45 is a flow chart showing a mode change control procedure in the PCI-DI and the RCTU of the main unit.

FIG. 45 is a flow chart showing the procedure and contents of mode change control in the PCI-DI 2b and the RCTU 16 of the main unit 1.

When a mode change command is input from the personal computer 3, the flow advances from step S45a to step S45b. The PCI-DI 2b transfers the mode change command to the main unit 1. The RCTU 16 of the main unit 1 monitors arrival of the mode change command from the PCI-DI 2b in step S45g. When the mode change command arrives, the flow advances to step S45h to analyze the contents of the mode change command. In step S45i, it is determined whether the mode change requested by the mode change command is allowed. If YES in step S45i, the mode change command is returned in step S45j. If NO in step S45i, the flow advances to step S45k to return a mode change rejection command to the PCI-DI 2b.

After sending the mode change command, the PCI-DI 2b monitors return of the mode change command and the mode change rejection command from the main unit 1 in steps S45c and S45e. In this state, when the mode change command is returned from the main unit 1, the flow advances to step S45d to execute mode change processing. This mode change processing is performed by the data communication control microcomputer 245.

The PCI-DI 2b supplies a mode change enable signal to the personal computer 3 and at the same time sets the PCI-DI 2b itself in an operation state corresponding to the changed mode, i.e., a state wherein the extension line is connected to the personal computer. On the other hand, when the mode change rejection command is returned from the main unit 1, the flow advances to step S45f, and the PCI-DI 2b executes mode change inhibition processing. More specifically, the PCI-DI 2b notifies the personal computer 3 of mode change inhibition, and simultaneously, sets the self operation state such that even when an operation corresponding to the changed mode is performed by the personal computer 3, the signal is not transferred to the main unit 1.

As described above, in this system, when the mode change request is issued from the personal computer 3, the RCTU 16 of the main unit 1 always determines whether the request is appropriate. Only when it is determined that the request is appropriate, the PCI-DI 2b is allowed to change the mode. Therefore, a mode which is not prepared for the main unit 1 can be prevented from being set in the PCI-DI 2b.

For example, assume that the user sends a request for changing the mode to a computer telephoni mode for calling using the personal computer 3. However, when the main unit 1 does not have the computer telephoni mode, the main unit 1 does not return mode change enable notification. For this reason, the computer telephoni mode is not set in the PCI-DI 2b.

(3-7) Display Control for Held Line

When a certain digital key telephone 2 holds an office line or an extension line, the number of the held office line or extension line is displayed on the LCD 28 of the digital key telephone 2. However, if a plurality of office lines or extension lines are held, the user cannot determine the correspondence between the office lines or extension lines which are displayed in holding and the flexible buttons.

In the digital key telephone system according to the present invention, when a plurality of office lines or extension lines are held, and a holding information display operation is performed on the digital key telephone, the numbers of the plurality of held office lines or extension lines are selectively displayed on the LCD of the digital key telephone in accordance with the display operation. In addition, the LEDs of the flexible buttons corresponding to the held office lines or extension lines are, e.g., blinked synchronized with the LCD display operation.

Figure 46:
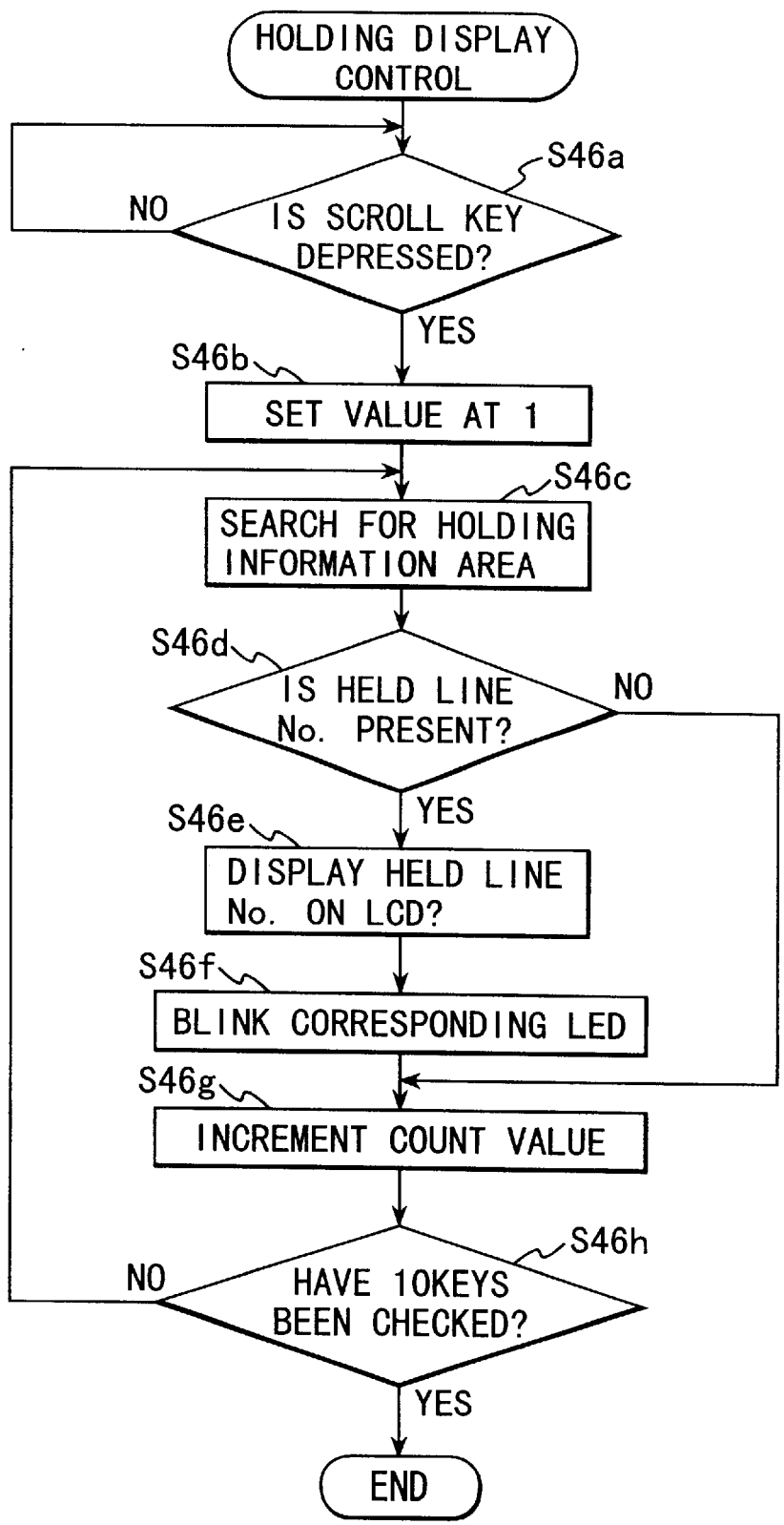
FIG. 46 is a flow chart showing a holding display control procedure.

FIG. 46 is a flow chart showing the holding display control procedure. In the following description, assume that office lines correspond to 10 flexible buttons 24, and these flexible buttons are used as line selection keys.

Figures 47, 48:
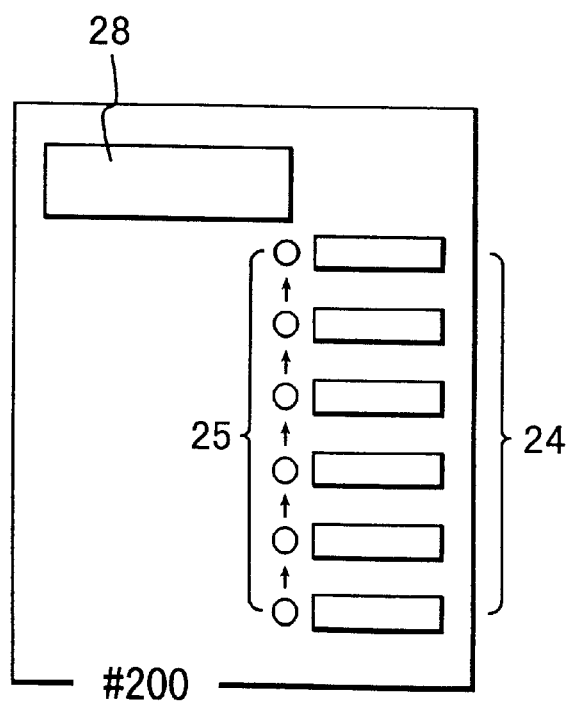
FIG. 47 is a view showing an example of a holding information area.
FIG. 48 is a view showing an order of blinking LEDs corresponding to line selection keys.

In step S46a, the RCTU 16 of the main unit 1 monitors whether a scroll key 29 of each digital key telephone 2 in the standby state is depressed. When the scroll key 29 of an arbitrary digital key telephone 2 is depressed, the count value is set at 1 in step S46b. The flow advances to step S46c to search the holding information area for an area corresponding to the count value=1. The holding information area is arranged in the memory of the RCTU 16 in correspondence with each digital key telephone. As shown in FIG. 47, the holding information area stores the held office line numbers in correspondence with the line selection keys.

In step S46d, the RCTU 16 determines on the basis of the search result obtained in step S46c whether the held line number is stored in correspondence with the first line selection key number. If the held line number is not stored as in FIG. 47, the flow advances to step S46g without performing held line number display control. The count value is incremented by one. In step S46h, it is determined whether holding display control is performed for all of the 10 line selection keys. In this case, since line selection keys which have not undergone display control remain, the flow returns to step S46c to search for holding information area corresponding to the second line selection key number. It is determined in step S46d whether the held line number is stored in correspondence with the second line selection key number. If the held line number is stored as shown in FIG. 47, the held line number is read out, transferred to the digital key telephone 2, and displayed on the LCD 28 in step S46e. Simultaneously, an LED control signal is sent to the digital key telephone 2 to blink the LED 25 corresponding to the first line selection key where the held line number is stored. The blinking frequency is set at, e.g., 10 Hz as a natural frequency to allow discrimination from another blinking display.

When the held line number is displayed on the LCD 28, and the LED 25 is turned on, the flow advances to step S46g. The RCTU 16 increments the count value by one. In step S46h, it is determined whether display and ON-control are performed for all of the 10 line selection keys. If NO in step S46h, the flow returns to step S46c to repeat the above control.

As described above, in this system, when the held line number display operation is performed, the held line number is displayed on the LCD 28, and the LED 25 of the line selection key corresponding to the held line blinks. Therefore, even when a plurality of lines are held, the user can clearly know the correlation between the held line numbers which are being displayed on the LCD 28 and the line selection keys.

FIG. 48 shows an order of blinking the LEDs 25 corresponding to line selection keys 24.

In the above description, the RCTU 16 of the main unit 1 performs holding display control. However, the microcomputer of each digital key telephone 2 may perform the control. In the above description, the LEDs 25 corresponding to the line selection keys are blinked. However, line selection key numbers may be displayed on the LCD 28 together with the corresponding held line numbers. In addition, holding information to be displayed on the LCD 28 is not limited to the held line number. A caller ID, a directory number, or a user name may be displayed. Furthermore, holding display control for each line selection key may be performed by sequentially selecting a line selection key every time the scroll key 29 is depressed.

(4) Multi DN Function

In the multi DN function, as described above, a plurality of directory numbers are set in correspondence with different flexible buttons in each digital key telephone (DKT), and various control operations such as call sending/reception from/to the office line or extension line, various transfer operations such as call forward, conference speech communication, message waiting, or call park are performed using the buttons as DN keys.

(4-1) Arrangement of DN Keys

Figure 49:
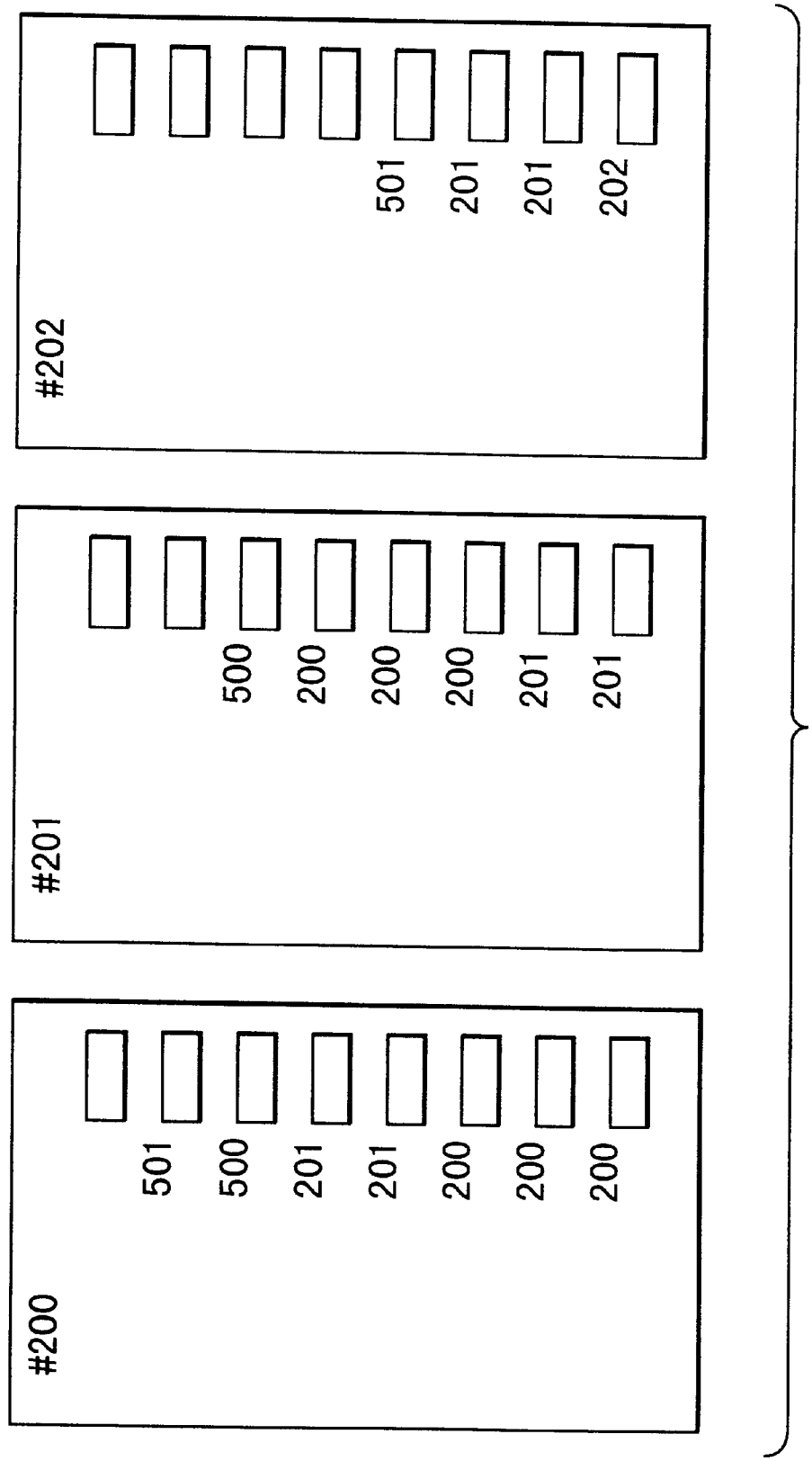
FIG. 49 is a view showing an example of the arrangement of DN keys.

As a DN key arrangement, a single DN key is set for a plurality of DKTs, or a plurality of identical DN keys are set on one DKT. Alternatively, a phantom DN key is set in addition to the primary DN key and secondary DN key. FIG. 49 shows an example of the DN key arrangement, in which "501", "500", "200", "201", and "202" are arbitrarily set for DKT #200, DKT #201, and DKT #202.

(4-2) General Description of Various Operations Using DNs

Operations using the DN keys will be briefly described below. FIGS. 50 to 56 are views for explaining the operations. Symbols in FIGS. 50 to 56 represent LED display patterns corresponding to the DN keys and have meanings defined in FIG. 94.

Figure 51:
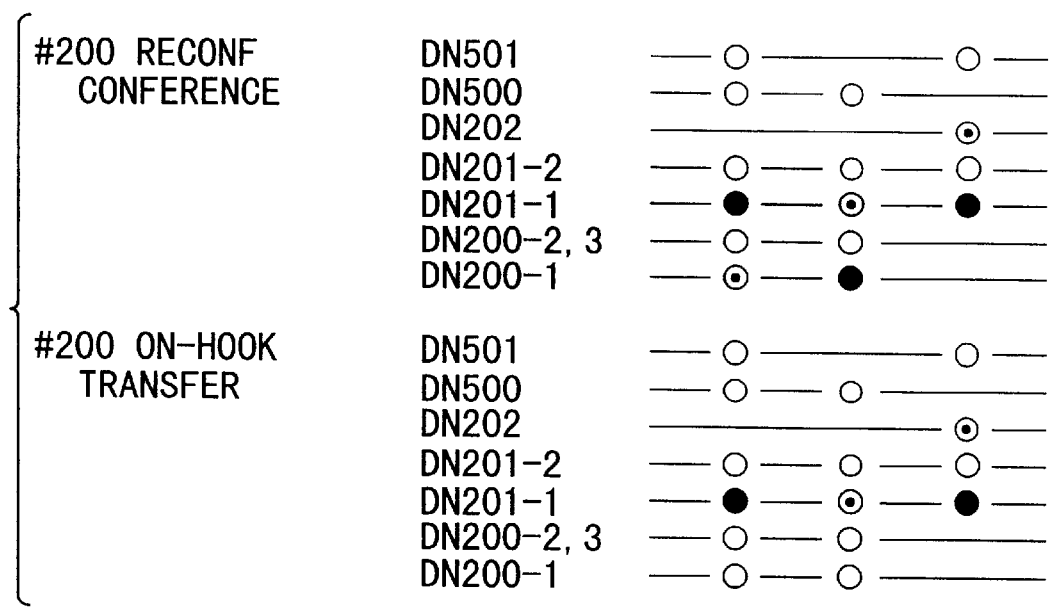
FIG. 51 is a view schematically showing the second half of the extension operation using the DNs.

FIGS. 50 and 51 show an operation in which voice-calling (HFU) or tone calling is performed, and the called side answers the call, an operation in which calling by CONF is performed, and the called side answers the call, an operation of performing conference by reCONF, and an extension transfer operation.

Figure 52:
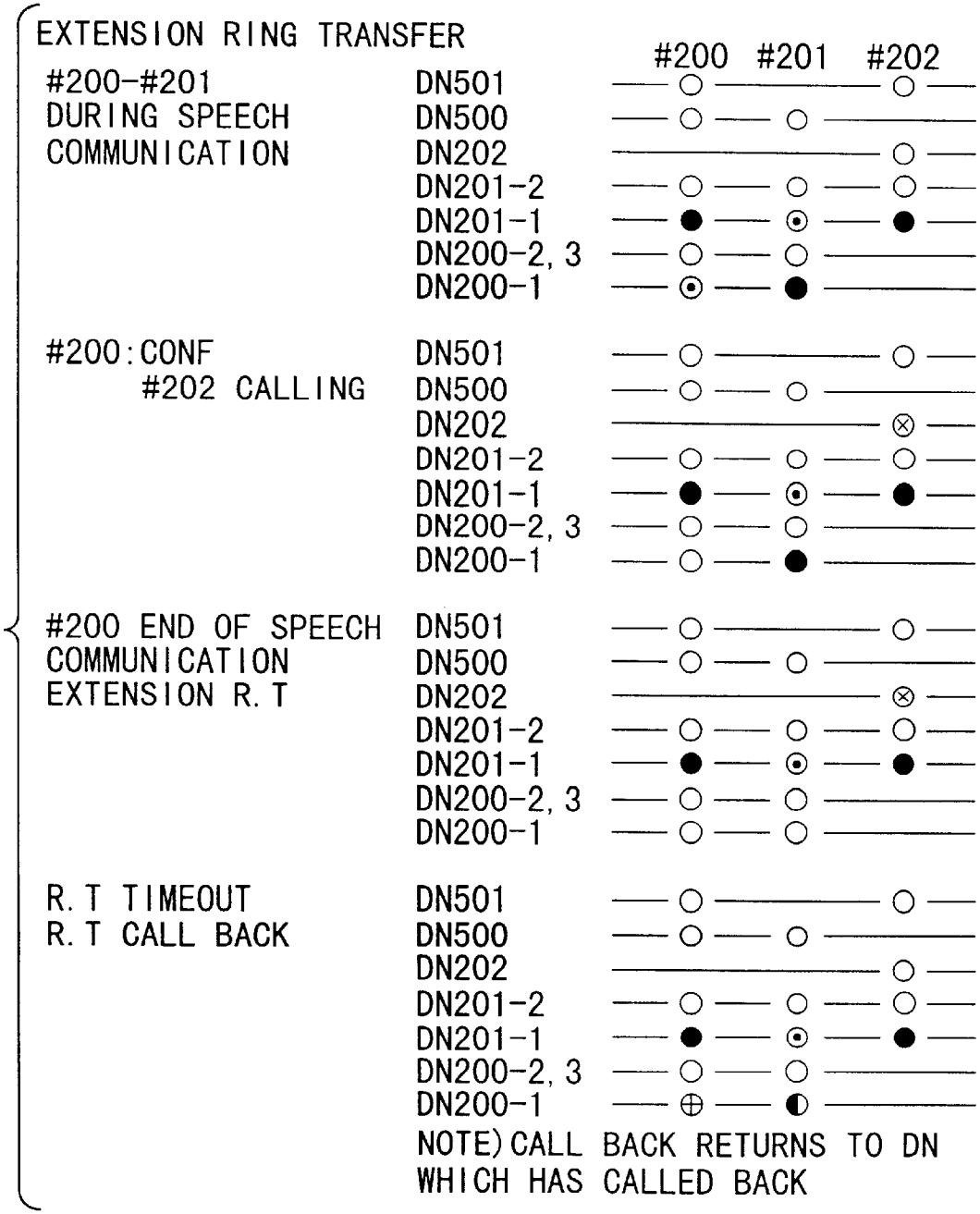
FIG. 52 is a view schematically showing an extension ring transfer operation using the DNs.

FIG. 52 shows an extension ring transfer (extension line R.T) operation, including an operation of R.T call back to the transfer side at the R.T timeout.

Figure 53:
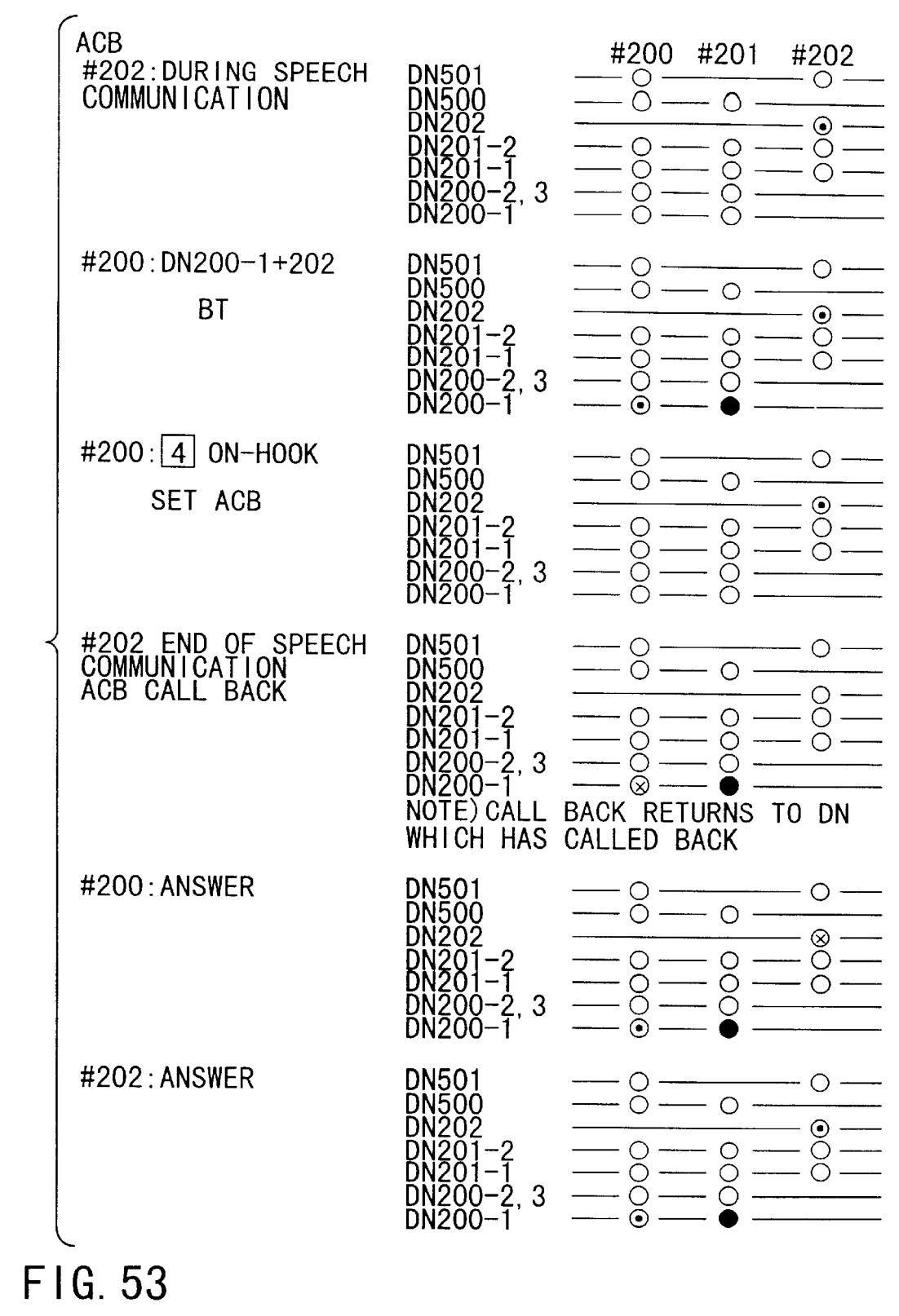

FIG. 53 shows an ACB (Automatic Call Back) operation. In this operation, DKT #200 sets ACB during speech communication of DKT #202, ACB is performed after speech communication of DKT #202, and DKTs #200 and #202 answer the call to allow speech communication between the DKTs.

Figure 56:
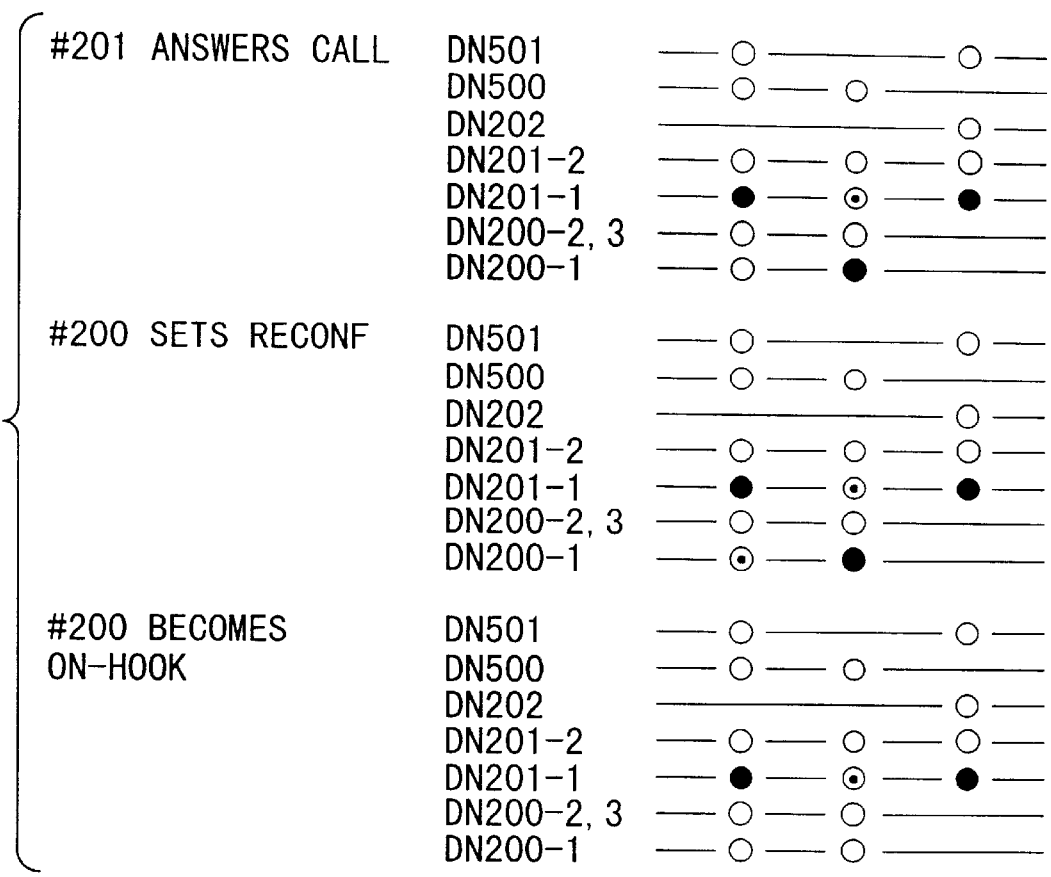
FIG. 56 is a view schematically showing the second half of the office line calling operation and the conference operation using the DNs.

FIG. 54 shows office line calling and ring transfer operation using a DN. FIGS. 55 and 56 show an office line calling and conference operation using a DN.

(4-3) Extension Calling Using DN Keys

Like the conventional use of INT keys, extension calling can be performed by an available DN key operation. This also applies to use of the primary DN, the secondary DN, or the phantom DN.

In on-hook calling or SPKR (Speaker Key) calling in the available state, when the automatic calling selection function is set to allow extension calling, and there is a DN key which can send a call, DN calling can be performed by selecting the primary DNs in ascending order of numbers. If all DNs are not available, calling cannot be performed. For an SLT (Single Line Telephone), when the secondary DN is set for the DKT, the SLT cannot perform calling, though the DN of the SLT can be set for other extension lines.

To send a call by depressing another DN key during speech communication, the speech communication is ended, and an available DN key is depressed to allow extension calling. Even when a DN key which is being used for speech communication is depressed during the speech communication, the speech communication is ended independently of whether it is office line or extension speech communication, and new extension speech communication is performed.

(4-4) Extension Operation 4-4-1. In independent extension calling, HFU (Hands Free Unit) calling is used to call only one called DKT of the primary DNs. When a phantom DN is called by HFU calling, the owner terminal is called. In tone calling, only the primary DN or also the secondary DN are called depending on setting. Delay call reception is also enabled by setting. HFU calling or OCA calling to the phantom DN cannot be performed. Other operations are the same as those for the secondary DN.

4-4-2. Independent calling in one voice direction is processed as in HFU calling.

4-4-3. In tone calling, even when calling is set, and if calling cannot be performed because of the busy state of the terminal, BOV (Busy Override) is displayed on the LED of the DN upon call reception, as needed.

4-4-4. LED Display of Extension Call Reception

In LED display of extension call reception, when a plurality of calls are received by longitudinal multiple DNs, "I-Called" is displayed at the key of primary call reception to specify the DN which outputs the ringing tone. FIG. 57 shows an example of LED display of DN keys.

4-4-5. Even when all DKTs from which the ringing tone is to be generated are not available, and no ringing tone can be generated, a ring-back tone (RBT) is returned to the calling terminal as far as a DN is available. However, when all terminals from which the ringing tone is to be generated are in the DND (DoN't Disturb) state, the RBT is returned to the calling terminal.

4-4-6. No Available DN or No DN Key

When all primary DN keys set on a certain terminal are not available, all of the DNs are not available. For example, when three primary DN keys are set on a certain terminal, and all of the three primary DN keys are not available, no DN is available. When the DN number called is not available, and extension calling is generated, this call temporarily becomes busy. A camp-on tone is sent by the operation of the calling line to want for an available DN key. Even when the primary DKT is available, the busy state is set. Even when the DKT called by HFU calling has no primary DN keys, the busy state is set. This is a problem to determine how to perform LED display upon answering or how to allow a third party to answer when the call is answered and held.

FIG. 58 is a table showing an operation when no DN is available or no DN key is available. The camp-on tone when no DN is available is sent to a terminal which is using the called DN and has tone calling call reception setting independently of whether calling is performed as voice calling or tone calling.

4-4-7. Processing of Extension Call Reception During Extension Call Reception

A call arriving during extension call reception is received only when a DN is available. The first call reception has a priority, and the second call reception is subjected only to LED display, and no ringing tone is output. HFU calling during extension calling is temporarily set in the busy state and then processed as tone calling by the subsequent operation. When the second call is a call by HFU calling, and the first call reception is stopped, the call is restored as tone calling. This is because the calling line is prevented from being confused when the RBT abruptly changes to voice calling. FIG. 59 is a table showing the above processing of extension call reception during extension call reception.

4-4-8. Group calling and broadcasting are performed by function setting corresponding to ports. At this time, LED display of the DN key is not performed on the called side.

4-4-9. Switching from tone calling to voice calling is neglected when the DKT having the primary DN is busy or absent. When voice calling is switched to tone calling, a delay ring operation is performed.

4-4-10. Busy Override and OCA (Off-hook Call Announce)

When the called terminal is performing handset speech communication, and HFU calling is generated, a BT (Busy Tone) state is set independently of the presence/absence of an available DN. However, if OCA has been set, the terminal is set in the OCA state by the operation of the calling line. In the system of the present invention, the OCA call reception is not displayed on the LED of the DN key. OCA continues even when the connected line is released (held or disconnected).

The OCA state can be directly set without intervening the BT state by wiring installation of automatic OCA.

Assume that a DN is available. In this state, when tone calling is generated, and a connected line is present, the terminal is automatically set in the BOV state. When the connected line is released (held or disconnected), the BOV stops, and tone calling is restored. In HFU calling, even when the called terminal is busy, the BOV state is set as far as the called terminal has wiring installation of HFU calling automatic BOV. When the called terminal is in the DND state, and HFU calling is busy, processing according to the DND override wiring installation of the calling line is performed.

4-4-11. When a call reception calling set DKT returns from the nonavailable state to the available state, OCA calling is continued although BOV is switched to tone calling. That is, the call is restored.

4-4-12. ACB

ACB can be performed by an operation when no DN is available or after a busy terminal returns a busy tone. ACB occurs when both the DN called by ACB and the called DN are available, and both the calling and called terminals are available.

4-4-13. DND

The relationship between extension call reception by voice or tone calling and DND is changed by the multi DN function. Tone calling or office line call reception is not performed in the DND state. Voice calling to a terminal in the DND state is temporarily set in the SBT (Special Busy Tone) state and then in the BOV calling or OCA state by the operation of the calling line. FIG. 60 shows an example of DND processing during call reception.

When a DN key as a secondary key does not answer a call of tone calling, i.e., lateral single appearance occurs, and the called terminal is in the DND state, the SBT is output. When a DN as a secondary DN answers the call, i.e., lateral multi appearance occurs, the SBT is returned to the calling line even when all terminals are set in the DND state. Once tone calling is performed, the calling line is not set in the BT state even when all called terminals are in the DND state. DND override by the user operation after the calling line listens to the SBT is performed according to the wiring installation of the calling line. At this time, BOV call reception is performed by all the DND terminals. A terminal which has canceled DND is called by tone calling. DID (Direct-Inward Dialing) or leased line call reception is also set in the DND busy state, like tone calling. However, not the SBT but the BT is output, and the call is blocked.

4-4-14. Call Forward (CF)

Figures 61, 62:
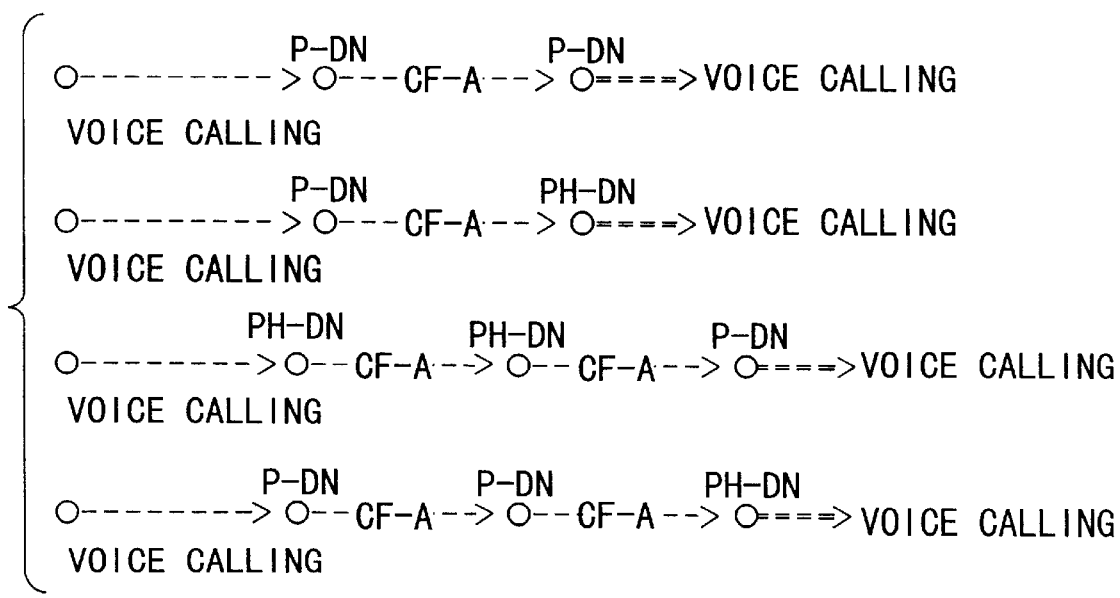
FIG. 61 is a table showing a call forward operation using the DNs.
FIG. 62 is a view showing an operation performed when the CF destination is a phantom DN.

Call forward is performed in accordance with CF setting at the primary DN. CF-BUSY is determined when no terminal or DN is available for HFU calling and all DNs are not available for tone calling. When no answer is obtained as a result, call forward is performed. CF can also be set for the phantom DN. In this case, a call addressed to the phantom DN is subjected to call forward. FIG. 61 shows the call forward operation.

Even when the phantom DN is set as the CF destination, voice calling can be performed, like the primary DN. FIG. 62 is a view showing the operation.

CF Setting

CF setting for the primary DN and CF setting for the phantom DN are performed in the following manner.

"[P DN]+#601, 2, 3, 4,+CF destination [+NA timer]#"

"[PH DN]+#601, 2, 3, 4,+CF destination [+NA timer]#"

CF setting for the phantom DN can be performed only from the owner of the phantom DN.

The CF destination for the primary DN can also be set for the phantom DN. Setting from the phantom DN to the primary DN or another phantom DN can also be performed.

Confirmation of CF Setting by LCD

Figures 63, 64:
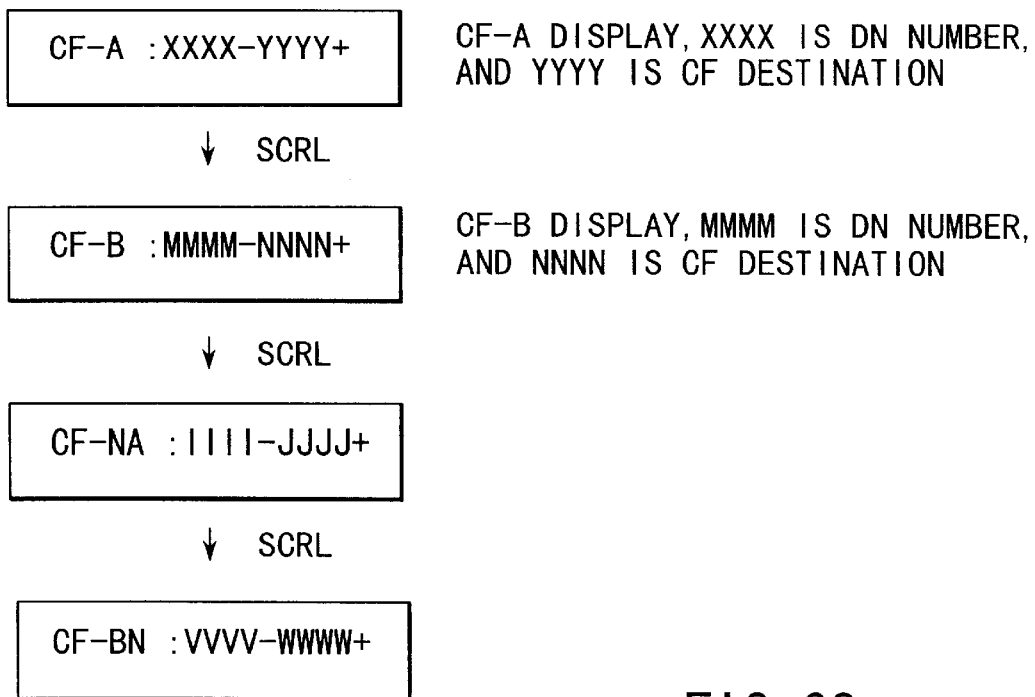
FIG. 63 is a view showing an LCD display example of the CF when a plurality of CF destinations can be set from one terminal.
FIG. 64 is a view showing the correlation between phantom DNs and MW keys.

A terminal as the owner of the phantom DN can set a plurality of CF destinations. In this case, to confirm CF setting, the LCD display of CF destinations is scrolled using the scroll key. FIG. 63 shows a display example.

FCF (Fixed CF)

In FCF, a call addressed to the primary DN is subjected to CF.

CF Key (LED)

The LED of the CF key indicates the CF state of the primary DN and does not display setting for the phantom DN.

4-4-15. Station Hunting (SH)

The SH busy is determined when no terminal or DN is available for HFU calling and all DNs are not available for tone calling. Not only SH from the primary DN to the phantom DN but also SH from the primary DN to the phantom DN and vice versa, or from the phantom DN to another phantom DN can also be performed.

4-4-16. Message Waiting (MW)

MW is received by a called primary terminal. MW to a phantom DN is received by the owner of the phantom DN. At this time, the MW is displayed on the phantom MW key. If there is no MW key, the MW cannot be received.

FIG. 64 shows the correlation between phantom DNs and MW keys. As shown in FIG. 64, the correlation between each phantom DN and a phantom message waiting key (ph-MW key) is determined in advance. Four MWs can be set for each phantom DN. Only the owner terminal can have the ph-MW keys. The ph-MW key is used for display of MW reception and call back. To set MW, the MW key is used.

LCD Display of MW

Figure 65:
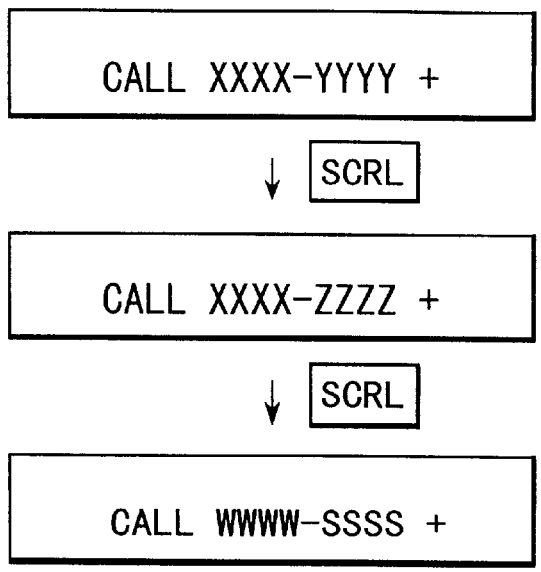
FIG. 65 is a view showing an LCD display example upon receiving message waiting.

In MW reception, the DN number and terminal number which have received the MW are simultaneously displayed on the LCD 28 by operating the scroll key 29. FIG. 65 shows a display example. In FIG. 65, "XXXX" represents a DN number which has received the MW, and "YYYY" represents the telephone number of a terminal for which MW is set.

Figure 66:
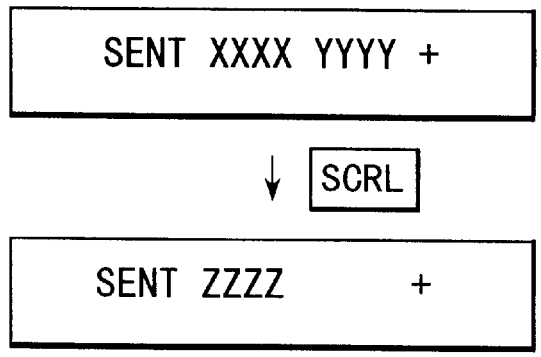
FIG. 66 is a view showing an LCD display example upon transmitting message waiting.

In ME transmission, the DN number for which MW is set is sequentially displayed by operating the scroll key 29, as shown in FIG. 66. In FIG. 66, "XXXX", "YYYY", and "ZZZZ" represent DN numbers for which MW is set.

NW Call Back Operation by MW Key

By depressing a blinking MW key, the primary DN can be captured, and the terminal for which MW is set can be called back. The ph-MW key is used to capture the phantom DN to send a call. The MW can also be set using the secondary DN. In this case as well, the primary DN of the terminal for which MW is set is called back. In MW reception by the phantom DN as well, the primary DN of the terminal for which MW is set is called by depressing the ph-MW key.

MW Reception Operation

Figure 68:
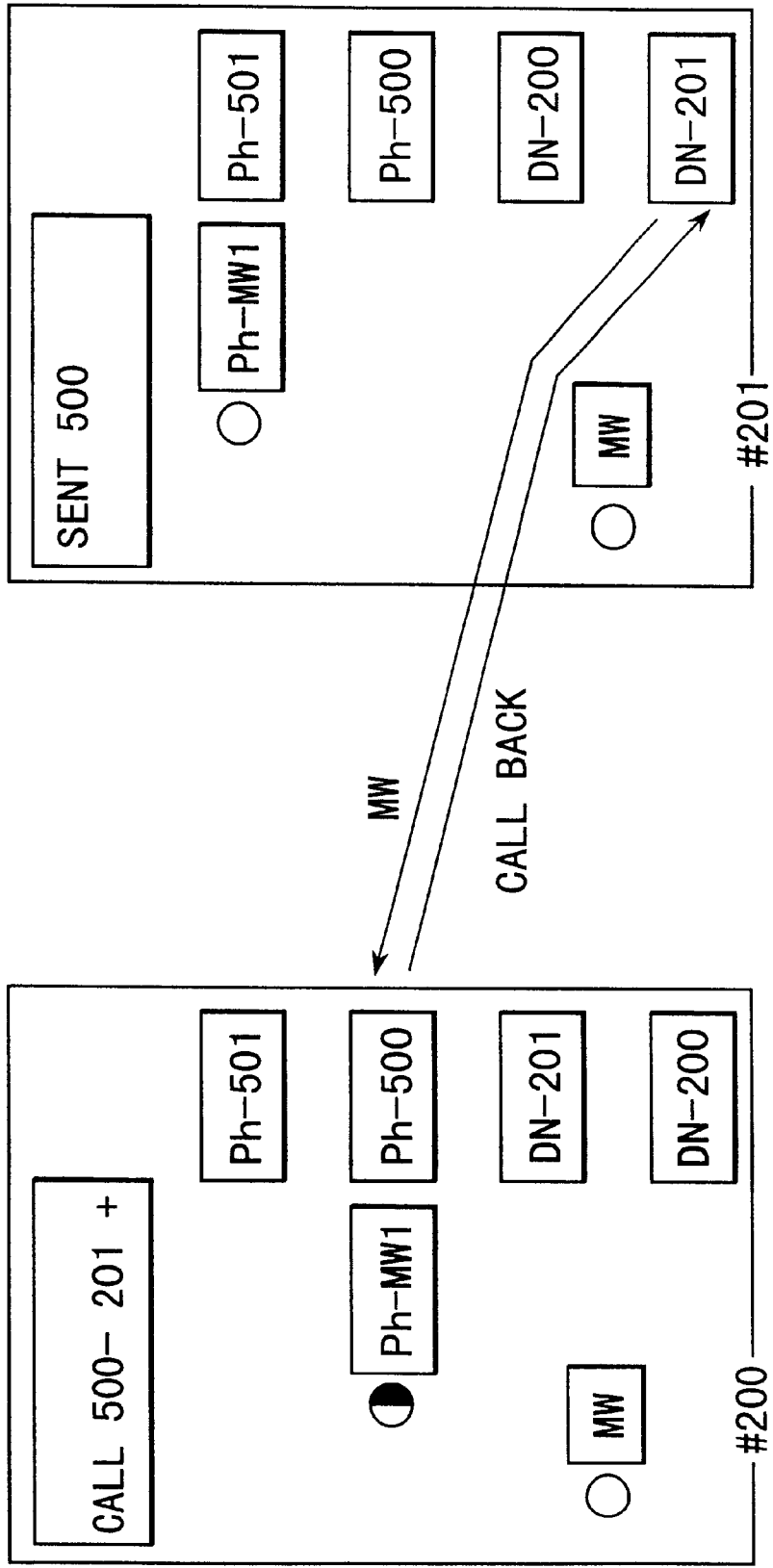
FIG. 68 is a view showing an operation of receiving message waiting to a phantom DN.
Figure 69:
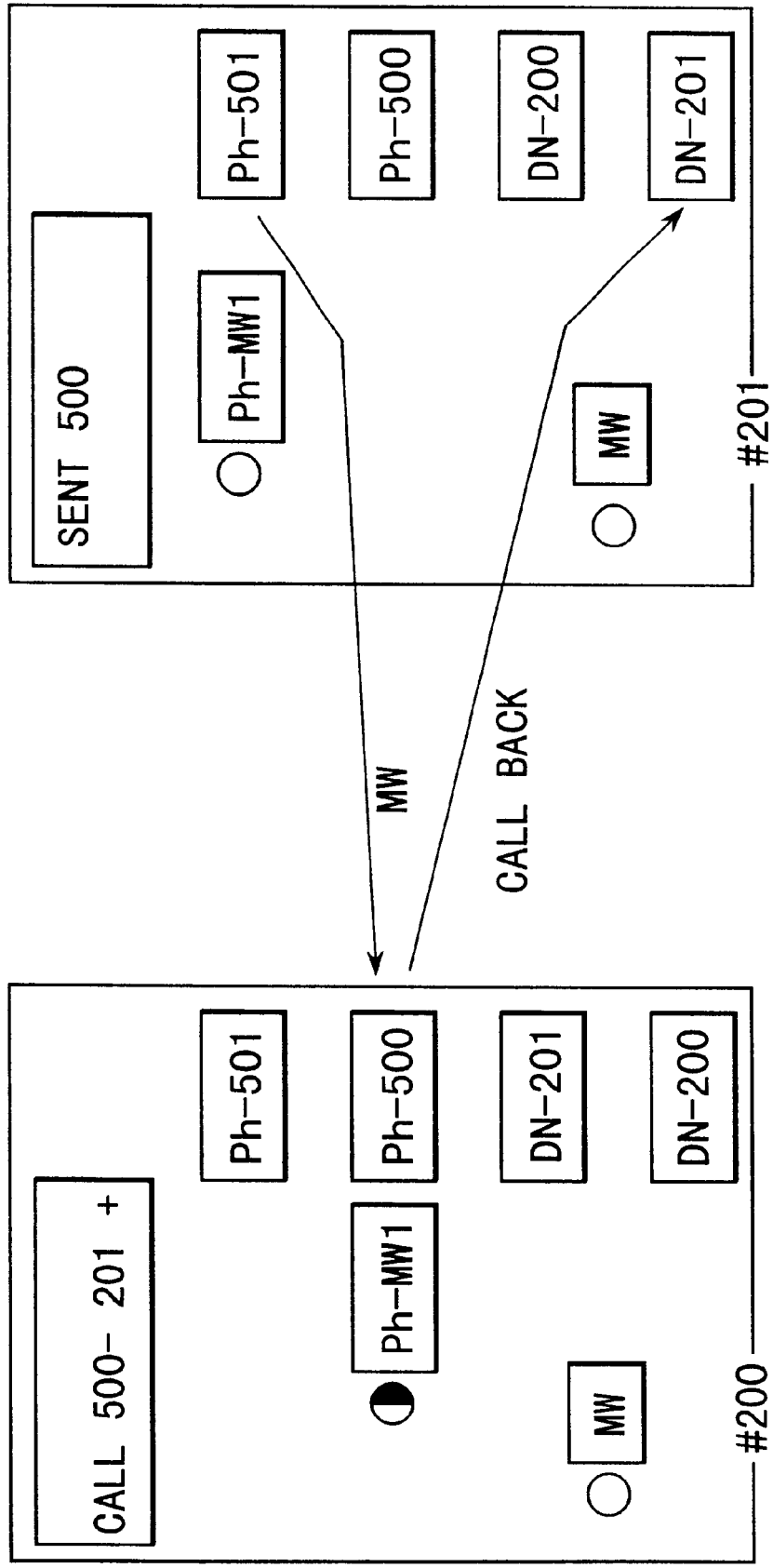
FIG. 69 is a view showing another operation of receiving message waiting to a phantom DN.

MW reception by the primary DN is performed as shown in FIG. 67. MW reception by the phantom DN is performed as shown in FIG. 68 or 69.

MW Transmission Operation

Figure 71:
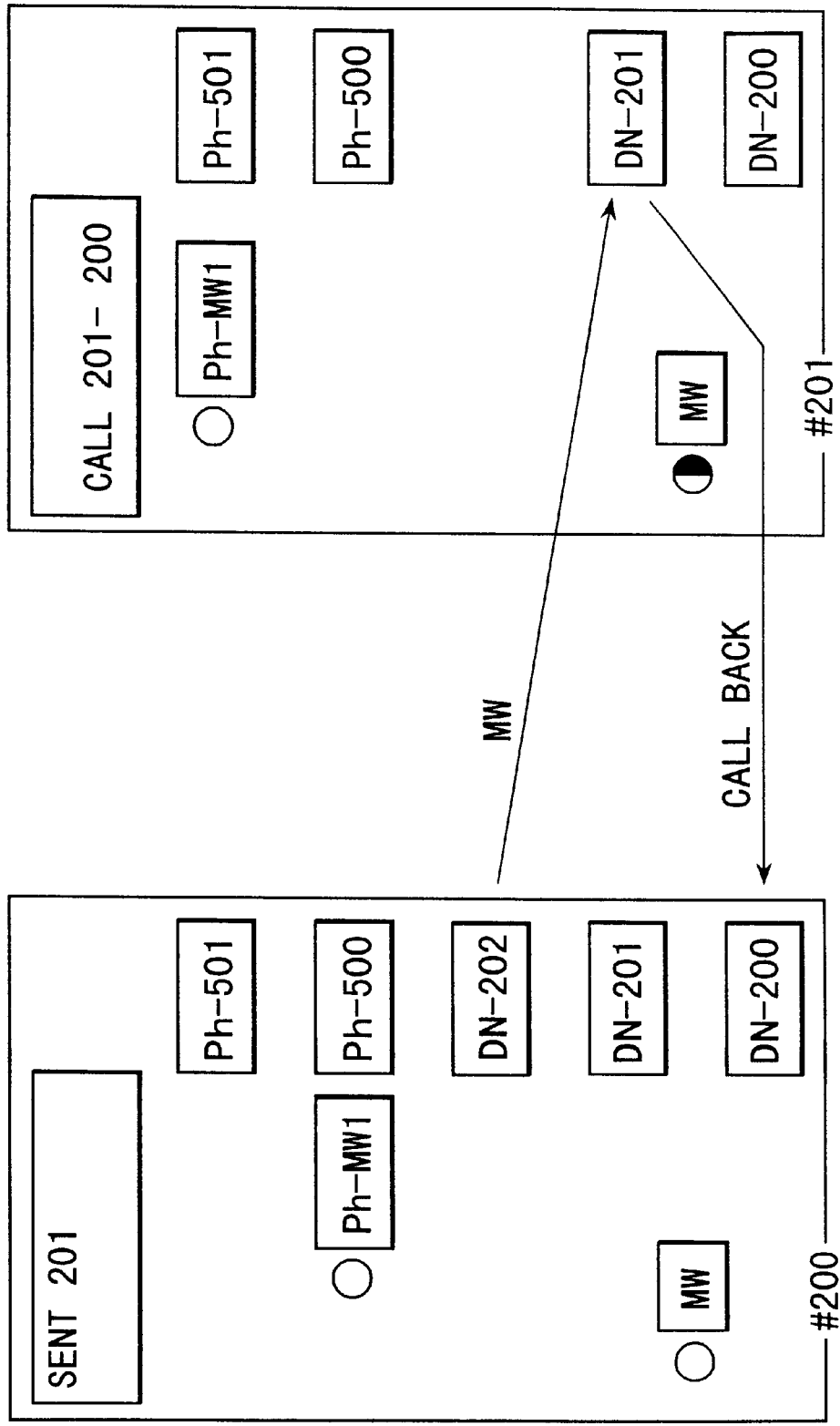
FIG. 71 is a view showing an operation of transmitting message waiting from a secondary DN.
Figure 72:
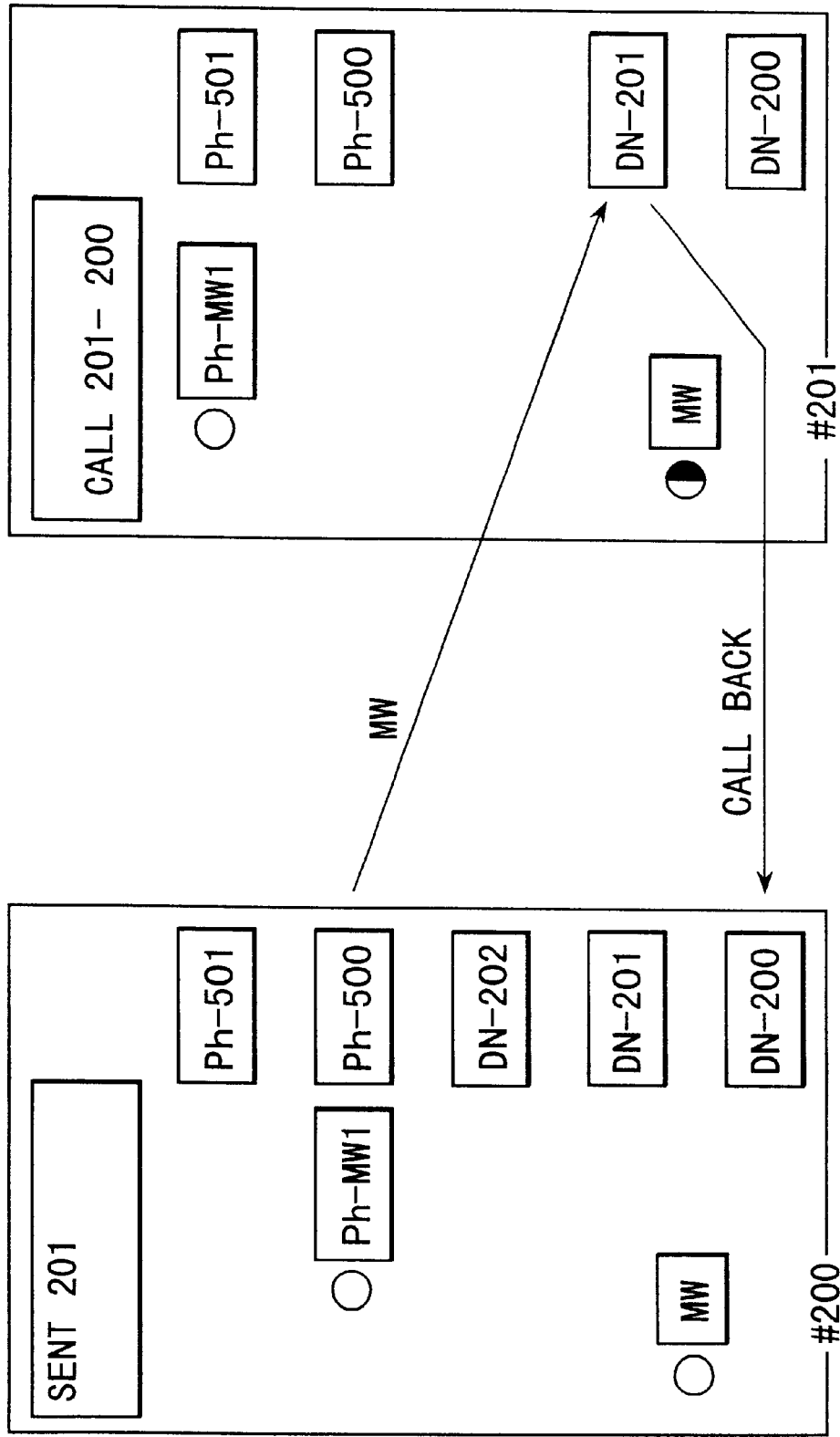
FIG. 72 is a view showing an operation of transmitting message waiting from a phantom DN.

MW transmission from the primary DN is performed as shown in FIG. 70. MW transmission from the secondary DN is performed as shown in FIG. 71. MW transmission from the phantom DN is performed as shown in FIG. 72.

4-4-17. DSS (Direct Station Selection) and BLF (Busy Lamp Field)

A DSS call is used to call not a terminal but a DN. When the DSS key of an idling terminal is depressed, the primary DN is captured to call the DN of the other party. BLF display of ATT, DSS, ADM, and LCD indicates not the DN state but the terminal state. Therefore, in the BLF, a DSS call may be set in the BT state when no DN is available but the terminal is available.

4-4-18. Answer to Extension Call Reception

An extension call reception displayed on the DN key can be answered by depressing the DN key. Even when another DN key of the same DN number is depressed, the call cannot be answered. In off-hook or SPKR operation in the automatic call reception selection mode as well, the call is answered by the DN with call reception display.

4-4-19. Pickup Answering

Pickup answering can be performed by depressing a DN key with call reception display. LED display at this time is similar to that of the pickup special number. Pickup using the pickup special number can also be performed by waiting for a dialing tone from another DN key. To designate a called extension number, not the DN but the called terminal is designated.

4-4-20. Privacy During Extension Speech Communication

Only one terminal is connected to a DN of one type (e.g., DN200-1). Privacy cancel or privacy override by the DN is not permitted.

4-4-21. ID Sending to Voice Mail

Figure 74:
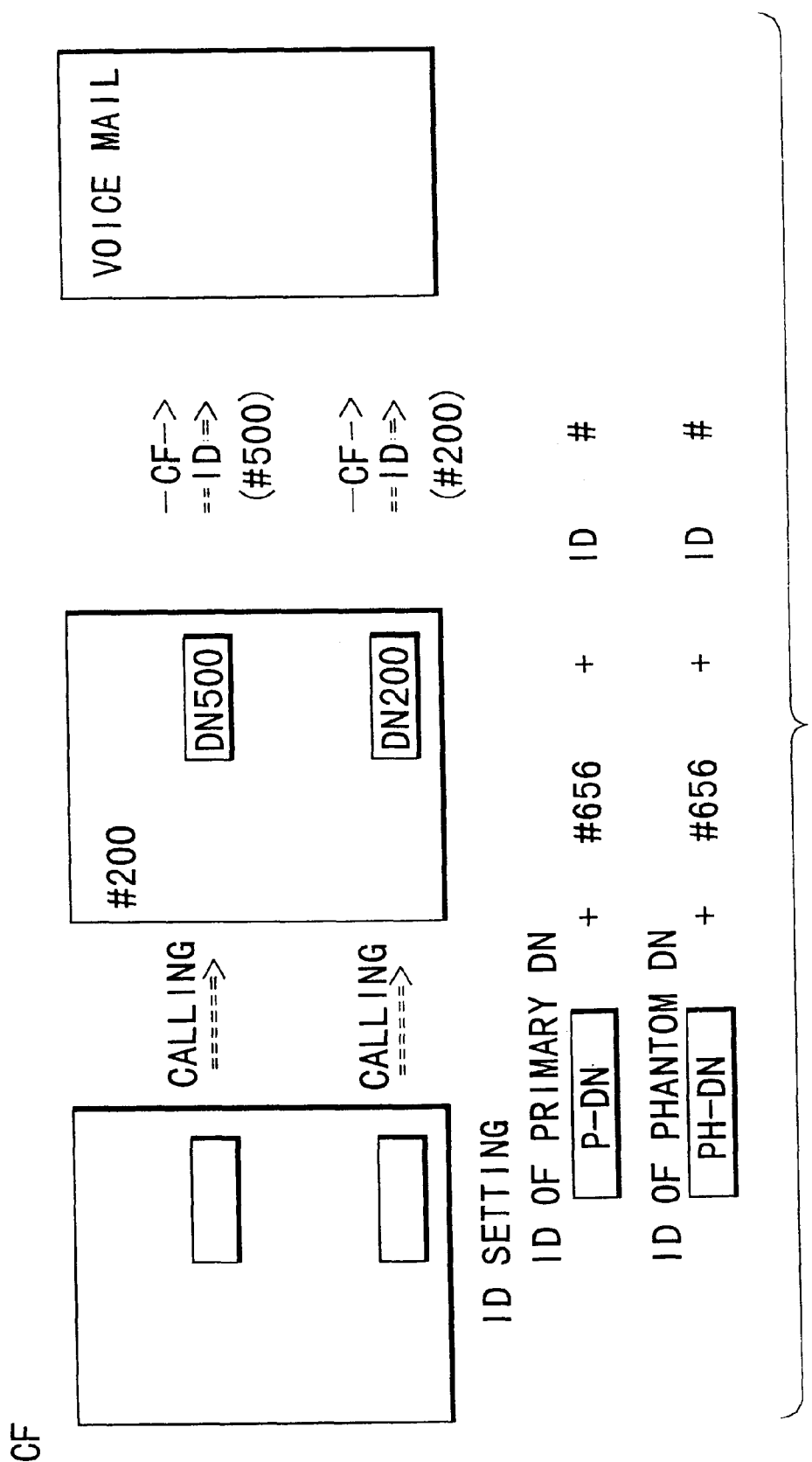
FIG. 74 is a view showing the ID sending operation of a voice mail in call forward.

When the CF destination is a voice mail or MW from a voice mail is called back, and ID sending has been set, an ID is sent. Not only the ID of the primary DN but also that of the phantom DN is sent. At this time, the IDs of the primary DN and the phantom DN are discriminated. ID setting for the phantom DN is performed by the owner DKT of the DN. FIGS. 73 and 74 are views showing operations of sending the ID to a voice mail for MW and CF, respectively.

4-4-22. LCD Messaging

In tone calling, extension call reception display is performed on (one or a plurality of) terminals capable of receiving a call. When the calling line is calling from a phantom DN, the terminal number is displayed as the calling line number. This also applies to a secondary DN. When a person other than the called party answers voice or tone calling, display similar to that in pickup is performed.

To start character communication, the busy called party depressed "MODE key+2" when the calling line sends an extension call. In the multi DN, character communication is performed when no DNs are available, the other party is busy or receiving a call in HFU calling, and the call by HFU calling is rejected due to DND.

The LCD can display character communication by the phantom DN, a silent message, or a message for absence answering. For a phantom DN, no unique message is used, and the message of the owner terminal is shared.

4-4-23. Buzz (Buzz Tone) Key

When a Buzz key on a terminal is depressed, a terminal as a destination of the contents of the abbreviated dial corresponding to the Buzz key is called by the Buzz tone and LED. Up to four Buzz keys can be set for one terminal. For example, the Buzz key is used by, e.g., a pair of a boss and a secretary.

Figure 75:
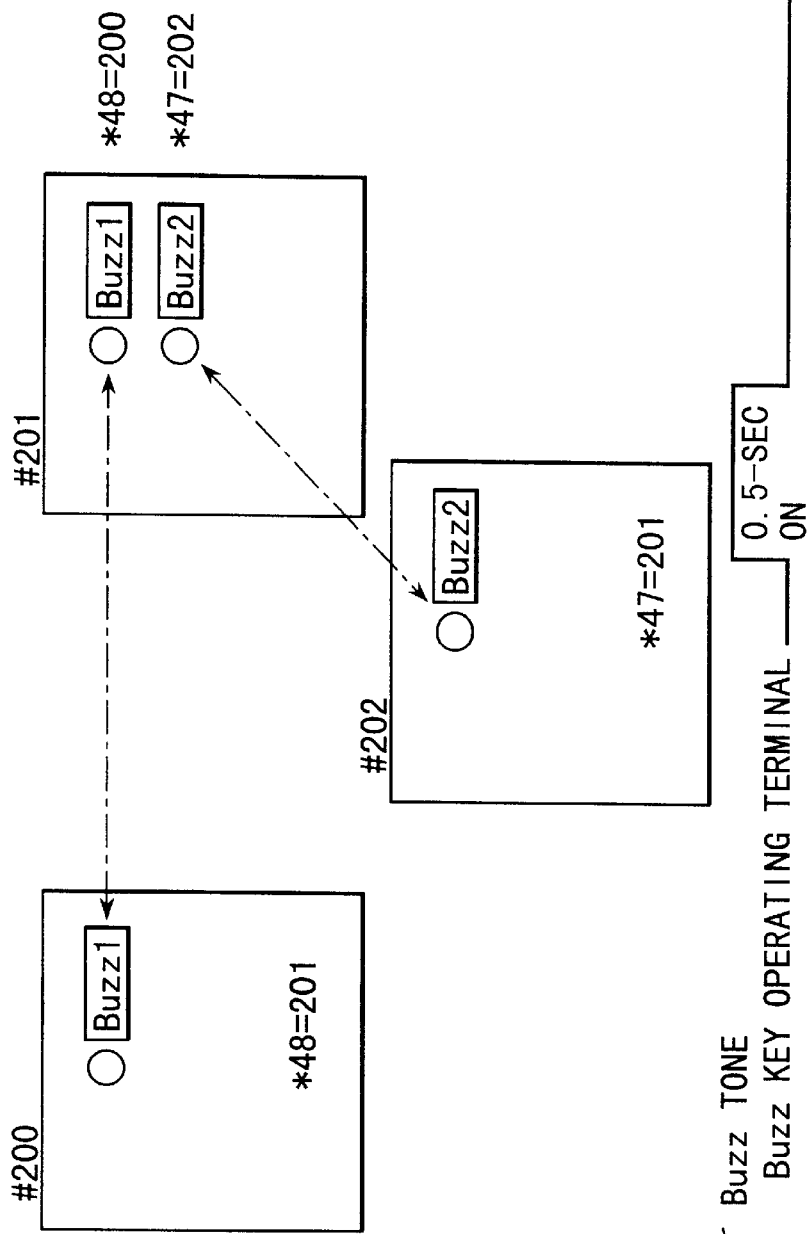
FIG. 75 is a view showing a Buzz key operation.
Figure 76:
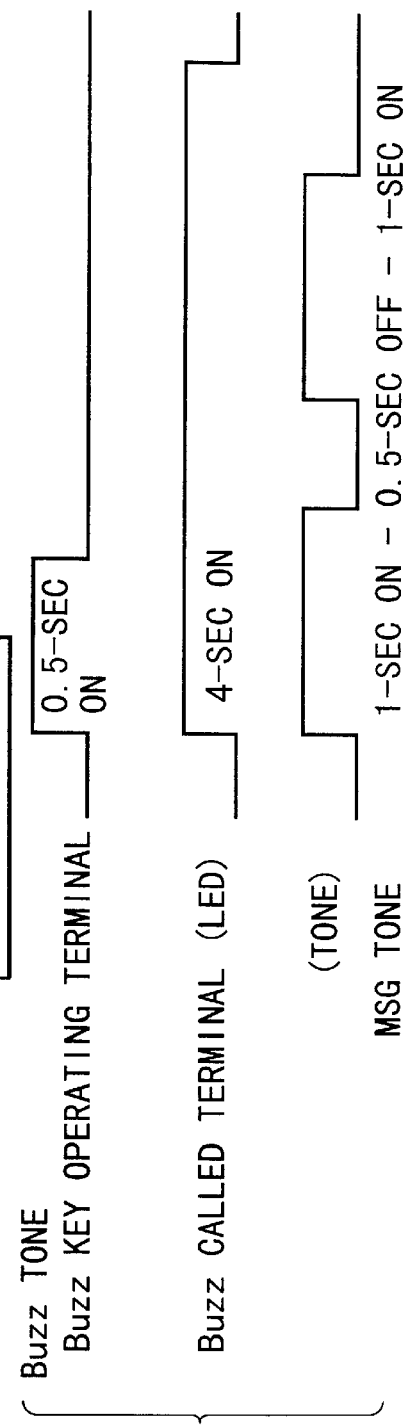
FIG. 76 is a view showing the LED ON timing of a Buzz key operation terminal, the LED ON timing of a Buzz called terminal, and an MSG tone generation pattern.

By blinking the LED for 0.5 sec, the reception of the operation is notified to the Buzz key operator. On the called terminal, a Buzz tone is generated, and the LED is turned on for 4 sec to notify the reception. When a plurality of Buzz keys are set on one terminal, the Buzz key operator cannot be determined from the tone. However, the called party checks the LED to identify the Buzz key operator. FIG. 75 shows the operation. FIG. 76 shows the ON timing of the LED of the Buzz key operation terminal, the ON timing of the LED of the Buzz called terminal, and the MSG tone generation pattern.

When the Buzz called terminal is available, the MSG tone is generated in a pattern of 1-sec ON, 0.5-sec OFF, and 1-sec ON. When the called terminal is not available, a beep tone (10 Hz) is generated in a pattern of 1-sec ON, 0.5-sec OFF, and 1-sec ON. The Buzz tone overrides DND and is not influenced even when no DN is available.

4-4-24. Camp-on Tone Sending to Single Line Telephone

When a call arrives at a busy SLT, the call is subjected to camp-on. In the SLT, the camp-on tone is sent as 2 Beep (not a Beep tone in fact) from the handset. Therefore, the speech communication instantaneously stops during the camp-on tone sending period, though it is a minimum time and does not influence on the speech communication. The camp-on tone can be changed between extension call reception and office line call reception. For example, as an extension call reception camp-on tone (including leased line ring transfer and extension ring transfer), a message recording box tone (1,209 Hz) intermittently output in a repeated pattern of 1-sec ON, 3-sec OFF, and 1-sec ON is used. As an office line call reception camp-on tone (including DID and office line ring transfer), a message BOX tone (1,209 Hz) modulated at 10 Hz intermittently output in a repeated pattern of 1-sec ON, 3-sec OFf, and 1-sec ON is used.

(4-5) Extension Transfer 4-5-1. Extension Ring Transfer

This system allows extension ring transfer. However, when the terminal which has performed ring transfer (RT) ends speech communication after "CONF (Conference)+ dial", the calling DN becomes available. Call back to RT is addressed to the DN which has performed RT. In ring transfer, when the DNs of the other party are not available, camp-on is performed. The camp-on tone is sent to a terminal which is using the called DN and having extension call reception setting. Extension RT call reception to a busy terminal is BOV call reception. LED display of the multi DNs is "I-Called". Ring transfer is also delay-received. Details of the operation are the same as in office line ring transfer.

4-5-2. Privacy cancel or privacy override by the DN key is not performed in extension speech communication/ conference.

4-5-3. In extension calling busy, when dial key 3 is depressed, privacy override is performed. For a DKT having the called primary DN, privacy override is performed for the like used by the terminal.

(4-6) Office Line Calling 4-6-1. An operation of "DN key+dial key 9" allows office line calling. As a result, the office line can be accessed. When the DKT has the office line key, the DN is made available, and display is shifted to the office line key.

4-6-2. Assume that office line calling is to be performed in the automatic calling selection mode. In this case, when the office line key of the called office line is not provided, and an access without intervening the DN key is performed, it is displayed on the primary DN key. If the primary DN is not available, calling is disabled.

4-6-3. Dial Operation on DN Key

Redialing, save dialing, trunk queuing, and ABR can be performed. Calling regulation (dial regulation) and LCR depend on the operated DKT, i.e., independently of the DN. Memory dialing allows to set the primary DN in a memory dial.

4-6-4. Office Line LED Display

No problem is posed for display of only the DN key, the office line key, or the POOL key. When these keys are to be simultaneously displayed, conventionally, the display of the calling operation or the like using the dial key 9 is shifted to the office line side as follows.

"INT LED→CO LED (POOL LED)"

In this system, the display is shifted as follows.

"DN LED→CO LED (POOL LED)"

If the calling DKT has both the CO key and the DN key and sends a call using the dial key 9 by capturing the DN (even when holding transfer to the DKT having another DN key is desired later), the CO is displayed to make the DN available to prevent DN busy. Transfer to the DKT having the DN key can be performed by the transfer sequence of "CONF+DN".

Once "I-Use" is displayed by the DN key, the CO is displayed on the DN key from the end of transfer to the end of speech communication. FIG. 77 shows examples of the above-described office line LED display.

4-6-5. Trunk Queuing

The call back condition changes depending on the presence/absence of the CO key. When the CO key is present, the CO is available, and the DKT which has set trunk queuing is idle, trunk queuing occurs. To the contrary, when the CO key is not present, the CO is available, the DKT which has set trunk queuing is idle, and the DN used to set trunk queuing is available, trunk queuing occurs.

(4-7) Office Line Call Reception 4-7-1. Generation of a ringing tone is controlled by office line setting and the presence/absence of the DN keys. Even with call reception setting, the ringing tone is not generated when no DN keys are set.

4-7-2. LED Display of Call Reception

When a plurality of calls are received by vertical multi DNs, "I-Called" is displayed on the key of primary call reception to identify the DN key where the ringing tone is generated. FIG. 78 shows the LED display of the CO key, i.e., the display operation pattern for displaying "I-Called" for the primary line. FIG. 79 shows the LED display of the DN key, i.e., the display operation pattern for displaying call reception on a designated DN independently of the presence/ absence of the CO key by setting when a call is received. In this case, if the DNs are not available, no call reception display is performed.

4-7-3. Office Line BOV

When an office line call is received by an available CO or available DN of a BUSY terminal, the call reception is displayed on the LED as in the normal state, and at the same time, the BOV tone is output. When the call cannot be received by any CO or DN although call reception setting is made, no BOV tone is generated. As the BOV tone, 2 Beep or continuous tone can be set in units of terminals by wiring installation. As the office line BOV tone, the beep tone of the terminal is modulated at 10 Hz and used. The 2 Beep is generated by sending this tone in a pattern of 1-sec ON, 3-sec OFF, and 1-sec ON while being intermitted only once. The continuous Beep is generated by sending this tone in a pattern of 1-sec ON, 3-sec OFF, and 1-sec ON while being repeatedly intermitted.

4-7-4. Camp-on of Office Line Call Reception

When an office line call is to be received by the DN, and the call cannot be received by the DN because no DN is available, the call can wait in camp-on. The camp-on tone is sent to the user of the DN (LED=I-USE) and the terminal having office line call reception setting. The 2 Beep is used as the camp-on tone, and the tone is changed to discriminate extension call reception from office line call reception, as described above.

4-7-5. Answer

The office line call can be answered by CO key pickup, DN key pickup, the "DN+special number" operation, or the pickup key operation for CO call reception. If a CO LED is present, "I-USE" is displayed. At this time, the DN LED is turned off.

4-7-6. When the DKT has no CO key or POOL key but a DN key, DN display is performed only for access through the DN. If the call is answered using the CO pickup key, display is made on the primary DN. When the primary DN is not available, the CO pickup key does not operate.

4-7-7. To designate the extension number of the called terminal using the pickup special number, not the DN but the DKT is designated.

(4-8) Call Reception by Leased Line

When a call is received by a DID or a leased line, LED display is performed on both the CO key and the DN key, like the office line call. When the DKT has both the keys, "I-USE" is preferentially displayed for the CO key. Conventionally, a call to be received by the DID or the leased line is received by the extension number. With the multi DN function, the call is received by the DN in accordance with the extension call reception setting. Therefore, as far as the called trunk is available, the RBT is returned to the calling line even though the called DN is not available except that DND is set for the called terminal as a whole. If DND is set for the called terminal as a whole, the BT is returned to the calling line.

When a call is received by the DID or the leased line when no DN is available, 1-Hz display is made for the CO key, and in this state, it is monitored whether the called DN is available. At this time, the RBT is returned to the calling line. If the called DN is being used (I-USE), the camp-on tone is sent to a terminal with extension call reception setting. When the DN becomes available, the DN is called. FIG. 80 shows an operation in the busy state.

(4-9) Office Line Holding 4-9-1. When "I-USE" is displayed for the DN key, the call can be held by depressing the HOLD key independently of whether the call is an office line call or an extension call. At this time, "I-USE" changes to "I-HOLD". "I-USE" is kept displayed for the DN key. Exclusive holding by "HOLD+HOLD" can also be performed.

4-9-2. Holding pickup can be performed by depressing the DN key which is displaying holding. By the conventional "INT+pickup special number+extension number" operation, the held terminal is designated, as in call reception. DN designation during holding is not performed.

4-9-3. HOLD RECALL is displayed by DN LED when it is held by the DN.

4-9-4. Scroll of Holding Display

This system allows display scroll of the "I-HOLD" line (including extension holding). Holding display is done when the terminal is available. Synchronized with the call reception information display operation on the LCD, the LED blinks at 10 Hz. This holding display has been described in (3-7), and a detailed description thereof will be omitted.

(4-10) Office Line Transfer

Figure 81:
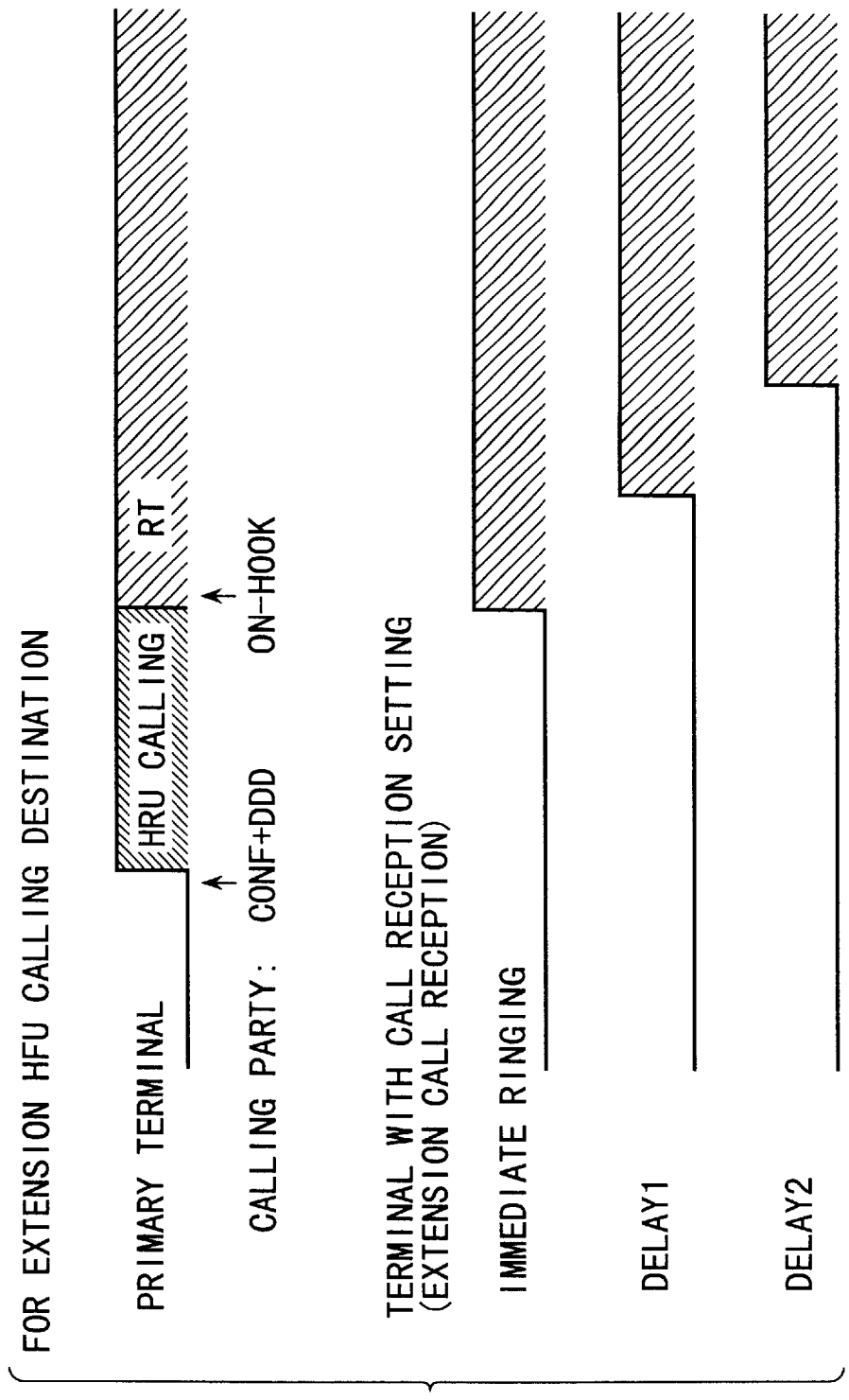
FIG. 81 is a timing chart showing a delay call reception operation in ring transfer for an extension HFU calling destination.
Figure 82:
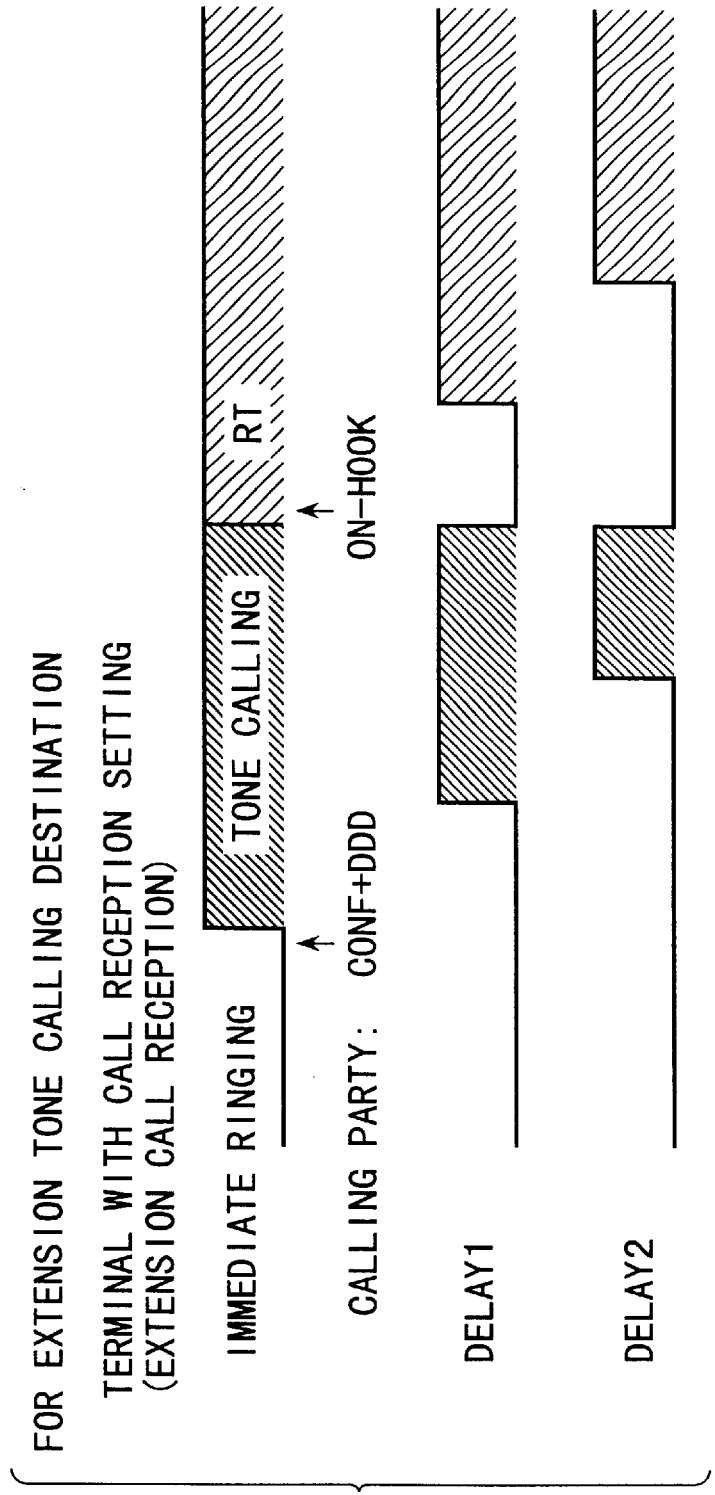
FIG. 82 is a timing chart showing the delay call reception operation in ring transfer for an extension tone calling destination.
Figure 83:
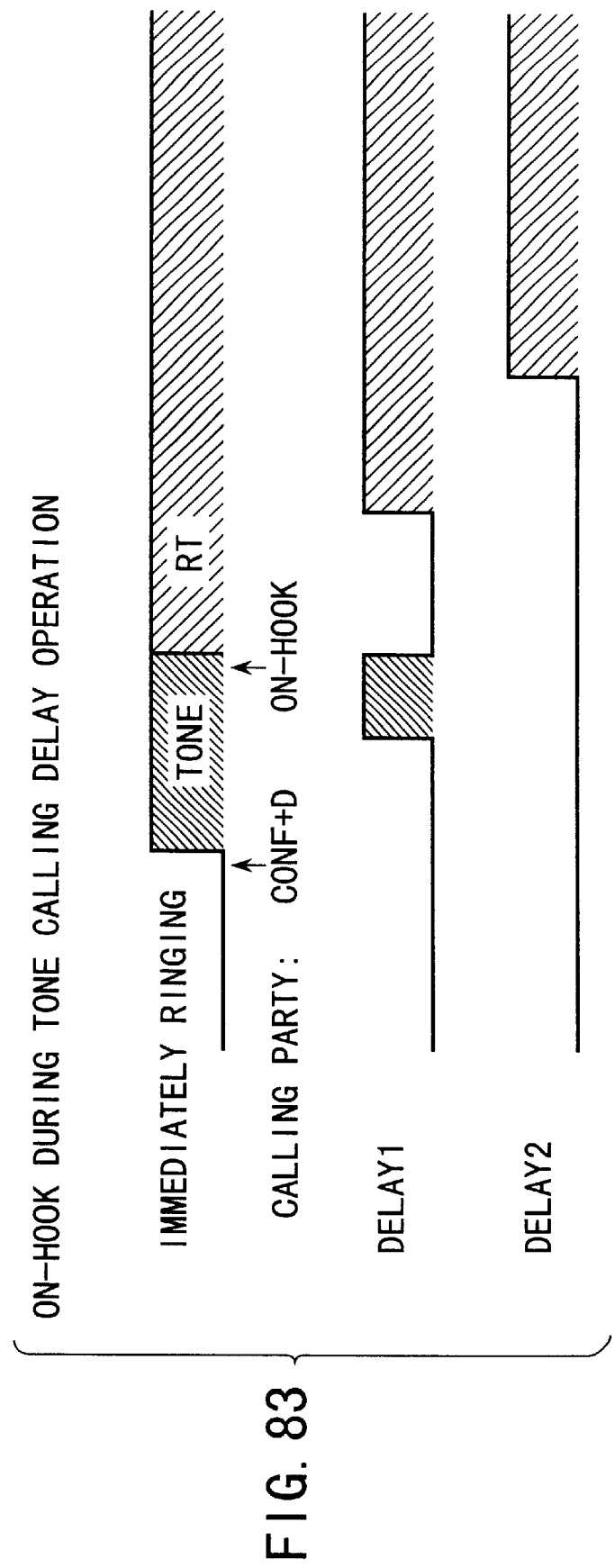
FIG. 83 is a timing chart when an on-hook operation is performed during a tone calling delay operation.

FIGS. 81, 82, and 83 are views for explaining the delay call reception operation in ring transfer. FIG. 81 shows the timing for an extension HFU calling destination. FIG. 82 shows the timing for an extension tone calling destination. FIG. 83 shows the timing when the terminal goes on-hook during tone calling and the delay operation.

(4-11) SMDR Format

Figure 84:
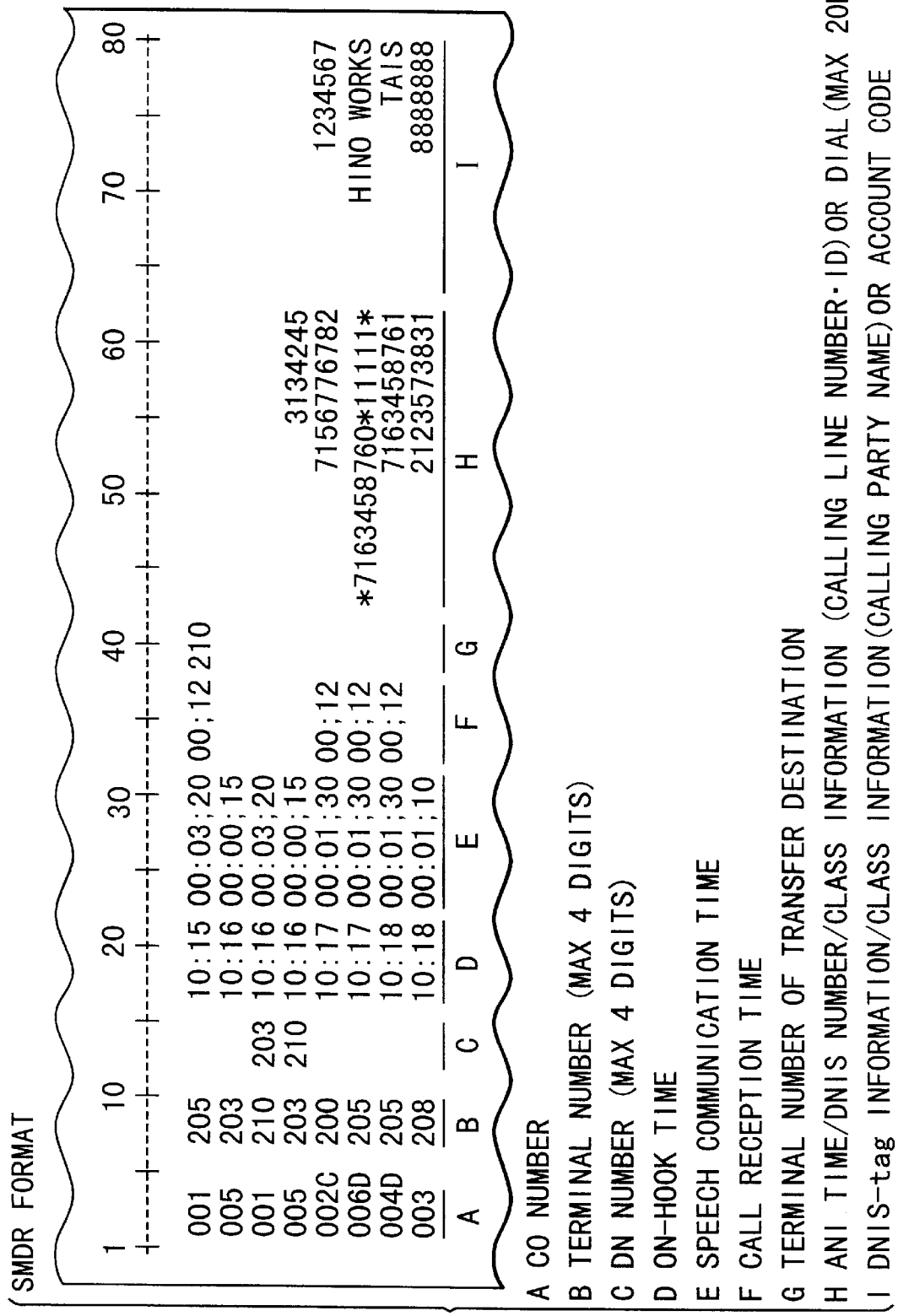
FIG. 84 is a view showing an example of a speech communication management record printed by an SMDR.

FIG. 84 is a view showing an example of a speech communication management record printed by the SMDR 8. As shown in FIG. 84, items to be recorded include the CO number, the terminal number, the DN number, the end time of speech communication, the speech communication time, the call reception time, the transfer destination terminal number, the ANI/DNIS number, the CLASS information (calling line number) or dial number, and the DNIS-tag information/CLASS information (calling line name) or account code.

(4-12) Various Call Reception Operations

Figure 85:
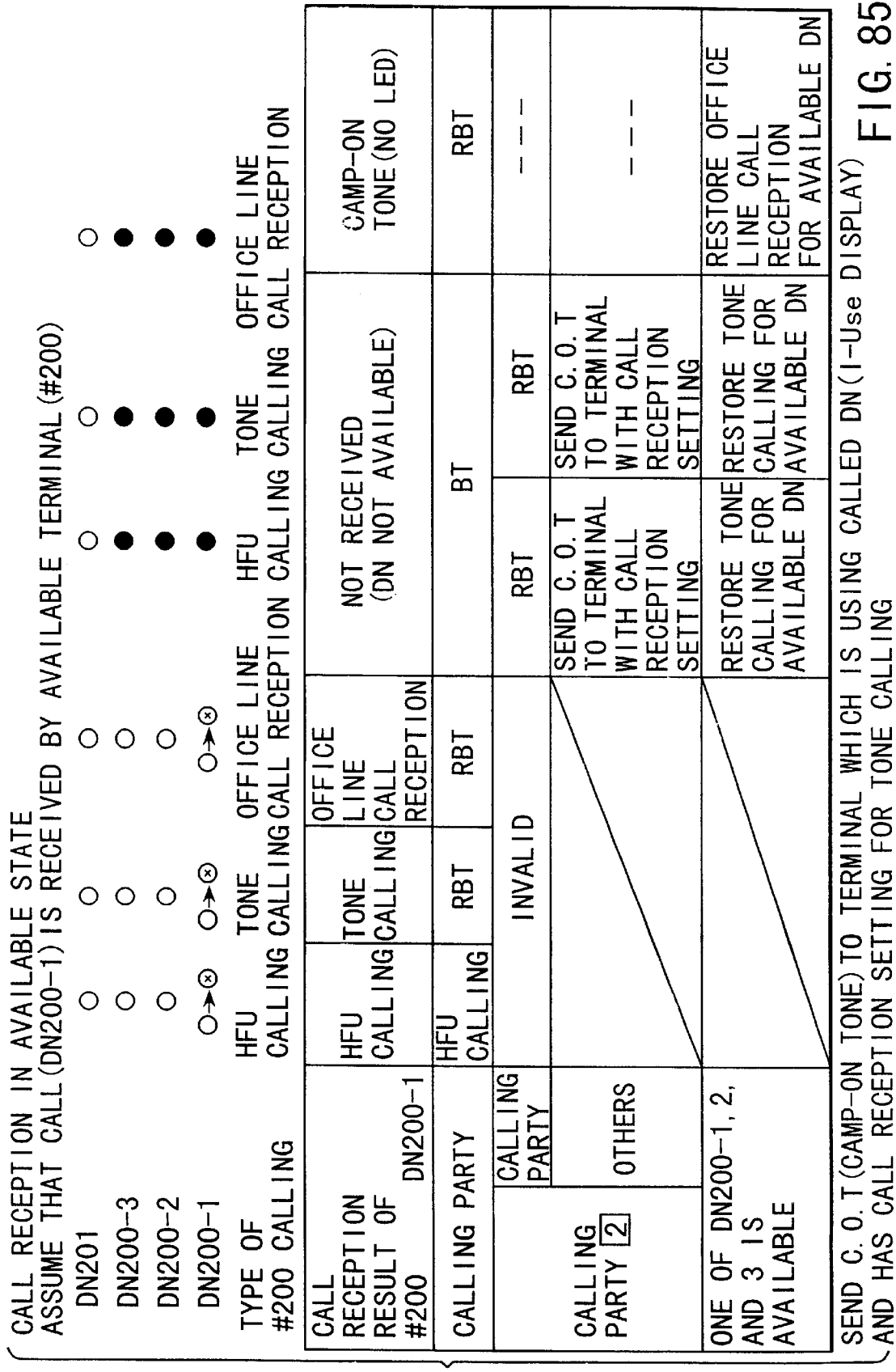
FIG. 85 is a view showing a DN call reception operation by an available DN.

FIG. 85 shows the call reception operation in the idle state assuming that a call (DN200-1) arrives at the idle terminal (#200).

FIG. 86 shows the call reception operation during call reception (when an available DN is present) assuming that a call (DN200-2) arrives at the terminal (#200) which is receiving a call (DN200-3).

FIG. 87 shows the DN key operation during call reception.

FIG. 88 shows the call reception operation during speech communication assuming that a call (DN200-2) arrives at the terminal #200 which is performing speech communication (DN200-1).

Figure 89:
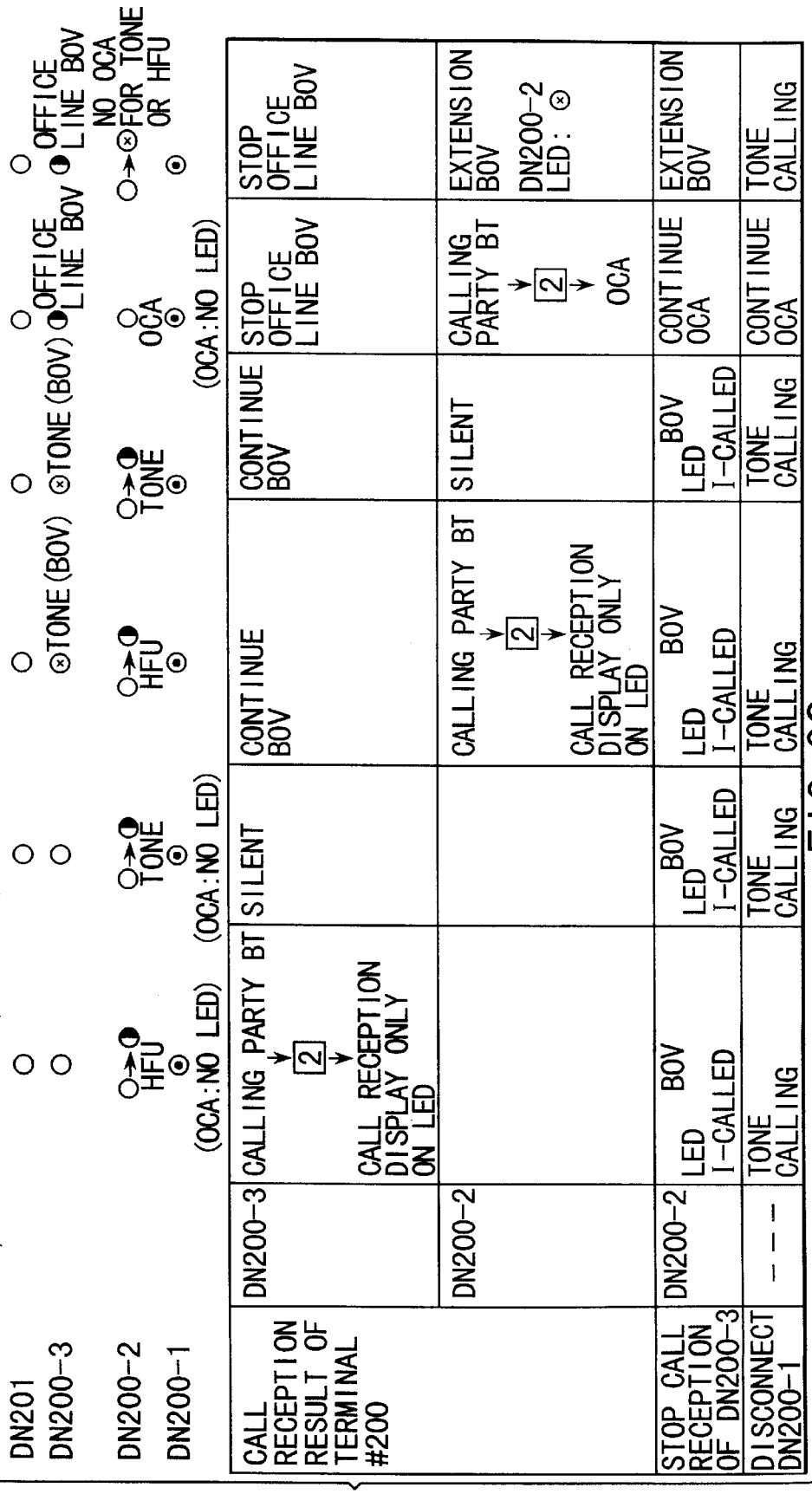
FIG. 89 is a view showing the DN call reception operation during speech communication when a DN is available.

FIG. 89 shows the call reception operation during call reception on a terminal which is performing speech communication (when an available DN is present) assuming that a call (DN200-3) is being received by the terminal #200 which is performing speech communication (DN200-1), and a new call (DN200-2) arrives at the terminal.

Figure 90:
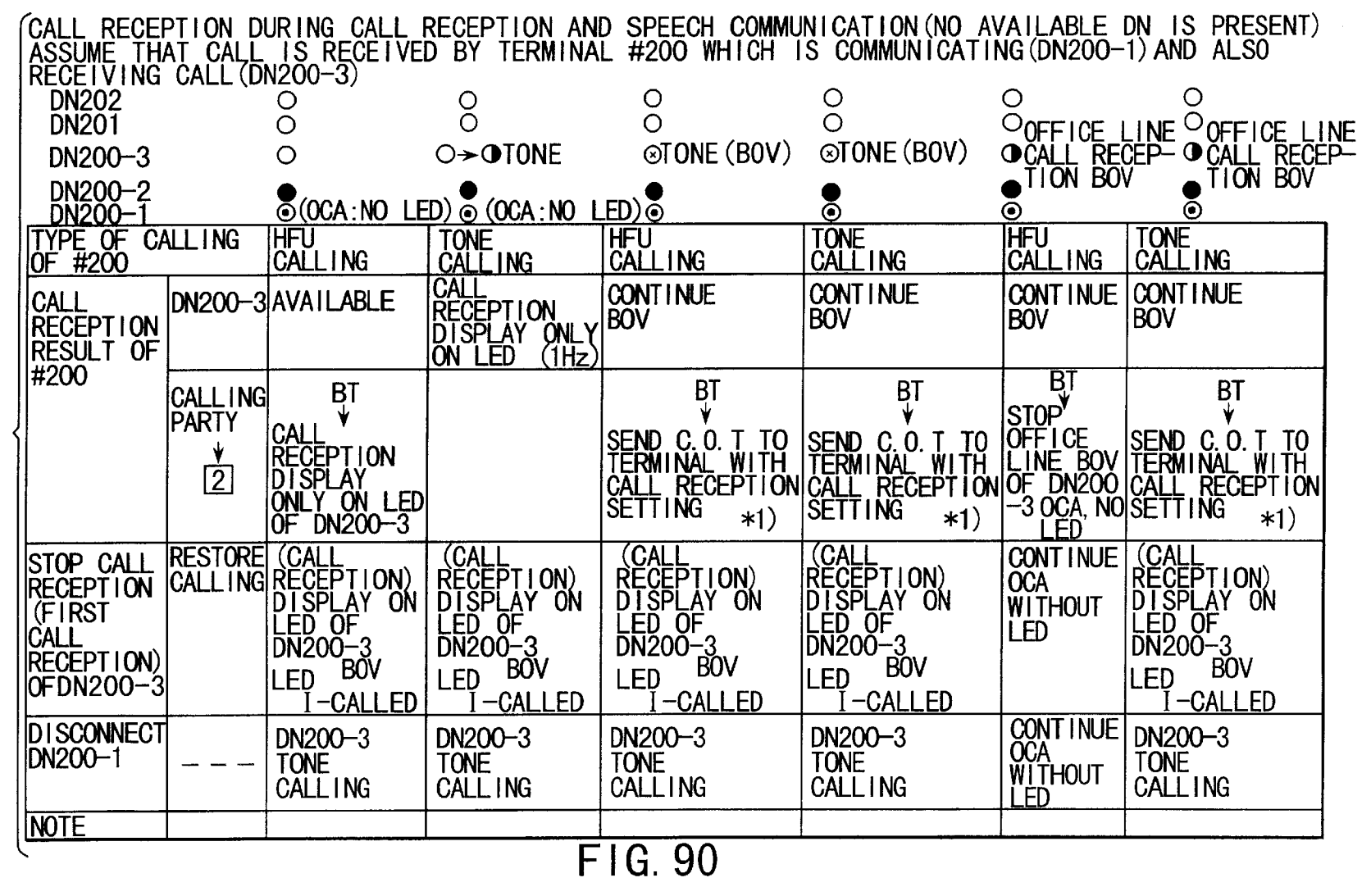

FIG. 90 shows the call reception operation during call reception on a terminal which is performing speech communication (when no available DN is present) assuming that a new call arrives at the terminal (#200) which is performing speech communication (DN200-1) and also receiving a call (DN200-3).

What is claimed is:

1. A digital key telephone system connected, through an office line, to an analog communication network having a function of transmitting a ringing signal including calling line identification information, accommodating a plurality of extension lines connected to extension terminals, and having a function of switching and connecting the office line to the plurality of extension lines or the extension lines to each other, comprising:

identification information detection means for detecting the calling line identification information included in the ringing signal each time a ringing signal arrives from the analog communication network;

calling line identification information storage means for storing the calling line identification information detected by said identification information detection means in correspondence with a called extension terminal when call reception processing is performed for the called extension terminal in response to arrival of the ringing signal, and it is judged that the called extension terminal does not answer the call; wherein the called extension terminal that does not answer the call includes display means for displaying a plurality of calling line identification information stored in said calling line identification information storage means, and input means used by a user of the extension terminal, for selectively designating calling line identification information from the plurality of calling line identification information displayed on the display means;

call back control means for, when an operation of requesting call back is performed in the extension terminal which does not answer the call, performing call back processing for the calling line on the basis of the calling line identification information selectively designated by said input means.

2. A digital key telephone system according to claim 1, characterized in that said calling line identification information storage means monitors restoration of the office line which has received a call during call reception processing and stores the calling line identification information upon detecting the restoration.

3. A digital key telephone system comprising a main unit connected to a communication network through an office line, accommodating a plurality of extension lines, and having at least a function of switching and connecting the office line to the plurality of extension lines or the extension lines to each other, and a plurality of extension terminals connected to the plurality of extension lines of said main unit, characterized in that at least one of the plurality of extension terminals comprises means for sending a request for knowing contents of an incoming call addressed to the extension terminal, and said main unit comprises call reception information notification control means for, when the request for knowing the contents of the incoming call is sent from the extension terminal where the incoming call waiting for call reception processing is present, supplying call reception information representing the contents of the incoming call waiting for call reception processing to the extension terminal of the request source in accordance with the request.

4. A digital key telephone system according to claim (3), characterized in that the extension terminal comprises a digital key telephone connected to an extension line and a computer device connected to said digital key telephone through an interface, the request for knowing the contents of the incoming call is sent from said computer device to said main unit, and the call reception information supplied from said main unit is displayed on said computer device.

5. A digital key telephone system comprising claim (3) or (4), characterized in that the extension terminal sends the request for knowing the contents of the incoming call addressed to the extension terminal at one of a timing of a request operation by a user and a predetermined sending timing.

6. A digital key telephone system according to claim (3) or (4), characterized in that when a plurality of incoming calls waiting for call reception processing are present in an extension terminal, and every time a request for knowing contents of an incoming call is sent from the extension terminal, said call reception information notification control means sequentially selects the plurality of incoming calls and supplying call reception information representing the contents to the extension terminal of the request source.

7. A digital key telephone system connected to a communications network through an office line, accommodating a plurality of extension lines connected to extension terminals, having a function of switching and connecting the office line to the plurality of extension lines or the extension lines to each other, and comprising call park control means for, when a call park request is input in an extension terminal which is communicating, holding a call to the extension terminal in correspondence with an orbit number, and in this state, when a user of another extension terminal accesses the orbit number through an operation of inputting a special code number, connecting the extension terminal to the held call, characterized in that said call park control means fold the orbit number until the call is ended in holding the call subjected to call park in correspondence with the orbit number, and when a repark request for the call is generated while the call is continuously received, the call is held in correspondence with the orbit number at which the call is being held.

8. A digital key telephone system comprising a main unit connected to a communication network through an office line, accommodating a plurality of extension lines, and having at least a function of switching and connecting the office line to the plurality of extension lines or the extension lines to each other, a plurality of extension terminals connected to the plurality of extension lines of said main unit, and a computer connection interface added to at least one of the extension terminals, characterized in that said digital key telephone system comprises means for, when an operation mode change request to enter a computer telephony mode wherein the computer is connected to the office line arrives at the computer connection interface from a computer connected to the computer connection interface, transferring the change request to said main unit, said main unit comprises means for, when the mode change request is transferred from the computer connection interface, determining whether or not the main unit is compatible with the requested mode, and supplying a determination result to the computer connection interface which has transferred the mode change request, and the computer connection interface comprises means for performing mode change processing in response to the mode change request from the computer on the basis of the determination result supplied by said main unit after transfer of the mode change request.

9. A digital key telephone system comprising a main unit connected, through an office line, to a communication network having a function of transmitting a ringing signal including calling line identification information, accommodating a plurality of extension lines, and having at least a function of switching and connecting the office line to the plurality of extension lines or the extension line to each other, a plurality of extension terminals connected to the plurality of extension lines of said main unit, comprising:

a plurality of storage means for storing information associated with the extension lines in correspondence with the respective extension lines;

transfer processing means for, when a transfer request for transferring a call to a first extension line to a second extension line is set, transferring a call addressed to the first extension line, which is arriving through the office line, to the second extension line; and means for, when the second extension line of the transfer destination does not answer the call reception transfer processing by said transfer processing means, storing the calling line identification information in a storage buffer corresponding to the second extension line of the transfer destination, and for, when recalling the call transfer, storing the calling line identification information in each of a storage buffer corresponding to the first extension line of the transfer destination and the storage buffer corresponding to the second extension line of the transfer destination.

10. The digital key telephone system of claim 8, wherein the computer connection interface further comprises:

means for connecting an extension terminal and a computer to each other in a through state, when the computer transfers a change request to the computer telephone mode.

11. A digital key telephone system connected, through an office line, to an analog communication network having a function of transmitting a ringing signal including calling line identification information, accommodating a plurality of extension lines connected to extension terminals, and having a function of switching and connecting the office line to the plurality of extension lines or the extension lines to each other, comprising:

identification information detection means for detecting the calling line identification information included in the ringing signal each time a ringing signal arrives from the analog communication network;

calling line identification information storage means for storing the calling line identification information detected by said identification information detection means in correspondence with a called extension terminal when call reception processing is performed for the called extension terminal in response to arrival of the ringing signal, and it is judged that the extension terminal does not answer the call;

call back control means for, when an operation of requesting call back is performed in the extension terminal which does not answer the call, performing call back processing for the calling line on the basis of the calling line identification information selectively designated by said input means.

* * * * *

UNITED STATES PATENT AND TRADEMARK OFFICE
CERTIFICATE OF CORRECTION

PATENT NO. : 6,263,061 B1  
DATED : July 17, 2001  
INVENTOR(S) : Toshiaki Tanaka et al.

It is certified that error appears in the above-identified patent and that said Letters Patent is hereby corrected as shown below:

<u>Title page,</u>
Item [73], Assignee, "Kaish" should read -- Kaisha --.
Item [22], PCT Filed:, "February 11, 1997" should read -- February 13, 1997 --.
Item [86], PCT No.: "PCT/US97/02163" should read -- PCT/JP97/00369 --.

Signed and Sealed this

Twenty-first Day of October, 2003

JAMES E. ROGAN
*Director of the United States Patent and Trademark Office*